United States Patent
Kopelman et al.

(10) Patent No.: US 12,274,597 B2
(45) Date of Patent: Apr. 15, 2025

(54) DENTAL ATTACHMENT TEMPLATE TRAY SYSTEMS

(71) Applicant: Align Technology, Inc., San Jose, CA (US)

(72) Inventors: Avi Kopelman, Palo Alto, CA (US); Chunhua Li, Cupertino, CA (US)

(73) Assignee: Align Technology, Inc., San Jose, CA (US)

( * ) Notice: Subject to any disclaimer, the term of this patent is extended or adjusted under 35 U.S.C. 154(b) by 13 days.

(21) Appl. No.: 15/674,662

(22) Filed: Aug. 11, 2017

(65) Prior Publication Data
US 2019/0046297 A1  Feb. 14, 2019

(51) Int. Cl.
*A61C 7/14* (2006.01)
*A61C 13/15* (2006.01)

(52) U.S. Cl.
CPC ............ *A61C 7/146* (2013.01); *A61C 19/003* (2013.01)

(58) Field of Classification Search
CPC ...... A61C 7/146; A61C 19/003; A61C 19/004
See application file for complete search history.

(56) References Cited

U.S. PATENT DOCUMENTS

| | | | |
|---|---|---|---|
| 226 A * | 6/1837 | Goss | B27B 27/02 122/34 |
| 47,985 A * | 5/1865 | Rulon | B61D 3/10 213/184 |
| 2,171,695 A | 9/1939 | Harper | |
| 2,194,790 A | 3/1940 | Gluck | |
| 2,467,432 A | 4/1949 | Kesling | |
| 2,531,222 A | 11/1950 | Kesling | |
| 2,835,628 A | 5/1958 | Saffir | |
| 3,089,487 A | 5/1963 | Enicks et al. | |
| 3,092,907 A | 6/1963 | Traiger | |
| 3,178,820 A | 4/1965 | Kesling | |

(Continued)

FOREIGN PATENT DOCUMENTS

AU    517102 B    11/1977
AU   3031677 A    11/1977

(Continued)

OTHER PUBLICATIONS

US 8,553,966 B1, 10/2013, Alpern et al. (withdrawn)

(Continued)

*Primary Examiner* — Matthew M Nelson
(74) *Attorney, Agent, or Firm* — Shay Glenn LLP

(57) ABSTRACT

The present disclosure provides methods, devices, and systems for the bonding of attachments for use with dental appliances. For instance, an attachment template tray system may include a template body and a light source tray. Electronic circuitry of the light source tray may be configured to activate, based on a signal from a sensor assembly, radiation source(s) of the light source tray when the light source tray is within a threshold distance of the template body. The template body may include an orthodontic attachment with a release layer covering an engagement surface. Radiation sources of the light source tray may be configured to emit a first range of wavelengths of light for curing a light curable adhesive coating on the orthodontic attachment and a second range of wavelengths of light for degrading the release layer.

22 Claims, 11 Drawing Sheets

(56) References Cited

U.S. PATENT DOCUMENTS

| | | | |
|---|---|---|---|
| 3,192,302 A | 6/1965 | Keefer | |
| 3,211,143 A | 10/1965 | Grossberg | |
| 3,379,193 A | 4/1968 | Monsghan | |
| 3,385,291 A | 5/1968 | Martin | |
| 3,407,500 A | 10/1968 | Kesling | |
| 3,478,742 A | 11/1969 | Bohlmann | |
| 3,496,936 A | 2/1970 | Gores | |
| 3,503,127 A | 3/1970 | Kasdin et al. | |
| 3,533,163 A | 10/1970 | Kirschenbaum | |
| 3,555,386 A | 1/1971 | Wisman | |
| 3,556,093 A | 1/1971 | Quick | |
| 3,564,205 A | 2/1971 | Tyler | |
| 3,600,808 A | 8/1971 | Reeve | |
| 3,660,900 A | 5/1972 | Andrews | |
| 3,665,770 A | 5/1972 | Sagi et al. | |
| 3,683,502 A | 8/1972 | Wallshein | |
| 3,704,985 A | 12/1972 | Pickett et al. | |
| 3,724,075 A | 4/1973 | Kesling | |
| 3,733,905 A | 5/1973 | Bremer | |
| 3,738,005 A | 6/1973 | Cohen et al. | |
| 3,797,115 A | 3/1974 | Silverman et al. | |
| 3,813,781 A | 6/1974 | Forgione | |
| 3,848,335 A | 11/1974 | Bergersen | |
| 3,860,803 A | 1/1975 | Levine | |
| 3,885,310 A | 5/1975 | Northcutt | |
| 3,916,526 A | 11/1975 | Schudy | |
| 3,922,786 A | 12/1975 | Lavin | |
| 3,949,477 A * | 4/1976 | Cohen | A61C 7/146 433/24 |
| 3,950,851 A | 4/1976 | Bergersen | |
| 3,955,282 A | 5/1976 | McNall | |
| 3,968,690 A | 7/1976 | Blouin et al. | |
| 3,983,628 A | 10/1976 | Acevedo | |
| 4,014,096 A | 3/1977 | Dellinger | |
| 4,039,653 A | 8/1977 | DeFoney et al. | |
| 4,055,895 A | 11/1977 | Huge | |
| 4,072,268 A | 2/1978 | Perris | |
| 4,094,068 A | 6/1978 | Schinhammer | |
| 4,117,596 A | 10/1978 | Wallshein | |
| 4,123,768 A | 10/1978 | Kilshaw et al. | |
| 4,124,793 A | 11/1978 | Colman | |
| 4,129,946 A | 12/1978 | Kennedy | |
| 4,134,208 A | 1/1979 | Pearlman | |
| 4,139,944 A | 2/1979 | Bergersen | |
| 4,179,811 A | 12/1979 | Hinz | |
| 4,179,812 A | 12/1979 | White | |
| 4,183,141 A | 1/1980 | Dellinger | |
| 4,192,456 A | 3/1980 | Shields et al. | |
| 4,195,046 A | 3/1980 | Kesling | |
| 4,204,325 A | 5/1980 | Kaelble | |
| 4,253,828 A | 3/1981 | Coles et al. | |
| 4,255,138 A | 3/1981 | Frohn | |
| 4,278,087 A | 7/1981 | Theeuwes | |
| 4,299,568 A | 11/1981 | Crowley | |
| 4,310,047 A | 1/1982 | Branson | |
| 4,324,546 A * | 4/1982 | Heitlinger | A61C 13/0004 433/213 |
| 4,324,547 A | 4/1982 | Arcan et al. | |
| 4,348,178 A | 9/1982 | Kurz | |
| 4,368,040 A | 1/1983 | Weissman | |
| 4,419,992 A | 12/1983 | Chorbajian | |
| 4,433,956 A | 2/1984 | Witzig | |
| 4,433,960 A | 2/1984 | Garito et al. | |
| 4,439,154 A | 3/1984 | Mayclin | |
| 4,447,164 A | 5/1984 | Berndt | |
| 4,449,928 A | 5/1984 | von Weissenfluh | |
| 4,450,150 A | 5/1984 | Sidman | |
| 4,478,580 A | 10/1984 | Barrut | |
| 4,500,294 A | 2/1985 | Lewis | |
| 4,505,672 A | 3/1985 | Kurz | |
| 4,505,673 A | 3/1985 | Yoshii | |
| 4,519,386 A | 5/1985 | Sullivan | |
| 4,523,908 A | 6/1985 | Drisaldi et al. | |
| 4,526,540 A * | 7/1985 | Dellinger | A61C 7/146 433/24 |
| 4,551,096 A * | 11/1985 | Dellinger | A61C 7/146 433/24 |
| 4,553,936 A | 11/1985 | Wang | |
| 4,575,330 A | 3/1986 | Hull | |
| 4,575,805 A | 3/1986 | Moermann et al. | |
| 4,591,341 A | 5/1986 | Andrews | |
| 4,608,021 A | 8/1986 | Barrett | |
| 4,609,349 A | 9/1986 | Cain | |
| 4,611,288 A | 9/1986 | Duret et al. | |
| 4,629,424 A | 12/1986 | Lauks et al. | |
| 4,638,145 A | 1/1987 | Sakuma et al. | |
| 4,656,860 A | 4/1987 | Orthuber et al. | |
| 4,657,508 A * | 4/1987 | Dellinger | A61C 7/146 433/24 |
| 4,663,720 A | 5/1987 | Duret et al. | |
| 4,664,626 A | 5/1987 | Kesling | |
| 4,665,621 A | 5/1987 | Ackerman et al. | |
| 4,673,353 A * | 6/1987 | Nevin | A61C 5/62 433/229 |
| 4,676,747 A | 6/1987 | Kesling | |
| 4,713,243 A | 12/1987 | Schiraldi et al. | |
| 4,741,700 A | 5/1988 | Barabe | |
| 4,755,139 A | 7/1988 | Abbatte et al. | |
| 4,757,824 A | 7/1988 | Chaumet | |
| 4,763,791 A | 8/1988 | Halverson et al. | |
| 4,764,111 A | 8/1988 | Knierim | |
| 4,768,951 A | 9/1988 | Abiru et al. | |
| 4,790,752 A * | 12/1988 | Cheslak | G02B 6/001 433/229 |
| 4,793,803 A | 12/1988 | Martz | |
| 4,798,534 A | 1/1989 | Breads | |
| 4,818,542 A | 4/1989 | DeLuca et al. | |
| 4,825,393 A | 4/1989 | Nishiya | |
| 4,830,612 A | 5/1989 | Bergersen | |
| 4,836,778 A | 6/1989 | Baumrind et al. | |
| 4,837,732 A | 6/1989 | Brandestini et al. | |
| 4,850,864 A | 7/1989 | Diamond | |
| 4,850,865 A | 7/1989 | Napolitano | |
| 4,856,991 A | 8/1989 | Breads et al. | |
| 4,859,181 A | 8/1989 | Neumeyer | |
| 4,861,268 A | 8/1989 | Garay et al. | |
| 4,867,680 A * | 9/1989 | Hare | A61K 6/90 433/37 |
| 4,867,682 A * | 9/1989 | Hammesfahr | A61C 9/0006 433/229 |
| 4,877,398 A | 10/1989 | Kesling | |
| 4,880,380 A | 11/1989 | Martz | |
| 4,886,451 A | 12/1989 | Cetlin | |
| 4,889,238 A | 12/1989 | Batchelor | |
| 4,890,608 A | 1/1990 | Steer | |
| 4,932,866 A | 6/1990 | Guis | |
| 4,935,635 A | 6/1990 | O'Harra | |
| 4,936,862 A | 6/1990 | Walker et al. | |
| 4,937,928 A | 7/1990 | van der Zel | |
| 4,941,826 A | 7/1990 | Loran et al. | |
| 4,952,928 A | 8/1990 | Carroll et al. | |
| 4,964,770 A | 10/1990 | Steinbichler et al. | |
| 4,968,251 A | 11/1990 | Darnell | |
| 4,971,557 A | 11/1990 | Martin | |
| 4,975,052 A | 12/1990 | Spencer et al. | |
| 4,983,334 A | 1/1991 | Adell | |
| 4,990,089 A | 2/1991 | Munro | |
| 4,997,369 A | 3/1991 | Shafir | |
| 5,002,485 A | 3/1991 | Aagesen | |
| 5,011,405 A | 4/1991 | Lemchen | |
| 5,015,183 A | 5/1991 | Fenick | |
| 5,017,133 A | 5/1991 | Miura | |
| 5,018,969 A | 5/1991 | Andreiko et al. | |
| 5,027,281 A | 6/1991 | Rekow et al. | |
| 5,035,613 A | 7/1991 | Breads et al. | |
| 5,037,295 A | 8/1991 | Bergersen | |
| 5,049,077 A | 9/1991 | Goldin et al. | |
| 5,055,039 A | 10/1991 | Abbatte et al. | |
| 5,061,839 A | 10/1991 | Matsuno et al. | |
| 5,074,786 A | 12/1991 | Woodward | |
| 5,076,791 A | 12/1991 | Madray | |
| 5,083,919 A | 1/1992 | Quach | |
| 5,085,585 A | 2/1992 | Zimble | |
| 5,094,614 A | 3/1992 | Wildman | |

(56) References Cited

U.S. PATENT DOCUMENTS

| | | |
|---|---|---|
| 5,100,316 A | 3/1992 | Wildman |
| 5,103,838 A | 4/1992 | Yousif |
| 5,114,339 A | 5/1992 | Guis |
| 5,121,333 A | 6/1992 | Riley et al. |
| 5,123,425 A | 6/1992 | Shannon et al. |
| 5,127,903 A | 7/1992 | Mailot et al. |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,137,449 A | 8/1992 | Goldin et al. |
| 5,139,419 A | 8/1992 | Andreiko et al. |
| 5,145,364 A | 9/1992 | Martz et al. |
| 5,165,424 A | 11/1992 | Silverman |
| 5,176,517 A | 1/1993 | Truax |
| 5,194,003 A | 3/1993 | Garay et al. |
| 5,204,670 A | 4/1993 | Stinton |
| 5,219,625 A | 6/1993 | Matsunami et al. |
| 5,222,499 A | 6/1993 | Allen et al. |
| 5,224,049 A | 6/1993 | Mushabac |
| 5,238,404 A | 8/1993 | Andreiko |
| 5,242,304 A | 9/1993 | Truax et al. |
| 5,245,592 A | 9/1993 | Kuemmel et al. |
| 5,273,429 A | 12/1993 | Rekow et al. |
| 5,278,756 A | 1/1994 | Lemchen et al. |
| 5,306,144 A | 4/1994 | Hibst et al. |
| 5,314,335 A | 5/1994 | Fung |
| 5,316,473 A * | 5/1994 | Hare ............... A61C 19/004 433/29 |
| 5,324,186 A | 6/1994 | Bakanowski |
| 5,326,685 A | 7/1994 | Gaglio et al. |
| 5,328,362 A | 7/1994 | Watson et al. |
| 5,335,657 A | 8/1994 | Terry et al. |
| 5,338,198 A | 8/1994 | Wu et al. |
| 5,340,309 A | 8/1994 | Robertson |
| 5,342,202 A | 8/1994 | Deshayes |
| 5,344,315 A | 9/1994 | Hanson |
| 5,367,478 A | 11/1994 | Hattori |
| 5,368,478 A | 11/1994 | Andreiko et al. |
| 5,372,502 A | 12/1994 | Massen et al. |
| D354,355 S * | 1/1995 | Hilgers ................... D24/180 |
| 5,382,164 A | 1/1995 | Stern |
| 5,395,238 A | 3/1995 | Andreiko et al. |
| 5,415,542 A | 5/1995 | Kesling |
| 5,431,562 A | 7/1995 | Andreiko et al. |
| 5,437,872 A | 8/1995 | Lee |
| 5,440,326 A | 8/1995 | Quinn |
| 5,440,496 A | 8/1995 | Andersson et al. |
| 5,447,432 A | 9/1995 | Andreiko et al. |
| 5,449,703 A | 9/1995 | Mitra et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| 5,487,662 A * | 1/1996 | Kipke ............... A61C 9/0006 433/29 |
| RE35,169 E * | 3/1996 | Lemchen ......... A61C 13/0003 433/229 |
| 5,499,633 A | 3/1996 | Fenton |
| 5,522,725 A | 6/1996 | Jordan et al. |
| 5,528,735 A | 6/1996 | Strasnick et al. |
| 5,533,895 A | 7/1996 | Andreiko et al. |
| 5,540,732 A | 7/1996 | Testerman |
| 5,542,842 A | 8/1996 | Andreiko et al. |
| 5,543,780 A | 8/1996 | McAuley et al. |
| 5,549,476 A | 8/1996 | Stern |
| 5,562,448 A | 10/1996 | Mushabac |
| 5,570,182 A | 10/1996 | Nathel et al. |
| 5,575,654 A | 11/1996 | Fontenot |
| 5,575,655 A | 11/1996 | Darnell |
| 5,583,977 A | 12/1996 | Seidl |
| 5,587,520 A | 12/1996 | Rhodes |
| 5,587,912 A | 12/1996 | Andersson et al. |
| 5,588,098 A | 12/1996 | Chen et al. |
| 5,605,459 A | 2/1997 | Kuroda et al. |
| 5,607,305 A | 3/1997 | Andersson et al. |
| 5,614,075 A | 3/1997 | Andre |
| 5,621,648 A | 4/1997 | Crump |
| 5,626,537 A | 5/1997 | Danyo et al. |
| 5,636,736 A | 6/1997 | Jacobs et al. |
| 5,645,420 A | 7/1997 | Bergersen |
| 5,645,421 A | 7/1997 | Slootsky |
| 5,651,671 A | 7/1997 | Seay et al. |
| 5,655,653 A | 8/1997 | Chester |
| 5,659,420 A | 8/1997 | Wakai et al. |
| 5,683,243 A | 11/1997 | Andreiko et al. |
| 5,683,244 A | 11/1997 | Truax |
| 5,690,486 A | 11/1997 | Zigelbaum |
| 5,691,539 A | 11/1997 | Pfeiffer |
| 5,692,894 A | 12/1997 | Schwartz et al. |
| 5,711,665 A | 1/1998 | Adam et al. |
| 5,711,666 A | 1/1998 | Hanson |
| 5,718,577 A * | 2/1998 | Oxman ............... A61C 9/0006 433/29 |
| 5,725,376 A | 3/1998 | Poirier |
| 5,725,378 A | 3/1998 | Wang |
| 5,730,151 A | 3/1998 | Summer et al. |
| 5,737,084 A | 4/1998 | Ishihara |
| 5,740,267 A | 4/1998 | Echerer et al. |
| 5,742,700 A | 4/1998 | Yoon et al. |
| 5,769,631 A | 6/1998 | Williams |
| 5,774,425 A | 6/1998 | Ivanov et al. |
| 5,790,242 A | 8/1998 | Stern et al. |
| 5,799,100 A | 8/1998 | Clarke et al. |
| 5,800,162 A | 9/1998 | Shimodaira et al. |
| 5,800,174 A | 9/1998 | Andersson |
| 5,813,854 A * | 9/1998 | Nikodem ............... A61C 7/146 433/29 |
| D399,961 S * | 10/1998 | Nikodem ................... D24/180 |
| 5,816,800 A | 10/1998 | Brehm et al. |
| 5,818,587 A | 10/1998 | Devaraj et al. |
| 5,823,778 A | 10/1998 | Schmitt et al. |
| 5,846,058 A | 12/1998 | Fischer |
| 5,848,115 A | 12/1998 | Little et al. |
| 5,857,853 A | 1/1999 | van Nifterick et al. |
| 5,866,058 A | 2/1999 | Batchelder et al. |
| 5,876,199 A | 3/1999 | Bergersen |
| 5,879,158 A | 3/1999 | Doyle et al. |
| 5,880,961 A | 3/1999 | Crump |
| 5,880,962 A | 3/1999 | Andersson et al. |
| 5,882,192 A | 3/1999 | Bergersen |
| 5,886,702 A | 3/1999 | Migdal et al. |
| 5,890,896 A * | 4/1999 | Padial ............... A61C 9/0026 433/214 |
| 5,904,479 A | 5/1999 | Staples |
| 5,905,658 A | 5/1999 | Baba |
| 5,911,576 A | 6/1999 | Ulrich et al. |
| 5,924,863 A | 7/1999 | Jacobs et al. |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 5,975,906 A | 11/1999 | Knutson |
| 5,980,246 A | 11/1999 | Ramsay et al. |
| 5,989,023 A | 11/1999 | Summer et al. |
| 5,993,413 A | 11/1999 | Aaltonen et al. |
| 5,995,583 A * | 11/1999 | Schick ............... A61B 6/512 378/38 |
| 6,002,706 A | 12/1999 | Staver et al. |
| 6,018,713 A | 1/2000 | Coli et al. |
| 6,044,309 A | 3/2000 | Honda |
| 6,049,743 A | 4/2000 | Baba |
| 6,053,731 A | 4/2000 | Heckenberger |
| 6,068,475 A | 5/2000 | Stoyka |
| 6,068,482 A | 5/2000 | Snow |
| 6,070,140 A | 5/2000 | Tran |
| 6,077,073 A * | 6/2000 | Jacob ............... A61C 19/066 433/29 |
| 6,089,869 A | 7/2000 | Schwartz |
| 6,099,303 A | 8/2000 | Gibbs et al. |
| 6,099,314 A | 8/2000 | Kopelman et al. |
| 6,102,701 A | 8/2000 | Engeron |
| 6,120,287 A | 9/2000 | Chen |

(56) References Cited

U.S. PATENT DOCUMENTS

| | | | |
|---|---|---|---|
| 6,120,290 A | 9/2000 | Fukushima et al. | |
| 6,123,544 A | 9/2000 | Cleary | |
| 6,142,780 A | 11/2000 | Burgio | |
| 6,152,731 A | 11/2000 | Jordan et al. | |
| 6,154,676 A | 11/2000 | Levine | |
| 6,159,498 A | 12/2000 | Tapolsky et al. | |
| 6,183,248 B1 | 2/2001 | Chishti et al. | |
| 6,183,249 B1 | 2/2001 | Brennan et al. | |
| 6,186,780 B1 | 2/2001 | Hibst et al. | |
| 6,190,165 B1 | 2/2001 | Andreiko et al. | |
| 6,200,133 B1 | 3/2001 | Kittelsen | |
| 6,201,880 B1 | 3/2001 | Elbaum et al. | |
| 6,210,162 B1 | 4/2001 | Chishti et al. | |
| 6,212,435 B1 | 4/2001 | Lattner et al. | |
| 6,213,767 B1 | 4/2001 | Dixon et al. | |
| 6,217,334 B1 | 4/2001 | Hultgren | |
| 6,227,850 B1 | 5/2001 | Chishti et al. | |
| 6,230,142 B1 | 5/2001 | Benigno et al. | |
| 6,231,338 B1* | 5/2001 | de Josselin de Jong | A61B 5/0088 433/29 |
| 6,239,705 B1* | 5/2001 | Glen | G08B 21/028 340/573.4 |
| 6,243,601 B1 | 6/2001 | Wist | |
| 6,263,234 B1* | 7/2001 | Engelhardt | A61B 5/0088 250/559.22 |
| 6,274,122 B1 | 8/2001 | Mclaughlin | |
| 6,283,761 B1 | 9/2001 | Joao | |
| 6,288,138 B1 | 9/2001 | Yamamoto | |
| 6,293,790 B1 | 9/2001 | Hilliard | |
| 6,299,438 B1* | 10/2001 | Sahagian | A61C 7/20 433/7 |
| 6,309,215 B1* | 10/2001 | Phan | A61C 9/00 433/24 |
| 6,313,432 B1 | 11/2001 | Nagata et al. | |
| 6,315,553 B1* | 11/2001 | Sachdeva | A61C 3/00 433/213 |
| 6,328,745 B1* | 12/2001 | Ascherman | A61B 17/663 606/86 R |
| 6,332,774 B1 | 12/2001 | Chikami | |
| 6,334,073 B1* | 12/2001 | Levine | A61B 5/4839 340/10.5 |
| 6,350,120 B1* | 2/2002 | Sachdeva | A61C 7/00 433/24 |
| 6,364,660 B1* | 4/2002 | Durbin | G06T 17/00 433/29 |
| 6,368,109 B2 | 4/2002 | Lindquist | A61C 9/0006 433/37 |
| 6,379,147 B1* | 4/2002 | Georgakis | A61C 9/0006 433/37 |
| 6,382,975 B1* | 5/2002 | Poirier | A61C 1/084 433/213 |
| 6,386,878 B1* | 5/2002 | Pavlovskaia | A61C 9/0046 433/215 |
| 6,394,802 B1 | 5/2002 | Hahn | |
| 6,402,510 B1* | 6/2002 | Williams | A61C 7/36 433/18 |
| 6,402,707 B1* | 6/2002 | Ernst | A61C 9/0046 433/29 |
| 6,405,729 B1* | 6/2002 | Thornton | A61M 16/0493 433/7 |
| 6,406,292 B1 | 6/2002 | Chishti et al. | |
| 6,409,504 B1* | 6/2002 | Jones | A61C 7/00 433/213 |
| 6,413,086 B1 | 7/2002 | Womack | |
| 6,414,264 B1 | 7/2002 | von Falkenhausen | |
| 6,414,708 B1 | 7/2002 | Carmeli et al. | |
| 6,435,871 B1 | 8/2002 | Inman | |
| 6,436,058 B1* | 8/2002 | Krahner | A63B 21/4025 600/587 |
| 6,441,354 B1 | 8/2002 | Seghatol et al. | |
| 6,450,167 B1* | 9/2002 | David | A61C 7/08 128/859 |
| 6,450,807 B1* | 9/2002 | Chishti | A61C 7/002 433/24 |
| 6,462,301 B1 | 10/2002 | Scott et al. | |
| 6,470,338 B1 | 10/2002 | Rizzo et al. | |
| 6,471,511 B1 | 10/2002 | Chishti et al. | |
| 6,471,512 B1 | 10/2002 | Sachdeva et al. | |
| 6,471,970 B1* | 10/2002 | Fanara | A61K 9/1274 514/786 |
| 6,482,002 B2 | 11/2002 | Jordan et al. | |
| 6,482,298 B1* | 11/2002 | Bhatnagar | C25D 5/10 204/194 |
| 6,491,037 B1 | 12/2002 | Mortenson | |
| 6,496,814 B1 | 12/2002 | Busche | |
| 6,496,816 B1 | 12/2002 | Thiesson et al. | |
| 6,499,026 B1 | 12/2002 | Rivette et al. | |
| 6,499,995 B1* | 12/2002 | Schwartz | A61C 7/00 264/21 |
| 6,507,832 B1 | 1/2003 | Evans et al. | |
| 6,512,994 B1 | 1/2003 | Sachdeva | |
| 6,514,074 B1* | 2/2003 | Chishti | A61C 9/0046 433/213 |
| 6,514,075 B1* | 2/2003 | Jacob | A61C 19/066 433/29 |
| 6,515,593 B1* | 2/2003 | Stark | A61B 5/411 340/870.07 |
| 6,516,288 B2 | 2/2003 | Bagne | |
| 6,516,805 B1* | 2/2003 | Thornton | A61M 16/00 128/859 |
| 6,520,772 B2* | 2/2003 | Williams | A61C 7/36 433/7 |
| 6,523,009 B1 | 2/2003 | Wilkins | |
| 6,523,019 B1 | 2/2003 | Borthwick | |
| 6,524,101 B1* | 2/2003 | Phan | A61C 7/08 433/24 |
| 6,526,168 B1 | 2/2003 | Ornes et al. | |
| 6,526,982 B1 | 3/2003 | Strong | |
| 6,529,891 B1 | 3/2003 | Heckerman | |
| 6,529,902 B1 | 3/2003 | Kanevsky et al. | |
| 6,532,455 B1 | 3/2003 | Martin et al. | |
| 6,535,865 B1 | 3/2003 | Skaaning et al. | |
| 6,540,512 B1 | 4/2003 | Sachdeva et al. | |
| 6,540,707 B1* | 4/2003 | Stark | A61F 5/02 602/19 |
| 6,542,593 B1 | 4/2003 | Amuah | |
| 6,542,881 B1 | 4/2003 | Meidan et al. | |
| 6,542,894 B1 | 4/2003 | Lee et al. | |
| 6,542,903 B2 | 4/2003 | Hull et al. | |
| 6,551,243 B2 | 4/2003 | Bocionek et al. | |
| 6,551,579 B2 | 4/2003 | Sagel et al. | |
| 6,554,613 B1* | 4/2003 | Sachdeva | A61C 7/00 433/24 |
| 6,554,837 B1 | 4/2003 | Hauri et al. | |
| 6,556,659 B1 | 4/2003 | Amuah | |
| 6,556,977 B1 | 4/2003 | Lapointe et al. | |
| 6,560,592 B1 | 5/2003 | Reid et al. | |
| 6,564,209 B1 | 5/2003 | Dempski et al. | |
| 6,567,814 B1 | 5/2003 | Bankier et al. | |
| 6,571,227 B1 | 5/2003 | Agrafiotis et al. | |
| 6,572,372 B1* | 6/2003 | Phan | A61C 7/08 433/18 |
| 6,573,998 B2* | 6/2003 | Cohen-Sabban | G01B 11/306 356/612 |
| 6,574,561 B2 | 6/2003 | Alexander et al. | |
| 6,578,003 B1 | 6/2003 | Camarda et al. | |
| 6,580,948 B2 | 6/2003 | Haupert et al. | |
| 6,587,529 B1 | 7/2003 | Staszewski et al. | |
| 6,587,828 B1 | 7/2003 | Sachdeva | |
| 6,592,368 B1 | 7/2003 | Weathers | |
| 6,594,539 B1* | 7/2003 | Geng | A61B 1/00193 264/16 |
| 6,595,342 B1 | 7/2003 | Maritzen et al. | |
| 6,597,934 B1* | 7/2003 | de Jong | G06T 1/0007 600/407 |
| 6,598,043 B1 | 7/2003 | Baclawski | |
| 6,599,250 B2 | 7/2003 | Webb et al. | |
| 6,602,070 B2* | 8/2003 | Miller | G16H 50/50 433/213 |

(56) References Cited

U.S. PATENT DOCUMENTS

| | | | |
|---|---|---|---|
| 6,604,527 B1 * | 8/2003 | Palmisano | A61C 7/08 128/859 |
| 6,606,744 B1 | 8/2003 | Mikurak | |
| 6,607,382 B1 * | 8/2003 | Kuo | A61P 1/02 433/80 |
| 6,611,783 B2 * | 8/2003 | Kelly, Jr. | A61B 5/1117 702/150 |
| 6,611,867 B1 | 8/2003 | Amuah | |
| 6,613,001 B1 * | 9/2003 | Dworkin | A61C 7/00 600/590 |
| 6,615,158 B2 | 9/2003 | Wenzel et al. | |
| 6,616,447 B1 * | 9/2003 | Rizoiu | A61C 19/063 433/29 |
| 6,616,579 B1 * | 9/2003 | Reinbold | A63B 21/0023 482/4 |
| 6,621,491 B1 * | 9/2003 | Baumrind | A61C 7/08 345/419 |
| 6,623,698 B2 * | 9/2003 | Kuo | A61B 10/0051 600/584 |
| 6,624,752 B2 | 9/2003 | Klitsgaard et al. | |
| 6,626,180 B1 * | 9/2003 | Kittelsen | A63B 71/085 128/862 |
| 6,626,569 B2 | 9/2003 | Reinstein et al. | |
| 6,626,669 B2 * | 9/2003 | Zegarelli | A61C 19/063 433/80 |
| 6,633,772 B2 | 10/2003 | Ford et al. | |
| 6,640,128 B2 * | 10/2003 | Vilsmeier | A61B 34/20 433/215 |
| 6,643,646 B2 | 11/2003 | Su et al. | |
| 6,647,383 B1 | 11/2003 | August et al. | |
| 6,650,944 B2 | 11/2003 | Goedeke et al. | |
| 6,671,818 B1 | 12/2003 | Mikurak | |
| 6,675,104 B2 | 1/2004 | Paulse et al. | |
| 6,678,669 B2 | 1/2004 | Lapointe et al. | |
| 6,681,767 B1 * | 1/2004 | Patton | A61M 15/0066 128/200.22 |
| 6,682,346 B2 | 1/2004 | Chishti et al. | |
| 6,685,469 B2 * | 2/2004 | Chishti | G16H 50/50 433/24 |
| 6,689,055 B1 | 2/2004 | Mullen et al. | |
| 6,690,761 B2 | 2/2004 | Lang et al. | |
| 6,691,110 B2 | 2/2004 | Wang et al. | |
| 6,694,234 B2 | 2/2004 | Lockwood et al. | |
| 6,697,164 B1 * | 2/2004 | Babayoff | G01B 11/24 356/601 |
| 6,697,793 B2 | 2/2004 | McGreevy | |
| 6,702,765 B2 * | 3/2004 | Robbins | A61B 5/682 600/590 |
| 6,702,804 B1 * | 3/2004 | Ritter | A61B 34/70 606/1 |
| 6,705,863 B2 * | 3/2004 | Phan | A61C 9/0046 |
| 6,729,876 B2 * | 5/2004 | Chishti | A61C 7/00 433/24 |
| 6,733,289 B2 * | 5/2004 | Manemann | G16H 20/40 433/24 |
| 6,736,638 B1 | 5/2004 | Sachdeva et al. | |
| 6,739,869 B1 | 5/2004 | Taub et al. | |
| 6,744,932 B1 | 6/2004 | Rubbert et al. | |
| 6,749,414 B1 * | 6/2004 | Hanson | B33Y 30/00 425/375 |
| 6,769,913 B2 | 8/2004 | Hurson | |
| 6,772,026 B2 | 8/2004 | Bradbury et al. | |
| 6,790,036 B2 | 9/2004 | Graham | |
| 6,802,713 B1 | 10/2004 | Chishti et al. | |
| 6,813,131 B2 | 11/2004 | Schmalz | |
| 6,814,085 B2 | 11/2004 | Brattesani et al. | |
| 6,814,574 B2 | 11/2004 | Abolfathi et al. | |
| 6,830,450 B2 * | 12/2004 | Knopp | B29C 43/56 433/18 |
| 6,832,912 B2 * | 12/2004 | Mao | A61C 7/22 433/24 |
| 6,832,914 B1 | 12/2004 | Bonnet et al. | |
| 6,843,370 B2 | 1/2005 | Tuneberg | |
| 6,845,175 B2 * | 1/2005 | Kopelman | A61B 6/51 382/294 |
| 6,885,464 B1 * | 4/2005 | Pfeiffer | A61B 5/0064 433/29 |
| 6,890,285 B2 * | 5/2005 | Rahman | A61B 5/4833 482/4 |
| 6,893,258 B1 * | 5/2005 | Kert | A61C 19/004 433/29 |
| 6,935,572 B1 | 8/2005 | Smole | |
| 6,951,254 B2 | 10/2005 | Morrison | |
| 6,976,841 B1 * | 12/2005 | Osterwalder | A61C 9/0006 433/29 |
| 6,978,268 B2 | 12/2005 | Thomas et al. | |
| 6,979,196 B2 | 12/2005 | Nikolskiy et al. | |
| 6,983,752 B2 | 1/2006 | Garabadian | |
| 6,984,128 B2 * | 1/2006 | Breining | A61K 45/06 433/24 |
| 6,988,893 B2 | 1/2006 | Haywood | |
| 7,016,952 B2 | 3/2006 | Mullen et al. | |
| 7,020,963 B2 | 4/2006 | Cleary et al. | |
| 7,036,514 B2 * | 5/2006 | Heck | A61C 5/90 128/859 |
| 7,040,896 B2 * | 5/2006 | Pavlovskaia | A61C 9/00 433/215 |
| 7,106,233 B2 * | 9/2006 | Schroeder | G01R 33/07 324/71.3 |
| 7,112,065 B2 * | 9/2006 | Kopelman | A61C 9/0046 433/213 |
| 7,121,825 B2 * | 10/2006 | Chishti | A61C 7/36 433/6 |
| 7,134,874 B2 | 11/2006 | Chishti et al. | |
| 7,137,812 B2 | 11/2006 | Cleary et al. | |
| 7,138,640 B1 * | 11/2006 | Delgado | G02B 27/0006 250/372 |
| 7,140,877 B2 | 11/2006 | Kaza | |
| 7,142,312 B2 * | 11/2006 | Quadling | A61C 9/0053 356/602 |
| 7,155,373 B2 | 12/2006 | Jordan et al. | |
| 7,156,655 B2 | 1/2007 | Sachdeva et al. | |
| 7,156,656 B2 * | 1/2007 | Duret | A61C 19/066 433/32 |
| 7,156,661 B2 | 1/2007 | Choi et al. | |
| 7,166,063 B2 | 1/2007 | Rahman et al. | |
| 7,184,150 B2 * | 2/2007 | Quadling | A61B 5/0066 356/602 |
| 7,191,451 B2 | 3/2007 | Nakagawa | |
| 7,192,273 B2 * | 3/2007 | McSurdy, Jr. | A61C 7/10 433/24 |
| 7,194,781 B1 | 3/2007 | Orjela | |
| 7,217,131 B2 | 5/2007 | Vuillemot | |
| 7,220,122 B2 | 5/2007 | Chishti | |
| 7,220,124 B2 * | 5/2007 | Taub | A61C 11/001 433/213 |
| 7,229,282 B2 | 6/2007 | Andreiko et al. | |
| 7,234,937 B2 | 6/2007 | Sachdeva et al. | |
| 7,241,142 B2 * | 7/2007 | Abolfathi | A61F 5/56 433/213 |
| 7,244,230 B2 | 7/2007 | Duggirala et al. | |
| 7,245,753 B2 | 7/2007 | Squilla et al. | |
| 7,257,136 B2 | 8/2007 | Mori et al. | |
| 7,286,954 B2 * | 10/2007 | Kopelman | G16Z 99/00 700/118 |
| 7,292,759 B2 * | 11/2007 | Boutoussov | A61B 90/30 385/119 |
| 7,294,141 B2 | 11/2007 | Bergersen | |
| 7,302,842 B2 * | 12/2007 | Biester | G01L 1/20 73/161 |
| 7,320,592 B2 | 1/2008 | Chishti et al. | |
| 7,320,595 B2 * | 1/2008 | Duret | A61C 19/06 433/32 |
| 7,328,706 B2 * | 2/2008 | Bardach | A63B 71/085 128/846 |
| 7,329,122 B1 * | 2/2008 | Scott | A61C 7/08 433/18 |
| 7,338,327 B2 * | 3/2008 | Sticker | H01R 31/06 439/638 |
| D565,509 S * | 4/2008 | Fechner | D13/133 |

(56) References Cited

U.S. PATENT DOCUMENTS

| | | | |
|---|---|---|---|
| 7,351,116 B2* | 4/2008 | Dold | H01R 9/2658 |
| | | | 439/954 |
| 7,354,270 B2 | 4/2008 | Abolfathi et al. | |
| 7,357,637 B2* | 4/2008 | Liechtung | A61C 13/0003 |
| | | | 433/167 |
| 7,435,083 B2 | 10/2008 | Chishti et al. | |
| 7,450,231 B2* | 11/2008 | Johs | G01N 21/211 |
| | | | 359/489.09 |
| 7,458,810 B2* | 12/2008 | Bergersen | B33Y 80/00 |
| | | | 433/6 |
| 7,460,230 B2* | 12/2008 | Johs | G02B 27/286 |
| | | | 356/369 |
| 7,462,076 B2* | 12/2008 | Walter | H01R 11/05 |
| | | | 439/441 |
| 7,463,929 B2* | 12/2008 | Simmons | A01K 15/021 |
| | | | 607/58 |
| 7,476,100 B2* | 1/2009 | Kuo | A61C 7/00 |
| | | | 433/24 |
| 7,500,851 B2* | 3/2009 | Williams | A61C 7/10 |
| | | | 433/7 |
| D594,413 S | 6/2009 | Palka et al. | |
| 7,543,511 B2 | 6/2009 | Kimura et al. | |
| 7,544,103 B2* | 6/2009 | Walter | H01R 4/4821 |
| | | | 439/441 |
| 7,553,157 B2* | 6/2009 | Abolfathi | A61C 7/00 |
| | | | 433/6 |
| 7,561,273 B2* | 7/2009 | Stautmeister | G01B 11/24 |
| | | | 356/445 |
| 7,572,124 B2* | 8/2009 | Cipolla | A61C 19/004 |
| | | | 433/29 |
| 7,577,284 B2* | 8/2009 | Wong | A61B 5/0088 |
| | | | 382/128 |
| 7,596,253 B2* | 9/2009 | Wong | A61B 5/0088 |
| | | | 382/128 |
| 7,597,594 B2* | 10/2009 | Stadler | H01R 4/30 |
| | | | 439/733.1 |
| 7,609,875 B2* | 10/2009 | Liu | G01B 11/24 |
| | | | 359/287 |
| D603,796 S* | 11/2009 | Sticker | D13/147 |
| 7,616,319 B1* | 11/2009 | Woollam | G01J 3/02 |
| | | | 356/369 |
| 7,626,705 B2* | 12/2009 | Altendorf | G01B 11/14 |
| | | | 356/445 |
| 7,632,216 B2 | 12/2009 | Rahman et al. | |
| 7,633,625 B1* | 12/2009 | Woollam | G01J 3/10 |
| | | | 356/369 |
| 7,637,262 B2* | 12/2009 | Bailey | A61F 5/566 |
| | | | 433/7 |
| 7,637,740 B2 | 12/2009 | Knopp | |
| 7,641,473 B2 | 1/2010 | Sporbert et al. | |
| 7,668,355 B2* | 2/2010 | Wong | A61B 5/0088 |
| | | | 382/128 |
| 7,670,179 B2* | 3/2010 | Muller | H01R 13/658 |
| | | | 439/607.17 |
| 7,695,327 B2* | 4/2010 | Bauerle | H01R 43/0263 |
| | | | 439/811 |
| 7,698,068 B2* | 4/2010 | Babayoff | G01J 3/0205 |
| | | | 702/19 |
| 7,711,447 B2 | 5/2010 | Lu et al. | |
| 7,724,378 B2 | 5/2010 | Babayoff | |
| D618,619 S | 6/2010 | Walter | |
| 7,728,848 B2* | 6/2010 | Petrov | G06T 17/20 |
| | | | 345/619 |
| 7,731,508 B2* | 6/2010 | Borst | H01R 9/2658 |
| | | | 439/76.1 |
| 7,735,217 B2* | 6/2010 | Borst | H05K 13/06 |
| | | | 29/729 |
| 7,740,476 B2 | 6/2010 | Rubbert et al. | |
| 7,744,369 B2 | 6/2010 | Imgrund et al. | |
| 7,746,339 B2 | 6/2010 | Matov et al. | |
| 7,780,460 B2* | 8/2010 | Walter | H01R 4/363 |
| | | | 439/81 |
| 7,787,132 B2* | 8/2010 | Korner | G01B 11/25 |
| | | | 356/601 |
| 7,791,810 B2* | 9/2010 | Powell | G02B 27/48 |
| | | | 359/199.1 |
| 7,796,243 B2 | 9/2010 | Choo-Smith et al. | |
| 7,806,687 B2* | 10/2010 | Minagi | A61C 19/05 |
| | | | 382/128 |
| 7,806,727 B2* | 10/2010 | Dold | H01R 24/64 |
| | | | 439/518 |
| 7,813,787 B2* | 10/2010 | de Josselin de Jong | |
| | | | A61B 1/247 |
| | | | 600/478 |
| 7,824,180 B2 | 11/2010 | Abolfathi et al. | |
| 7,828,601 B2* | 11/2010 | Pyczak | H05K 1/0228 |
| | | | 439/629 |
| 7,841,464 B2 | 11/2010 | Cinader et al. | |
| 7,845,969 B2* | 12/2010 | Stadler | H01R 9/2491 |
| | | | 439/441 |
| 7,854,609 B2 | 12/2010 | Chen et al. | |
| 7,862,336 B2* | 1/2011 | Kopelman | A61C 9/0053 |
| | | | 433/215 |
| 7,869,983 B2 | 1/2011 | Raby et al. | |
| 7,872,760 B2* | 1/2011 | Ertl | G01B 11/24 |
| | | | 356/497 |
| 7,874,836 B2 | 1/2011 | McSurdy, Jr. | |
| 7,874,837 B2 | 1/2011 | Chishti et al. | |
| 7,874,849 B2* | 1/2011 | Sticker | H01R 13/506 |
| | | | 439/607.46 |
| 7,878,801 B2* | 2/2011 | Abolfathi | A61C 19/063 |
| | | | 433/6 |
| 7,878,805 B2 | 2/2011 | Moss et al. | |
| 7,880,751 B2 | 2/2011 | Kuo et al. | |
| 7,892,474 B2* | 2/2011 | Shkolnik | B29C 64/135 |
| | | | 264/401 |
| 7,904,308 B2 | 3/2011 | Arnone et al. | |
| 7,905,724 B2 | 3/2011 | Kuo et al. | |
| 7,907,280 B2* | 3/2011 | Johs | G02B 5/3083 |
| | | | 356/369 |
| 7,929,151 B2* | 4/2011 | Liang | A61B 1/0625 |
| | | | 382/128 |
| 7,930,189 B2 | 4/2011 | Kuo | |
| 7,947,508 B2* | 5/2011 | Tricca | A61B 5/0088 |
| | | | 436/163 |
| 7,959,308 B2* | 6/2011 | Freeman | G02B 5/1814 |
| | | | 385/11 |
| 7,963,766 B2* | 6/2011 | Cronauer | A61C 7/00 |
| | | | 433/6 |
| 7,970,627 B2 | 6/2011 | Kuo et al. | |
| 7,985,414 B2 | 7/2011 | Knaack et al. | |
| 7,986,415 B2* | 7/2011 | Thiel | A61C 9/0053 |
| | | | 356/608 |
| 7,987,099 B2 | 7/2011 | Kuo et al. | |
| 7,991,485 B2 | 8/2011 | Zakim | |
| 8,017,891 B2* | 9/2011 | Nevin | H05B 3/286 |
| | | | 219/549 |
| 8,026,916 B2* | 9/2011 | Wen | A61C 9/0046 |
| | | | 345/419 |
| 8,027,709 B2* | 9/2011 | Arnone | A61B 6/512 |
| | | | 600/407 |
| 8,029,277 B2 | 10/2011 | Imgrund et al. | |
| 8,038,444 B2* | 10/2011 | Kitching | A61C 7/00 |
| | | | 433/213 |
| 8,045,772 B2* | 10/2011 | Kosuge | G06T 7/33 |
| | | | 382/128 |
| 8,054,556 B2* | 11/2011 | Chen | G02B 17/0852 |
| | | | 359/728 |
| 8,070,490 B1* | 12/2011 | Roetzer | A61C 5/85 |
| | | | 433/142 |
| 8,075,306 B2 | 12/2011 | Kitching et al. | |
| 8,077,949 B2* | 12/2011 | Liang | A61B 1/00186 |
| | | | 356/497 |
| 8,083,556 B2* | 12/2011 | Stadler | H01R 4/4821 |
| | | | 439/834 |
| D652,799 S* | 1/2012 | Mueller | D13/133 |
| 8,092,215 B2 | 1/2012 | Stone-Collonge et al. | |
| 8,095,383 B2 | 1/2012 | Arnone et al. | |
| 8,099,268 B2 | 1/2012 | Kitching et al. | |

(56) References Cited

U.S. PATENT DOCUMENTS

| | | | |
|---|---|---|---|
| 8,099,305 B2 | 1/2012 | Kuo et al. | |
| 8,108,189 B2 | 1/2012 | Chelnokov et al. | |
| 8,118,592 B2* | 2/2012 | Tortorici | A61C 7/08 |
| | | | 433/18 |
| 8,126,025 B2 | 2/2012 | Takeda | |
| 8,136,529 B2 | 3/2012 | Kelly | |
| 8,144,954 B2* | 3/2012 | Quadling | G06T 15/04 |
| | | | 382/128 |
| 8,160,334 B2* | 4/2012 | Thiel | A61C 9/006 |
| | | | 382/206 |
| 8,172,569 B2* | 5/2012 | Matty | A61C 19/066 |
| | | | 433/80 |
| 8,197,252 B1 | 6/2012 | Harrison | |
| 8,201,560 B2* | 6/2012 | Dembro | A61F 5/566 |
| | | | 433/7 |
| 8,215,312 B2* | 7/2012 | Garabadian | A61F 5/566 |
| | | | 433/7 |
| 8,240,018 B2* | 8/2012 | Walter | H01R 4/484 |
| | | | 29/244 |
| 8,275,180 B2 | 9/2012 | Kuo | |
| 8,279,450 B2* | 10/2012 | Oota | A61B 1/24 |
| | | | 433/29 |
| 8,292,617 B2 | 10/2012 | Brandt et al. | |
| 8,294,657 B2* | 10/2012 | Kim | G09G 3/3688 |
| | | | 345/100 |
| 8,296,952 B2* | 10/2012 | Greenberg | B21F 43/00 |
| | | | 29/896.11 |
| 8,297,286 B2* | 10/2012 | Smernoff | A61H 1/02 |
| | | | 128/857 |
| 8,306,608 B2* | 11/2012 | Mandelis | A61B 5/349 |
| | | | 433/29 |
| 8,314,764 B2* | 11/2012 | Kim | H03F 3/45475 |
| | | | 345/98 |
| 8,332,015 B2* | 12/2012 | Ertl | A61B 5/0088 |
| | | | 600/478 |
| 8,354,588 B2* | 1/2013 | Sticker | H01R 13/447 |
| | | | 174/67 |
| 8,366,479 B2* | 2/2013 | Borst | H01R 12/7064 |
| | | | 439/567 |
| 8,401,826 B2 | 3/2013 | Cheng et al. | |
| 8,419,428 B2 | 4/2013 | Lawrence | |
| 8,433,083 B2* | 4/2013 | Abolfathi | B33Y 80/00 |
| | | | 381/322 |
| 8,439,672 B2 | 5/2013 | Matov et al. | |
| 8,465,280 B2* | 6/2013 | Sachdeva | G16H 50/50 |
| | | | 433/24 |
| 8,477,320 B2* | 7/2013 | Stock | A61B 5/0068 |
| | | | 356/601 |
| 8,488,113 B2* | 7/2013 | Thiel | G01J 3/02 |
| | | | 356/73 |
| 8,517,726 B2 | 8/2013 | Kakavand et al. | |
| 8,520,922 B2* | 8/2013 | Wang | G06T 7/0012 |
| | | | 382/128 |
| 8,520,925 B2* | 8/2013 | Duret | A61B 1/247 |
| | | | 382/128 |
| 8,523,565 B2 | 9/2013 | Matty et al. | |
| 8,545,221 B2 | 10/2013 | Stone-Collonge et al. | |
| 8,556,625 B2* | 10/2013 | Lovely | A61B 5/0088 |
| | | | 600/407 |
| 8,570,530 B2* | 10/2013 | Liang | G01B 11/25 |
| | | | 356/601 |
| 8,573,224 B2* | 11/2013 | Thornton | A61F 5/566 |
| | | | 433/214 |
| 8,577,212 B2* | 11/2013 | Thiel | G01B 11/24 |
| | | | 348/46 |
| 8,601,925 B1 | 12/2013 | Coto | |
| 8,639,477 B2 | 1/2014 | Chelnokov et al. | |
| 8,650,586 B2* | 2/2014 | Lee | H04N 21/44218 |
| | | | 725/20 |
| 8,675,706 B2* | 3/2014 | Seurin | F21L 4/02 |
| | | | 372/87 |
| 8,723,029 B2* | 5/2014 | Pyczak | H02G 1/00 |
| | | | 174/33 |
| 8,738,394 B2 | 5/2014 | Kuo | |
| 8,743,923 B2* | 6/2014 | Geske | G01S 7/4815 |
| | | | 372/50.12 |
| 8,753,114 B2 | 6/2014 | Vuillemot | |
| 8,767,270 B2* | 7/2014 | Curry | H04N 1/047 |
| | | | 359/290 |
| 8,768,016 B2 | 7/2014 | Pan et al. | |
| 8,776,391 B1* | 7/2014 | Kaza | A61C 13/00 |
| | | | 34/317 |
| 8,839,476 B2* | 9/2014 | Adachi | A46B 15/0034 |
| | | | 433/32 |
| 8,843,381 B2 | 9/2014 | Kuo et al. | |
| 8,856,053 B2 | 10/2014 | Mah | |
| 8,870,566 B2* | 10/2014 | Bergersen | A61C 7/002 |
| | | | 433/6 |
| 8,874,452 B2 | 10/2014 | Kuo | |
| 8,878,905 B2* | 11/2014 | Fisker | G01B 11/2518 |
| | | | 348/46 |
| 8,899,976 B2* | 12/2014 | Chen | A61C 7/00 |
| | | | 433/6 |
| 8,936,463 B2* | 1/2015 | Mason | A61C 7/08 |
| | | | 433/167 |
| 8,940,033 B2* | 1/2015 | Dwyer | A61C 19/066 |
| | | | 362/249.02 |
| 8,944,812 B2 | 2/2015 | Kuo | |
| 8,948,482 B2* | 2/2015 | Levin | A61B 6/512 |
| | | | 382/128 |
| 8,956,058 B2* | 2/2015 | Rosch | G02B 6/4246 |
| | | | 81/3.44 |
| 8,992,216 B2* | 3/2015 | Karazivan | A61B 5/0088 |
| | | | 433/29 |
| 9,004,915 B2 | 4/2015 | Moss et al. | |
| 9,022,792 B2* | 5/2015 | Sticker | H01R 13/6592 |
| | | | 439/98 |
| 9,039,418 B1* | 5/2015 | Rubbert | H04N 1/00026 |
| | | | 433/215 |
| 9,066,777 B2* | 6/2015 | Gill | F21V 19/02 |
| 9,084,535 B2* | 7/2015 | Girkin | G01N 21/49 |
| 9,084,657 B2 | 7/2015 | Matty et al. | |
| 9,108,338 B2* | 8/2015 | Sirovskiy | B29C 51/422 |
| 9,144,512 B2* | 9/2015 | Wagner | A61C 7/006 |
| 9,192,305 B2* | 11/2015 | Levin | A61B 5/0088 |
| 9,204,952 B2* | 12/2015 | Lampalzer | A61C 9/006 |
| 9,211,166 B2 | 12/2015 | Kuo et al. | |
| 9,214,014 B2 | 12/2015 | Levin | |
| 9,220,580 B2 | 12/2015 | Borovinskih et al. | |
| 9,241,774 B2 | 1/2016 | Li et al. | |
| 9,242,118 B2* | 1/2016 | Brawn | A61C 7/06 |
| 9,256,710 B2 | 2/2016 | Boltunov et al. | |
| 9,261,358 B2* | 2/2016 | Atiya | A61B 1/0605 |
| 9,277,972 B2 | 3/2016 | Brandt et al. | |
| 9,336,336 B2* | 5/2016 | Deichmann | A61C 5/77 |
| 9,351,810 B2* | 5/2016 | Moon | A61C 7/10 |
| 9,375,300 B2* | 6/2016 | Matov | A61C 7/08 |
| 9,403,238 B2 | 8/2016 | Culp | |
| 9,408,743 B1* | 8/2016 | Wagner | A61F 5/566 |
| 9,414,895 B2* | 8/2016 | Clark | A61C 5/85 |
| 9,414,897 B2 | 8/2016 | Wu et al. | |
| 9,433,476 B2* | 9/2016 | Khardekar | G06F 30/00 |
| 9,439,568 B2* | 9/2016 | Atiya | G01B 11/30 |
| 9,444,981 B2* | 9/2016 | Bellis | H04N 23/50 |
| 9,463,287 B1* | 10/2016 | Lorberbaum | A61B 34/30 |
| 9,492,243 B2 | 11/2016 | Kuo | |
| 9,500,635 B2* | 11/2016 | Islam | G01N 21/359 |
| 9,506,808 B2* | 11/2016 | Jeon | G01J 1/0233 |
| 9,510,918 B2 | 12/2016 | Sanchez | |
| 9,545,331 B2* | 1/2017 | Ingemarsson-Matzen | A61F 5/566 |
| 9,566,132 B2 | 2/2017 | Stone-Collonge et al. | |
| 9,584,771 B2 | 2/2017 | Mandelis | A61B 5/0073 |
| 9,589,329 B2 | 3/2017 | Levin | |
| 9,622,840 B2* | 4/2017 | Sagel | A61K 8/22 |
| 9,622,841 B2* | 4/2017 | Ajiki | A61C 1/0007 |
| 9,636,198 B2* | 5/2017 | Kodama | A61C 19/063 |
| 9,675,427 B2 | 6/2017 | Kopelman | |
| 9,675,430 B2* | 6/2017 | Verker | G02B 23/2446 |

(56) References Cited

U.S. PATENT DOCUMENTS

| | | | |
|---|---|---|---|
| 9,693,839 B2* | 7/2017 | Atiya | A61C 9/0066 |
| D795,439 S * | 8/2017 | Mounce | D24/181 |
| 9,730,769 B2 | 8/2017 | Chen et al. | |
| 9,730,780 B2* | 8/2017 | Brawn | A61C 7/08 |
| 9,744,006 B2* | 8/2017 | Ross | A61C 7/36 |
| 9,763,760 B2* | 9/2017 | Senn | A61C 1/0015 |
| 9,820,829 B2 | 11/2017 | Kuo | |
| 9,830,688 B2 | 11/2017 | Levin | |
| D806,248 S | 12/2017 | Makel et al. | |
| 9,839,500 B2* | 12/2017 | Flyash | A61C 19/066 |
| 9,844,421 B2 | 12/2017 | Moss et al. | |
| 9,848,985 B2 | 12/2017 | Yang et al. | |
| 9,861,451 B1 | 1/2018 | Davis | |
| 9,913,992 B2* | 3/2018 | Demarest | A61C 19/066 |
| 9,936,186 B2* | 4/2018 | Jesenko | A61C 9/004 |
| 9,962,238 B2 | 5/2018 | Boltunov et al. | |
| 9,974,630 B2* | 5/2018 | Heacock | A61C 1/0046 |
| 10,123,706 B2* | 11/2018 | Elbaz | G06T 17/00 |
| 10,123,853 B2 | 11/2018 | Moss et al. | |
| D836,204 S * | 12/2018 | Montgomery | D24/181 |
| 10,154,889 B2 | 12/2018 | Chen et al. | |
| 10,159,541 B2* | 12/2018 | Bindayel | A61B 5/6802 |
| 10,172,693 B2 | 1/2019 | Brandt et al. | |
| 10,195,690 B2 | 2/2019 | Culp | |
| 10,220,221 B2* | 3/2019 | Wu | A61N 5/0603 |
| 10,231,801 B2 | 3/2019 | Korytov et al. | |
| 10,238,472 B2 | 3/2019 | Levin | |
| 10,248,883 B2* | 4/2019 | Borovinskih | G06T 5/20 |
| 10,258,432 B2 | 4/2019 | Webber | |
| 11,666,801 B2* | 6/2023 | Meyer | A61M 16/0488 482/13 |
| 2001/0002310 A1* | 5/2001 | Chishti | A61C 7/08 345/20 |
| 2001/0032100 A1 | 10/2001 | Mahmud et al. | |
| 2001/0038705 A1* | 11/2001 | Rubbert | B33Y 50/00 382/128 |
| 2001/0041320 A1 | 11/2001 | Phan et al. | |
| 2002/0004727 A1 | 1/2002 | Knaus et al. | |
| 2002/0007284 A1 | 1/2002 | Schurenberg et al. | |
| 2002/0010568 A1* | 1/2002 | Rubbert | A61C 7/146 703/6 |
| 2002/0015934 A1* | 2/2002 | Rubbert | A61C 7/146 433/29 |
| 2002/0025503 A1 | 2/2002 | Chapoulaud et al. | |
| 2002/0026105 A1 | 2/2002 | Drazen | |
| 2002/0028417 A1 | 3/2002 | Chapoulaud et al. | |
| 2002/0035572 A1 | 3/2002 | Takatori et al. | |
| 2002/0064752 A1 | 5/2002 | Durbin et al. | |
| 2002/0064759 A1* | 5/2002 | Durbin | A61C 13/0004 433/213 |
| 2002/0087551 A1 | 7/2002 | Hickey et al. | |
| 2002/0094509 A1 | 7/2002 | Durbin et al. | |
| 2002/0107853 A1 | 8/2002 | Hofmann et al. | |
| 2002/0150859 A1 | 10/2002 | Imgrund et al. | |
| 2002/0188478 A1 | 12/2002 | Breeland et al. | |
| 2002/0192617 A1 | 12/2002 | Phan et al. | |
| 2003/0000927 A1 | 1/2003 | Kanaya et al. | |
| 2003/0008259 A1 | 1/2003 | Kuo et al. | |
| 2003/0009252 A1* | 1/2003 | Pavlovskaia | B33Y 50/00 700/98 |
| 2003/0019848 A1 | 1/2003 | Nicholas et al. | |
| 2003/0021453 A1 | 1/2003 | Weise et al. | |
| 2003/0035061 A1* | 2/2003 | Iwaki | G06T 17/10 348/E5.029 |
| 2003/0049581 A1* | 3/2003 | DeLuke | A61C 7/10 433/7 |
| 2003/0057192 A1 | 3/2003 | Patel | |
| 2003/0059736 A1 | 3/2003 | Lai et al. | |
| 2003/0060532 A1 | 3/2003 | Subelka et al. | |
| 2003/0068598 A1* | 4/2003 | Vallittu | A61K 6/884 433/167 |
| 2003/0095697 A1 | 5/2003 | Wood et al. | |
| 2003/0101079 A1 | 5/2003 | McLaughlin | |
| 2003/0103060 A1 | 6/2003 | Anderson et al. | |
| 2003/0120517 A1 | 6/2003 | Eida et al. | |
| 2003/0139834 A1* | 7/2003 | Nikolskiy | G06G 7/48 700/98 |
| 2003/0144886 A1 | 7/2003 | Taira | |
| 2003/0148243 A1* | 8/2003 | Kerschbaumer | A61B 1/00052 433/29 |
| 2003/0172043 A1 | 9/2003 | Guyon et al. | |
| 2003/0190575 A1* | 10/2003 | Hilliard | A61C 7/08 433/6 |
| 2003/0192867 A1 | 10/2003 | Yamazaki et al. | |
| 2003/0207224 A1* | 11/2003 | Lotte | A61C 7/08 433/6 |
| 2003/0211440 A1 | 11/2003 | Kuo et al. | |
| 2003/0215764 A1 | 11/2003 | Kopelman et al. | |
| 2003/0224311 A1* | 12/2003 | Cronauer | A61C 7/08 433/20 |
| 2003/0224313 A1 | 12/2003 | Bergersen | |
| 2003/0224314 A1 | 12/2003 | Bergersen | |
| 2004/0002873 A1 | 1/2004 | Sachdeva | |
| 2004/0009449 A1* | 1/2004 | Mah | A61C 7/10 433/7 |
| 2004/0013994 A1 | 1/2004 | Goldberg et al. | |
| 2004/0019262 A1* | 1/2004 | Perelgut | A61B 8/0875 600/407 |
| 2004/0029078 A1 | 2/2004 | Marshall | |
| 2004/0038168 A1* | 2/2004 | Choi | A61C 7/00 433/213 |
| 2004/0054304 A1* | 3/2004 | Raby | G06T 7/73 600/590 |
| 2004/0054358 A1 | 3/2004 | Cox et al. | |
| 2004/0058295 A1* | 3/2004 | Bergersen | A61C 7/08 433/6 |
| 2004/0068199 A1 | 4/2004 | Echauz et al. | |
| 2004/0078222 A1 | 4/2004 | Khan et al. | |
| 2004/0080621 A1 | 4/2004 | Fisher et al. | |
| 2004/0094165 A1* | 5/2004 | Cook | A63B 71/085 128/861 |
| 2004/0107118 A1 | 6/2004 | Harnsberger et al. | |
| 2004/0115587 A1* | 6/2004 | Breining | A61K 38/1866 433/24 |
| 2004/0133083 A1 | 7/2004 | Comaniciu et al. | |
| 2004/0152036 A1 | 8/2004 | Abolfathi | |
| 2004/0158194 A1* | 8/2004 | Wolff | A61C 19/063 604/66 |
| 2004/0166463 A1 | 8/2004 | Wen et al. | |
| 2004/0167646 A1* | 8/2004 | Jelonek | A61C 13/0004 707/999.107 |
| 2004/0170941 A1 | 9/2004 | Phan et al. | |
| 2004/0193036 A1 | 9/2004 | Zhou et al. | |
| 2004/0197728 A1 | 10/2004 | Abolfathi et al. | |
| 2004/0214128 A1 | 10/2004 | Sachdeva et al. | |
| 2004/0219473 A1* | 11/2004 | Cleary | A61C 7/146 433/9 |
| 2004/0219479 A1 | 11/2004 | Malin et al. | |
| 2004/0220691 A1* | 11/2004 | Hofmeister | A61C 13/0004 700/98 |
| 2004/0224286 A1 | 11/2004 | Kaza et al. | |
| 2004/0229185 A1 | 11/2004 | Knopp | |
| 2004/0259049 A1 | 12/2004 | Kopelman et al. | |
| 2005/0003318 A1 | 1/2005 | Choi et al. | |
| 2005/0023356 A1* | 2/2005 | Wiklof | G01B 11/2513 235/462.42 |
| 2005/0031196 A1* | 2/2005 | Moghaddam | G06T 17/00 382/154 |
| 2005/0037312 A1* | 2/2005 | Uchida | A61C 7/00 433/18 |
| 2005/0038669 A1 | 2/2005 | Sachdeva et al. | |
| 2005/0040551 A1 | 2/2005 | Biegler et al. | |
| 2005/0042569 A1 | 2/2005 | Plan et al. | |
| 2005/0042577 A1 | 2/2005 | Kvitrud et al. | |
| 2005/0048433 A1* | 3/2005 | Hilliard | A61C 7/00 433/24 |
| 2005/0074717 A1* | 4/2005 | Cleary | A61C 19/004 433/29 |
| 2005/0089822 A1 | 4/2005 | Geng | |
| 2005/0100333 A1* | 5/2005 | Kerschbaumer | A61B 1/0676 396/16 |

(56) References Cited

U.S. PATENT DOCUMENTS

| | | |
|---|---|---|
| 2005/0108052 A1 | 5/2005 | Omaboe |
| 2005/0131738 A1 | 6/2005 | Morris |
| 2005/0144150 A1 | 6/2005 | Ramamurthy et al. |
| 2005/0171594 A1 | 8/2005 | Machan et al. |
| 2005/0171630 A1 | 8/2005 | Dinauer et al. |
| 2005/0181333 A1* | 8/2005 | Karazivan ............ A61B 5/417 433/29 |
| 2005/0186524 A1* | 8/2005 | Abolfathi ............... A61C 7/10 433/7 |
| 2005/0186526 A1* | 8/2005 | Stewart ............ A61K 38/1866 433/24 |
| 2005/0216314 A1 | 9/2005 | Secor |
| 2005/0233276 A1* | 10/2005 | Kopelman ............. A61C 7/08 433/3 |
| 2005/0239013 A1* | 10/2005 | Sachdeva ............ A61C 7/146 433/24 |
| 2005/0244781 A1 | 11/2005 | Abels et al. |
| 2005/0244791 A1 | 11/2005 | Davis et al. |
| 2005/0271996 A1 | 12/2005 | Sporbert et al. |
| 2006/0056670 A1 | 3/2006 | Hamadeh |
| 2006/0057533 A1 | 3/2006 | McGann |
| 2006/0063135 A1* | 3/2006 | Mehl ................ G06F 18/28 433/213 |
| 2006/0068353 A1* | 3/2006 | Abolfathi ............... A61C 7/00 433/2 |
| 2006/0078842 A1 | 4/2006 | Sachdeva et al. |
| 2006/0084024 A1* | 4/2006 | Farrell ................ A61C 7/08 128/861 |
| 2006/0093982 A1 | 5/2006 | Wen |
| 2006/0098007 A1* | 5/2006 | Rouet ................ G06T 7/12 345/419 |
| 2006/0099545 A1 | 5/2006 | Lia et al. |
| 2006/0099546 A1* | 5/2006 | Bergersen ............. A61C 7/36 433/6 |
| 2006/0110698 A1 | 5/2006 | Robson |
| 2006/0111631 A1* | 5/2006 | Kelliher .............. G06T 5/50 600/425 |
| 2006/0115782 A1 | 6/2006 | Li et al. |
| 2006/0115785 A1* | 6/2006 | Li ..................... A61P 29/00 433/80 |
| 2006/0116561 A1* | 6/2006 | Tricca ............... A61B 5/0088 600/309 |
| 2006/0137813 A1 | 6/2006 | Robrecht et al. |
| 2006/0147872 A1* | 7/2006 | Andreiko ............. A61C 7/14 433/24 |
| 2006/0154198 A1* | 7/2006 | Durbin ............... G06T 17/00 433/29 |
| 2006/0154207 A1 | 7/2006 | Kuo |
| 2006/0154209 A1* | 7/2006 | Hayman ............. A61C 19/004 433/215 |
| 2006/0166157 A1* | 7/2006 | Rahman ............. A61B 5/4833 433/6 |
| 2006/0173715 A1 | 8/2006 | Wang |
| 2006/0183082 A1 | 8/2006 | Quadling et al. |
| 2006/0188834 A1* | 8/2006 | Hilliard ............... A61C 7/08 433/24 |
| 2006/0188848 A1 | 8/2006 | Tricca et al. |
| 2006/0194163 A1 | 8/2006 | Tricca et al. |
| 2006/0199153 A1 | 9/2006 | Liu et al. |
| 2006/0204078 A1 | 9/2006 | Orth et al. |
| 2006/0223022 A1* | 10/2006 | Solomon ............. A61C 7/08 433/8 |
| 2006/0223023 A1 | 10/2006 | Lai et al. |
| 2006/0223032 A1* | 10/2006 | Fried ................ A61B 5/0088 433/29 |
| 2006/0223342 A1* | 10/2006 | Borst ................ H01R 9/2608 439/55 |
| 2006/0234179 A1* | 10/2006 | Wen ................... A61C 7/00 433/6 |
| 2006/0257815 A1 | 11/2006 | De Dominicis |
| 2006/0275729 A1* | 12/2006 | Fornoff ............... A61C 7/16 433/49 |
| 2006/0275731 A1 | 12/2006 | Wen et al. |
| 2006/0275736 A1* | 12/2006 | Wen ................... A61C 9/00 433/213 |
| 2006/0277075 A1 | 12/2006 | Salwan |
| 2006/0290693 A1* | 12/2006 | Zhou ................ G06T 13/20 345/423 |
| 2006/0292520 A1 | 12/2006 | Dillon et al. |
| 2007/0015112 A1* | 1/2007 | Hochman ............. A61B 8/546 433/215 |
| 2007/0031775 A1* | 2/2007 | Andreiko ............. A61C 7/146 433/24 |
| 2007/0046865 A1* | 3/2007 | Umeda ............... G02B 5/3083 349/96 |
| 2007/0053048 A1* | 3/2007 | Kumar ................ G03C 1/73 359/241 |
| 2007/0054237 A1 | 3/2007 | Neuschafer |
| 2007/0065768 A1 | 3/2007 | Nadav |
| 2007/0087300 A1* | 4/2007 | Willison ............... A61C 7/12 433/6 |
| 2007/0087302 A1 | 4/2007 | Reising et al. |
| 2007/0106138 A1* | 5/2007 | Beiski ................ A61B 5/682 600/549 |
| 2007/0122592 A1 | 5/2007 | Anderson et al. |
| 2007/0128574 A1 | 6/2007 | Kuo et al. |
| 2007/0141525 A1 | 6/2007 | Cinader, Jr. |
| 2007/0141526 A1 | 6/2007 | Eisenberg et al. |
| 2007/0143135 A1 | 6/2007 | Lindquist et al. |
| 2007/0168152 A1* | 7/2007 | Matov ................ A61C 7/002 702/155 |
| 2007/0172112 A1* | 7/2007 | Paley ................ A61C 13/0022 382/128 |
| 2007/0172291 A1 | 7/2007 | Yokoyama |
| 2007/0178420 A1 | 8/2007 | Keski-Nisula et al. |
| 2007/0181144 A1* | 8/2007 | Brown ................ A61K 8/02 132/321 |
| 2007/0183633 A1 | 8/2007 | Hoffmann |
| 2007/0184402 A1* | 8/2007 | Boutoussov ......... A61B 5/0088 433/29 |
| 2007/0185732 A1 | 8/2007 | Hicks et al. |
| 2007/0192137 A1 | 8/2007 | Ombrellaro |
| 2007/0199929 A1 | 8/2007 | Rippl et al. |
| 2007/0207434 A1 | 9/2007 | Kuo et al. |
| 2007/0207441 A1 | 9/2007 | Lauren |
| 2007/0215582 A1 | 9/2007 | Roeper et al. |
| 2007/0218422 A1 | 9/2007 | Ehrenfeld |
| 2007/0231765 A1* | 10/2007 | Phan ................ A61C 19/003 433/6 |
| 2007/0238065 A1* | 10/2007 | Sherwood ............ A61C 7/08 433/24 |
| 2007/0239488 A1 | 10/2007 | DeRosso |
| 2007/0263226 A1 | 11/2007 | Kurtz et al. |
| 2008/0013727 A1 | 1/2008 | Uemura |
| 2008/0020350 A1* | 1/2008 | Matov ................ G06T 17/20 433/213 |
| 2008/0038684 A1 | 2/2008 | Keating et al. |
| 2008/0045053 A1* | 2/2008 | Stadler ............... H01R 4/4823 439/55 |
| 2008/0057461 A1* | 3/2008 | Cheng ................ A61C 7/00 433/24 |
| 2008/0057467 A1 | 3/2008 | Gittelson |
| 2008/0057478 A1 | 3/2008 | Choi |
| 2008/0057479 A1* | 3/2008 | Grenness ............ A61C 9/0053 700/59 |
| 2008/0059238 A1 | 3/2008 | Park et al. |
| 2008/0062429 A1 | 3/2008 | Liang et al. |
| 2008/0090208 A1* | 4/2008 | Rubbert ............. A61C 13/0003 433/173 |
| 2008/0094389 A1* | 4/2008 | Rouet ................ G06T 7/149 345/419 |
| 2008/0113317 A1 | 5/2008 | Kemp et al. |
| 2008/0115791 A1* | 5/2008 | Heine ................ A61F 5/566 128/848 |
| 2008/0118882 A1 | 5/2008 | Su |
| 2008/0118886 A1 | 5/2008 | Liang et al. |
| 2008/0119698 A1* | 5/2008 | Tricca ................ A61B 5/682 600/309 |
| 2008/0141534 A1 | 6/2008 | Hilliard |
| 2008/0169122 A1 | 7/2008 | Shiraishi et al. |

(56) References Cited

U.S. PATENT DOCUMENTS

| | | | |
|---|---|---|---|
| 2008/0171934 A1* | 7/2008 | Greenan | A61B 5/06 606/108 |
| 2008/0176448 A1* | 7/2008 | Muller | H01R 13/65914 439/607.01 |
| 2008/0182218 A1* | 7/2008 | Chen | A61C 19/063 433/80 |
| 2008/0233530 A1 | 9/2008 | Cinader | |
| 2008/0242144 A1* | 10/2008 | Dietz | H01R 43/20 439/540.1 |
| 2008/0248443 A1 | 10/2008 | Chishti et al. | |
| 2008/0254403 A1 | 10/2008 | Hilliard | |
| 2008/0268400 A1 | 10/2008 | Moss et al. | |
| 2008/0306724 A1 | 12/2008 | Kitching et al. | |
| 2009/0029310 A1 | 1/2009 | Pumphrey et al. | |
| 2009/0030290 A1 | 1/2009 | Kozuch et al. | |
| 2009/0030347 A1* | 1/2009 | Cao | G01L 5/1627 433/18 |
| 2009/0038623 A1* | 2/2009 | Farbarik | A61F 2/02 320/108 |
| 2009/0040740 A1* | 2/2009 | Muller | H05K 5/0247 361/785 |
| 2009/0061379 A1* | 3/2009 | Yamamoto | A61C 7/00 433/18 |
| 2009/0061381 A1* | 3/2009 | Durbin | A61C 13/0004 433/213 |
| 2009/0075228 A1* | 3/2009 | Kumada | A61B 5/0088 433/29 |
| 2009/0087050 A1* | 4/2009 | Gandyra | G01C 11/02 382/128 |
| 2009/0098502 A1 | 4/2009 | Andreiko | |
| 2009/0099445 A1 | 4/2009 | Burger | |
| 2009/0103579 A1 | 4/2009 | Ushimaru et al. | |
| 2009/0105523 A1 | 4/2009 | Kassayan et al. | |
| 2009/0117507 A1* | 5/2009 | Abolfathi | A61C 7/00 433/80 |
| 2009/0130620 A1* | 5/2009 | Yazdi | A61C 7/10 433/7 |
| 2009/0136890 A1* | 5/2009 | Kang | A61C 7/14 433/10 |
| 2009/0136893 A1 | 5/2009 | Zegarelli | |
| 2009/0148809 A1* | 6/2009 | Kuo | G06F 30/00 700/98 |
| 2009/0170050 A1 | 7/2009 | Marcus | |
| 2009/0181346 A1* | 7/2009 | Orth | A61C 13/0022 433/201.1 |
| 2009/0191502 A1 | 7/2009 | Cao et al. | |
| 2009/0210032 A1* | 8/2009 | Beiski | A61N 1/0548 264/16 |
| 2009/0218514 A1* | 9/2009 | Klunder | G01N 21/6452 250/459.1 |
| 2009/0281433 A1 | 11/2009 | Saadat et al. | |
| 2009/0286195 A1 | 11/2009 | Sears et al. | |
| 2009/0298017 A1 | 12/2009 | Boerjes et al. | |
| 2009/0305540 A1* | 12/2009 | Stadler | H01R 13/514 439/310 |
| 2009/0316966 A1 | 12/2009 | Marshall et al. | |
| 2009/0317757 A1 | 12/2009 | Lemchen | |
| 2010/0015565 A1 | 1/2010 | Carrillo Gonzalez et al. | |
| 2010/0019170 A1* | 1/2010 | Hart | A61C 19/04 250/459.1 |
| 2010/0028825 A1 | 2/2010 | Lemchen | |
| 2010/0045902 A1* | 2/2010 | Ikeda | G02B 5/045 359/485.06 |
| 2010/0062394 A1 | 3/2010 | Jones et al. | |
| 2010/0068676 A1 | 3/2010 | Mason et al. | |
| 2010/0138025 A1 | 6/2010 | Morton et al. | |
| 2010/0142789 A1* | 6/2010 | Chang | G01R 33/5608 600/410 |
| 2010/0145664 A1* | 6/2010 | Hultgren | A61C 7/00 703/2 |
| 2010/0145898 A1* | 6/2010 | Malfliet | G06V 20/20 703/1 |
| 2010/0152599 A1* | 6/2010 | DuHamel | A61B 5/0803 713/153 |
| 2010/0165275 A1* | 7/2010 | Tsukamoto | G02B 5/3083 359/486.01 |
| 2010/0167225 A1* | 7/2010 | Kuo | A61C 7/002 702/137 |
| 2010/0179789 A1 | 7/2010 | Sachdeva et al. | |
| 2010/0193482 A1 | 8/2010 | Ow et al. | |
| 2010/0196837 A1 | 8/2010 | Farrell | |
| 2010/0216085 A1* | 8/2010 | Kopelman | G05B 17/02 700/98 |
| 2010/0217130 A1 | 8/2010 | Weinlaender | |
| 2010/0231577 A1* | 9/2010 | Kim | G09G 3/3648 345/212 |
| 2010/0268363 A1* | 10/2010 | Karim | A61C 13/0022 700/98 |
| 2010/0268515 A1* | 10/2010 | Vogt | G06T 17/20 703/2 |
| 2010/0279243 A1 | 11/2010 | Cinader et al. | |
| 2010/0280798 A1 | 11/2010 | Pattijn | |
| 2010/0281370 A1* | 11/2010 | Rohaly | A61C 9/0053 715/810 |
| 2010/0303316 A1* | 12/2010 | Bullis | A61B 5/055 382/128 |
| 2010/0312484 A1* | 12/2010 | DuHamel | A61B 5/4818 702/19 |
| 2010/0327461 A1 | 12/2010 | Co et al. | |
| 2011/0007920 A1* | 1/2011 | Abolfathi | H04R 25/606 381/326 |
| 2011/0012901 A1* | 1/2011 | Kaplanyan | G06T 15/506 345/426 |
| 2011/0045428 A1* | 2/2011 | Boltunov | A61C 7/08 433/24 |
| 2011/0056350 A1 | 3/2011 | Gale et al. | |
| 2011/0065060 A1 | 3/2011 | Teixeira et al. | |
| 2011/0081625 A1* | 4/2011 | Fuh | A61C 13/01 433/167 |
| 2011/0091832 A1* | 4/2011 | Kim | B29C 64/00 700/119 |
| 2011/0102549 A1* | 5/2011 | Takahashi | A61C 1/084 348/46 |
| 2011/0102566 A1* | 5/2011 | Zakian | A61B 5/0086 348/66 |
| 2011/0104630 A1* | 5/2011 | Matov | A61C 9/004 703/1 |
| 2011/0136072 A1* | 6/2011 | Li | A61C 7/14 433/18 |
| 2011/0136090 A1 | 6/2011 | Kazemi | |
| 2011/0143300 A1* | 6/2011 | Villaalba | A61C 7/10 433/7 |
| 2011/0143673 A1* | 6/2011 | Landesman | H01Q 1/1257 455/63.1 |
| 2011/0159452 A1* | 6/2011 | Huang | A61C 7/146 433/24 |
| 2011/0164810 A1* | 7/2011 | Zang | G06T 19/003 382/154 |
| 2011/0207072 A1 | 8/2011 | Schiemann | |
| 2011/0212420 A1 | 9/2011 | Vuillemot | |
| 2011/0220623 A1 | 9/2011 | Beutler | |
| 2011/0235045 A1* | 9/2011 | Koerner | G02B 21/0056 356/451 |
| 2011/0269092 A1* | 11/2011 | Kuo | A61C 7/002 433/215 |
| 2011/0316994 A1* | 12/2011 | Lemchen | A61C 9/008 348/66 |
| 2012/0021375 A1* | 1/2012 | Binner | A61B 5/097 433/89 |
| 2012/0028210 A1 | 2/2012 | Hegyi et al. | |
| 2012/0029883 A1* | 2/2012 | Heinz | G06T 19/00 703/1 |
| 2012/0040311 A1* | 2/2012 | Nilsson | G16H 20/40 433/214 |
| 2012/0064477 A1* | 3/2012 | Schmitt | A61C 9/0053 433/44 |
| 2012/0081786 A1* | 4/2012 | Mizuyama | G02B 27/48 359/619 |

(56) References Cited

U.S. PATENT DOCUMENTS

| | | | |
|---|---|---|---|
| 2012/0086681 A1* | 4/2012 | Kim | G09G 3/3648 345/204 |
| 2012/0115107 A1* | 5/2012 | Adams | A61B 5/4542 433/215 |
| 2012/0129117 A1* | 5/2012 | McCance | A61C 7/10 433/7 |
| 2012/0147912 A1* | 6/2012 | Moench | H01S 5/1021 372/50.1 |
| 2012/0150494 A1 | 6/2012 | Anderson et al. | |
| 2012/0166213 A1 | 6/2012 | Arnone et al. | |
| 2012/0172678 A1* | 7/2012 | Logan | A61B 5/1118 600/301 |
| 2012/0281293 A1* | 11/2012 | Gronenborn | H01S 5/423 359/619 |
| 2012/0295216 A1* | 11/2012 | Dykes | A61C 19/04 433/27 |
| 2012/0322025 A1* | 12/2012 | Ozawa | G01B 9/02091 433/29 |
| 2013/0029284 A1* | 1/2013 | Teasdale | A61C 7/146 433/6 |
| 2013/0081272 A1* | 4/2013 | Johnson | A61C 13/0004 29/896.1 |
| 2013/0089828 A1* | 4/2013 | Borovinskih | A61C 19/05 433/24 |
| 2013/0095446 A1* | 4/2013 | Andreiko | A61C 7/08 128/848 |
| 2013/0103176 A1* | 4/2013 | Kopelman | G06F 30/00 700/98 |
| 2013/0110469 A1* | 5/2013 | Kopelman | A61B 5/0088 703/1 |
| 2013/0150689 A1 | 6/2013 | Shaw-Klein | |
| 2013/0163627 A1* | 6/2013 | Seurin | H01S 5/02345 372/36 |
| 2013/0201488 A1* | 8/2013 | Ishihara | G02B 21/0044 356/609 |
| 2013/0204599 A1 | 8/2013 | Matov et al. | |
| 2013/0209952 A1* | 8/2013 | Kuo | A61C 7/12 433/10 |
| 2013/0235165 A1* | 9/2013 | Gharib | H04N 13/207 348/50 |
| 2013/0252195 A1* | 9/2013 | Popat | A61C 7/10 433/7 |
| 2013/0266326 A1* | 10/2013 | Joseph | H04B 10/1141 398/130 |
| 2013/0278396 A1* | 10/2013 | Kimmel | A61B 5/682 340/12.5 |
| 2013/0280671 A1* | 10/2013 | Brawn | A61N 5/0613 433/29 |
| 2013/0286174 A1* | 10/2013 | Urakabe | A61B 1/04 348/66 |
| 2013/0293824 A1* | 11/2013 | Yoneyama | G02B 5/3016 156/60 |
| 2013/0323664 A1* | 12/2013 | Parker | A61C 7/20 433/7 |
| 2013/0323671 A1* | 12/2013 | Dillon | A61B 5/0088 433/29 |
| 2013/0323674 A1* | 12/2013 | Hakomori | A61B 1/043 433/29 |
| 2013/0325431 A1 | 12/2013 | See et al. | |
| 2013/0330684 A1 | 12/2013 | Dillon et al. | |
| 2013/0337412 A1* | 12/2013 | Kwon | A61C 13/12 433/223 |
| 2014/0061974 A1* | 3/2014 | Tyler | B29C 64/393 264/401 |
| 2014/0081091 A1* | 3/2014 | Abolfathi | A61B 5/0006 600/595 |
| 2014/0093160 A1* | 4/2014 | Porikli | G06T 7/277 382/170 |
| 2014/0106289 A1* | 4/2014 | Kozlowski | A61C 7/20 433/24 |
| 2014/0122027 A1* | 5/2014 | Andreiko | A61B 1/24 703/1 |
| 2014/0136222 A1 | 5/2014 | Arnone et al. | |
| 2014/0142902 A1* | 5/2014 | Chelnokov | A61C 7/002 703/1 |
| 2014/0178829 A1 | 6/2014 | Kim | |
| 2014/0186794 A1 | 7/2014 | Deichmann et al. | |
| 2014/0255865 A1 | 9/2014 | Gautam | |
| 2014/0265034 A1* | 9/2014 | Dudley | B33Y 30/00 264/401 |
| 2014/0272774 A1* | 9/2014 | Dillon | A61B 1/0005 433/29 |
| 2014/0280376 A1 | 9/2014 | Kuo | |
| 2014/0294273 A1* | 10/2014 | Jaisson | A61B 5/0035 382/131 |
| 2014/0313299 A1* | 10/2014 | Gebhardt | A61B 1/24 348/66 |
| 2014/0329194 A1* | 11/2014 | Sachdeva | A61C 7/002 433/24 |
| 2014/0335469 A1* | 11/2014 | Boyden | A61C 7/20 433/215 |
| 2014/0342301 A1 | 11/2014 | Fleer et al. | |
| 2014/0350354 A1 | 11/2014 | Stenzler et al. | |
| 2014/0363778 A1* | 12/2014 | Parker | A61C 8/0096 433/18 |
| 2015/0002649 A1* | 1/2015 | Nowak | G01B 11/2513 348/77 |
| 2015/0004553 A1 | 1/2015 | Li et al. | |
| 2015/0021210 A1* | 1/2015 | Kesling | B65D 77/2024 206/63.5 |
| 2015/0044628 A1* | 2/2015 | Flyash | A61C 17/16 433/32 |
| 2015/0079531 A1* | 3/2015 | Heine | A61C 7/08 433/19 |
| 2015/0094564 A1 | 4/2015 | Tashman et al. | |
| 2015/0097315 A1* | 4/2015 | DeSimone | B29C 64/40 425/166 |
| 2015/0097316 A1 | 4/2015 | DeSimone et al. | |
| 2015/0102532 A1 | 4/2015 | DeSimone et al. | |
| 2015/0132708 A1 | 5/2015 | Kuo | |
| 2015/0140502 A1* | 5/2015 | Brawn | A61C 7/08 433/29 |
| 2015/0150501 A1 | 6/2015 | George et al. | |
| 2015/0164335 A1* | 6/2015 | Van Der Poel | A61B 5/7425 433/29 |
| 2015/0173856 A1* | 6/2015 | Lowe | A61C 7/00 433/2 |
| 2015/0182303 A1 | 7/2015 | Abraham et al. | |
| 2015/0216626 A1* | 8/2015 | Ranjbar | A61C 7/08 433/24 |
| 2015/0216716 A1 | 8/2015 | Anitua Aldecoa | |
| 2015/0230885 A1* | 8/2015 | Wucher | A61C 7/002 433/2 |
| 2015/0238280 A1* | 8/2015 | Wu | A61C 7/36 433/24 |
| 2015/0238283 A1* | 8/2015 | Tanugula | A61C 7/08 700/98 |
| 2015/0306486 A1 | 10/2015 | Logan et al. | |
| 2015/0320320 A1* | 11/2015 | Kopelman | A61B 5/486 433/215 |
| 2015/0320532 A1* | 11/2015 | Matty | A61C 7/08 433/6 |
| 2015/0325044 A1* | 11/2015 | Lebovitz | G06T 15/04 345/420 |
| 2015/0338209 A1* | 11/2015 | Knüttel | G01B 9/02027 356/51 |
| 2015/0351638 A1 | 12/2015 | Amato | |
| 2015/0374469 A1 | 12/2015 | Konno et al. | |
| 2016/0000332 A1* | 1/2016 | Atiya | G01B 11/24 433/29 |
| 2016/0000526 A1* | 1/2016 | Tam | A61C 7/002 433/24 |
| 2016/0003610 A1* | 1/2016 | Lampert | G02B 23/26 356/4.01 |
| 2016/0022185 A1 | 1/2016 | Agarwal et al. | |
| 2016/0042509 A1* | 2/2016 | Andreiko | A61B 6/51 382/128 |
| 2016/0051345 A1 | 2/2016 | Levin | |

(56) References Cited

U.S. PATENT DOCUMENTS

| | | | |
|---|---|---|---|
| 2016/0064898 A1* | 3/2016 | Atiya | H01S 5/06817 356/601 |
| 2016/0067013 A1* | 3/2016 | Morton | G06F 17/10 703/2 |
| 2016/0074144 A1* | 3/2016 | Peterson | A61C 19/004 433/29 |
| 2016/0081768 A1* | 3/2016 | Kopelman | A61C 7/10 433/6 |
| 2016/0081769 A1* | 3/2016 | Kimura | A61C 7/10 433/7 |
| 2016/0095668 A1 | 4/2016 | Kuo et al. | |
| 2016/0100924 A1 | 4/2016 | Wilson et al. | |
| 2016/0106520 A1 | 4/2016 | Borovinskih et al. | |
| 2016/0120621 A1 | 5/2016 | Li et al. | |
| 2016/0135924 A1* | 5/2016 | Choi | A61C 7/002 433/2 |
| 2016/0135925 A1* | 5/2016 | Mason | A61C 7/002 703/2 |
| 2016/0163115 A1* | 6/2016 | Furst | G06V 10/751 433/29 |
| 2016/0217708 A1* | 7/2016 | Levin | G06T 1/0007 |
| 2016/0220105 A1 | 8/2016 | Durent | |
| 2016/0220200 A1 | 8/2016 | Sandholm et al. | |
| 2016/0225151 A1* | 8/2016 | Cocco | G06T 7/13 |
| 2016/0228213 A1* | 8/2016 | Tod | G16H 10/20 |
| 2016/0242871 A1* | 8/2016 | Morton | A61C 7/002 |
| 2016/0246936 A1* | 8/2016 | Kahn | H04L 65/4025 |
| 2016/0262856 A1* | 9/2016 | Atiya | A61B 5/4547 |
| 2016/0287358 A1 | 10/2016 | Nowak et al. | |
| 2016/0296303 A1* | 10/2016 | Parker | A61N 1/0548 |
| 2016/0302885 A1 | 10/2016 | Matov et al. | |
| 2016/0328843 A1* | 11/2016 | Graham | A61C 9/006 |
| 2016/0338799 A1 | 11/2016 | Wu et al. | |
| 2016/0346063 A1* | 12/2016 | Schulhof | A61C 7/002 |
| 2016/0367188 A1 | 12/2016 | Malik et al. | |
| 2016/0367339 A1 | 12/2016 | Khardekar et al. | |
| 2017/0007365 A1* | 1/2017 | Kopelman | A61C 7/002 |
| 2017/0007366 A1* | 1/2017 | Kopelman | A61C 13/0019 |
| 2017/0007367 A1 | 1/2017 | Li et al. | |
| 2017/0007368 A1 | 1/2017 | Boronkay | |
| 2017/0020633 A1 | 1/2017 | Stone-Collonge et al. | |
| 2017/0049326 A1 | 2/2017 | Alfano et al. | |
| 2017/0056131 A1 | 3/2017 | Alauddin et al. | |
| 2017/0071705 A1 | 3/2017 | Kuo | |
| 2017/0080249 A1* | 3/2017 | Brawn | A61N 5/0603 |
| 2017/0086943 A1 | 3/2017 | Mah | |
| 2017/0100209 A1 | 4/2017 | Wen | |
| 2017/0100212 A1 | 4/2017 | Sherwood et al. | |
| 2017/0100213 A1 | 4/2017 | Kuo | |
| 2017/0100214 A1 | 4/2017 | Wen | |
| 2017/0105815 A1 | 4/2017 | Matov et al. | |
| 2017/0135792 A1* | 5/2017 | Webber | A61C 7/146 |
| 2017/0135793 A1* | 5/2017 | Webber | A61B 1/00045 |
| 2017/0156821 A1 | 6/2017 | Kopelman et al. | |
| 2017/0165032 A1 | 6/2017 | Webber et al. | |
| 2017/0173354 A1* | 6/2017 | Demarest | A61N 5/0613 |
| 2017/0173355 A1* | 6/2017 | Demarest | A61N 5/0603 |
| 2017/0173356 A1* | 6/2017 | Demarest | A61N 5/0603 |
| 2017/0173357 A1* | 6/2017 | Demarest | A61C 19/066 |
| 2017/0173358 A1* | 6/2017 | Demarest | A61C 19/066 |
| 2017/0181815 A1 | 6/2017 | Pulido et al. | |
| 2017/0197090 A1* | 7/2017 | Newman | A61C 19/066 |
| 2017/0215739 A1 | 8/2017 | Miyasato | |
| 2017/0251954 A1 | 9/2017 | Lotan et al. | |
| 2017/0258555 A1 | 9/2017 | Kopelman | |
| 2017/0265970 A1 | 9/2017 | Verker | |
| 2017/0319054 A1 | 11/2017 | Miller et al. | |
| 2017/0319296 A1* | 11/2017 | Webber | A61C 7/146 |
| 2017/0325690 A1 | 11/2017 | Salah et al. | |
| 2017/0340411 A1 | 11/2017 | Akselrod | |
| 2017/0340415 A1 | 11/2017 | Choi et al. | |
| 2018/0000563 A1 | 1/2018 | Shanjani et al. | |
| 2018/0000565 A1 | 1/2018 | Shanjani et al. | |
| 2018/0028064 A1 | 2/2018 | Elbaz et al. | |
| 2018/0028065 A1 | 2/2018 | Elbaz et al. | |
| 2018/0055602 A1 | 3/2018 | Kopelman et al. | |
| 2018/0071054 A1 | 3/2018 | Ha | |
| 2018/0071055 A1 | 3/2018 | Kuo | |
| 2018/0071065 A1* | 3/2018 | Flyash | A61C 19/066 |
| 2018/0085059 A1 | 3/2018 | Lee | |
| 2018/0096465 A1 | 4/2018 | Levin | |
| 2018/0125610 A1 | 5/2018 | Carrier et al. | |
| 2018/0153648 A1 | 6/2018 | Shanjani et al. | |
| 2018/0153649 A1 | 6/2018 | Wu et al. | |
| 2018/0153733 A1 | 6/2018 | Kuo | |
| 2018/0168788 A1 | 6/2018 | Fernie | |
| 2018/0177570 A1* | 6/2018 | Alauddin | A61C 19/04 |
| 2018/0192877 A1 | 7/2018 | Atiya et al. | |
| 2018/0206957 A1* | 7/2018 | Ruth | A61C 7/023 |
| 2018/0221110 A1 | 8/2018 | Boltunov et al. | |
| 2018/0228359 A1 | 8/2018 | Meyer et al. | |
| 2018/0280118 A1 | 10/2018 | Cramer | |
| 2018/0284727 A1 | 10/2018 | Cramer et al. | |
| 2018/0318043 A1 | 11/2018 | Li et al. | |
| 2018/0333226 A1* | 11/2018 | Tsai | B29C 51/46 |
| 2018/0353062 A1 | 12/2018 | Makmel | |
| 2018/0353264 A1 | 12/2018 | Riley et al. | |
| 2018/0360567 A1 | 12/2018 | Xue et al. | |
| 2018/0368944 A1 | 12/2018 | Sato et al. | |
| 2018/0368961 A1 | 12/2018 | Shanjani et al. | |
| 2019/0019187 A1 | 1/2019 | Miller et al. | |
| 2019/0021817 A1 | 1/2019 | Sato et al. | |
| 2019/0026599 A1 | 1/2019 | Salah et al. | |
| 2019/0029522 A1 | 1/2019 | Sato et al. | |
| 2019/0029784 A1 | 1/2019 | Moalem et al. | |
| 2019/0046296 A1 | 2/2019 | Kopelman et al. | |
| 2019/0046297 A1* | 2/2019 | Kopelman | A61C 19/003 |
| 2019/0069975 A1 | 3/2019 | Cam et al. | |
| 2019/0076026 A1 | 3/2019 | Elbaz et al. | |
| 2019/0076214 A1 | 3/2019 | Nyukhtikov et al. | |
| 2019/0076216 A1 | 3/2019 | Moss et al. | |
| 2019/0076334 A1* | 3/2019 | Alauddin | A61K 6/40 |
| 2019/0090983 A1 | 3/2019 | Webber et al. | |
| 2019/0183614 A1 | 6/2019 | Levin | |
| 2019/0247147 A1* | 8/2019 | Grande | A61C 7/08 |
| 2019/0388208 A1* | 12/2019 | Whitney | B08B 7/0057 |
| 2020/0060797 A1* | 2/2020 | Sachdeva | A61C 7/10 |
| 2020/0229750 A1* | 7/2020 | Vanravenhorst-Bell | A61B 5/0088 |
| 2021/0259812 A1* | 8/2021 | O'Leary | A61C 7/002 |
| 2022/0168072 A1* | 6/2022 | Tong | A61C 7/002 |
| 2022/0183795 A1* | 6/2022 | Webber | A61C 7/146 |
| 2022/0241052 A1* | 8/2022 | Shanjani | A61C 7/08 |
| 2022/0266577 A1* | 8/2022 | Sharma | B32B 27/08 |

FOREIGN PATENT DOCUMENTS

| | | |
|---|---|---|
| CA | 1121955 A1 | 4/1982 |
| CN | 1655732 A | 8/2005 |
| CN | 1655733 A | 8/2005 |
| CN | 1867317 A | 11/2006 |
| CN | 102017658 A | 4/2011 |
| CN | 103889364 A | 6/2014 |
| CN | 204092220 U | 1/2015 |
| CN | 105496575 A | 4/2016 |
| CN | 105997274 A | 10/2016 |
| DE | 2749802 A1 | 5/1978 |
| DE | 3526198 A1 | 2/1986 |
| DE | 4123352 A1 | 1/1993 |
| DE | 4207169 A1 | 9/1993 |
| DE | 69327661 T2 | 7/2000 |
| DE | 102005043627 A1 | 3/2007 |
| DE | 202010017014 U1 | 3/2011 |
| DE | 102011051443 A1 | 1/2013 |
| DE | 202012011899 U1 | 1/2013 |
| DE | 102014225457 A1 | 6/2016 |
| EP | 0428152 A1 | 5/1991 |
| EP | 490848 A2 | 6/1992 |
| EP | 541500 A1 | 5/1993 |
| EP | 714632 B1 | 5/1997 |
| EP | 774933 B1 | 12/2000 |
| EP | 731673 B1 | 5/2001 |
| EP | 1941843 A2 | 7/2008 |

(56) References Cited

FOREIGN PATENT DOCUMENTS

| | | | |
|---|---|---|---|
| EP | 2437027 A2 | 4/2012 | |
| EP | 2447754 A1 | 5/2012 | |
| EP | 1989764 B1 | 7/2012 | |
| EP | 2332221 B1 | 11/2012 | |
| EP | 2596553 B1 | 12/2013 | |
| EP | 2612300 B1 | 2/2015 | |
| EP | 2848229 A1 | 3/2015 | |
| EP | 3323377 A1 * | 5/2018 | ............... A61C 7/02 |
| ES | 463897 A1 | 1/1980 | |
| ES | 2455066 A1 | 4/2014 | |
| FR | 2369828 A1 | 6/1978 | |
| FR | 2867377 | 9/2005 | |
| FR | 2930334 A1 | 10/2009 | |
| GB | 529805 A | 11/1940 | |
| GB | 710764 A | 6/1954 | |
| GB | 761565 A | 11/1956 | |
| GB | 905213 A | 9/1962 | |
| GB | 1274283 A | 5/1972 | |
| GB | 1550777 A | 8/1979 | |
| JP | 53-058191 A | 5/1978 | |
| JP | 4028359 A | 1/1992 | |
| JP | 08-508174 A | 9/1996 | |
| JP | 09-19443 A | 1/1997 | |
| JP | 2003245289 A | 9/2003 | |
| JP | 2000339468 A | 9/2004 | |
| JP | 2005527320 A | 9/2005 | |
| JP | 2005527321 A | 9/2005 | |
| JP | 2006043121 | 2/2006 | |
| JP | 2007151614 A | 6/2007 | |
| JP | 2007260158 A | 10/2007 | |
| JP | 2007537824 A | 12/2007 | |
| JP | 2008067732 A | 3/2008 | |
| JP | 2008523370 A | 7/2008 | |
| JP | 04184427 B1 | 11/2008 | |
| JP | 2009000412 A | 1/2009 | |
| JP | 2009018173 A | 1/2009 | |
| JP | 2009078133 A | 4/2009 | |
| JP | 2009101386 A | 5/2009 | |
| JP | 2009205330 A | 9/2009 | |
| JP | 2010017726 A | 1/2010 | |
| JP | 2011087733 A | 5/2011 | |
| JP | 2012045143 A | 3/2012 | |
| JP | 2013007645 A | 1/2013 | |
| JP | 2013192865 A | 9/2013 | |
| JP | 201735173 A | 2/2017 | |
| KR | 10-20020062793 A | 7/2002 | |
| KR | 10-20070108019 A | 11/2007 | |
| KR | 10-20090065778 A | 6/2009 | |
| KR | 10-1266966 B1 | 5/2013 | |
| KR | 10-2016-041632 A | 4/2016 | |
| KR | 10-2016-0071127 A | 6/2016 | |
| KR | 10-1675089 B1 | 11/2016 | |
| TW | 480166 B | 3/2002 | |
| WO | WO91/004713 A1 | 4/1991 | |
| WO | WO92/03102 A1 | 3/1992 | |
| WO | WO94/010935 A1 | 5/1994 | |
| WO | WO96/23452 A1 | 8/1996 | |
| WO | WO98/032394 A1 | 7/1998 | |
| WO | WO98/044865 A1 | 10/1998 | |
| WO | WO01/08592 A1 | 2/2001 | |
| WO | WO01/85047 A2 | 11/2001 | |
| WO | WO02/017776 A2 | 3/2002 | |
| WO | WO02/024100 A1 | 3/2002 | |
| WO | WO02/058583 A1 | 8/2002 | |
| WO | WO02/062252 A1 | 8/2002 | |
| WO | WO02/095475 A1 | 11/2002 | |
| WO | WO03/003932 A2 | 1/2003 | |
| WO | WO2004/030565 A1 | 4/2004 | |
| WO | WO-2004041106 A1 * | 5/2004 | ........... A61C 19/063 |
| WO | WO2005/114183 A1 | 12/2005 | |
| WO | WO2006/065955 A2 | 6/2006 | |
| WO | WO2006/085851 A1 | 8/2006 | |
| WO | WO2006/096558 A2 | 9/2006 | |
| WO | WO2006/100700 A1 | 9/2006 | |
| WO | WO2006/133548 A1 | 12/2006 | |
| WO | WO2007/019709 A2 | 2/2007 | |
| WO | WO2007/071341 A1 | 6/2007 | |
| WO | WO2007/103377 A2 | 9/2007 | |
| WO | WO2008/115654 A1 | 9/2008 | |
| WO | WO-2008137069 A2 * | 11/2008 | ........... A61C 19/063 |
| WO | WO2009/016645 A2 | 2/2009 | |
| WO | WO2009/085752 A2 | 7/2009 | |
| WO | WO2009/089129 A1 | 7/2009 | |
| WO | WO2009/146788 A1 | 12/2009 | |
| WO | WO2009/146789 A1 | 12/2009 | |
| WO | WO2010/059988 A1 | 5/2010 | |
| WO | WO2010/123892 A2 | 10/2010 | |
| WO | WO2011/021099 A2 | 2/2011 | |
| WO | WO2012/007003 A1 | 1/2012 | |
| WO | WO2012/064684 A2 | 5/2012 | |
| WO | WO2012/074304 A2 | 6/2012 | |
| WO | WO2012/078980 A2 | 6/2012 | |
| WO | WO2012/083968 A1 | 6/2012 | |
| WO | WO2012/140021 A2 | 10/2012 | |
| WO | WO2013/058879 A2 | 4/2013 | |
| WO | WO2014/068107 A1 | 5/2014 | |
| WO | WO2014/091865 A1 | 6/2014 | |
| WO | WO2014/143911 A1 | 9/2014 | |
| WO | WO2015/015289 A2 | 2/2015 | |
| WO | WO2015/063032 A1 | 5/2015 | |
| WO | WO2015/112638 A1 | 7/2015 | |
| WO | WO2015/176004 A1 | 11/2015 | |
| WO | WO2016/004415 A1 | 1/2016 | |
| WO | WO2016/042393 A1 | 3/2016 | |
| WO | WO2016/061279 A1 | 4/2016 | |
| WO | WO2016/084066 A1 | 6/2016 | |
| WO | WO2016/099471 A1 | 6/2016 | |
| WO | WO2016/113745 A1 | 7/2016 | |
| WO | WO2016/116874 A1 | 7/2016 | |
| WO | WO2016/200177 A1 | 12/2016 | |
| WO | WO2017/006176 A1 | 1/2017 | |
| WO | WO-2017010669 A1 * | 1/2017 | ............... A61C 7/02 |
| WO | WO2017/182654 A1 | 10/2017 | |
| WO | WO2018/057547 A1 | 3/2018 | |
| WO | WO2018/085718 A2 | 5/2018 | |
| WO | WO-2018232113 A1 * | 12/2018 | ............. A61C 7/002 |
| WO | WO2019/018784 A1 | 1/2019 | |
| WO | WO-2023034876 A2 * | 3/2023 | ............. A61C 7/002 |

OTHER PUBLICATIONS

AADR. American Association for Dental Research; Summary of Activities; Los Angeles, CA; p. 195; Mar. 20-23,(year of pub. sufficiently earlier than effective US filing date and any foreign priority date) 1980.

Alcaniz et al.; An Advanced System for the Simulation and Planning of Orthodontic Treatments; Karl Heinz Hohne and Ron Kikinis (eds.); Visualization in Biomedical Computing, 4th Intl. Conf, VBC '96, Hamburg, Germany; Springer-Verlag; pp. 511-520; Sep. 22-25, 1996.

Alexander et al.; The DigiGraph Work Station Part 2 Clinical Management; J. Clin. Orthod.; pp. 402-407; (Author Manuscript); Jul. 1990.

Align Technology; Align technology announces new teen solution with introduction of invisalign teen with mandibular advancement; 2 pages; retrieved from the internet (http://investor.aligntech.com/static-files/eb4fa6bb-3e62-404f-b74d-32059366a01b); Mar. 6, 2017.

Allesee Orthodontic Appliance: Important Tip About Wearing the Red White & Blue Active Clear Retainer System; Allesee Orthodontic Appliances-Pro Lab; 1 page; (year of pub. sufficiently earlier than effective US filing date and any foreign priority date); 1998.

Allesee Orthodontic Appliances: DuraClearTM; Product information; 1 page; (year of pub. sufficiently earlier than effective US filing date and any foreign priority date) 1997.

Allesee Orthodontic Appliances; The Choice Is Clear: Red, White & Blue . . . The Simple, Affordable, No-Braces Treatment; ( product information for doctors); retrieved from the internet (http://ormco.com/aoa/appliancesservices/RWB/doctorhtml); 5 pages on May 19, 2003.

(56) References Cited

OTHER PUBLICATIONS

Allesee Orthodontic Appliances; The Choice Is Clear: Red, White & Blue . . . The Simple, Affordable, No-Braces Treatment; (product information), 6 pages; (year of pub. sufficiently earlier than effective US filing date and any foreign priority date) 2003.

Allesee Orthodontic Appliances; The Choice is Clear: Red, White & Blue . . . The Simple, Affordable, No-Braces Treatment;(Patient Information); retrieved from the internet (http://ormco.com/aoa/appliancesservices/RWB/patients.html); 2 pages on May 19, 2003.

Allesee Orthodontic Appliances; The Red, White & Blue Way to Improve Your Smile; (information for patients), 2 pages; (year of pub. sufficiently earlier than effective US filing date and any foreign priority date) 1992.

Allesee Orthodontic Appliances; You may be a candidate for this invisible no-braces treatment; product information for patients; 2 pages; (year of pub. sufficiently earlier than effective US filing date and any foreign priority date) 2002.

Altschuler et al.; Analysis of 3-D Data for Comparative 3-D Serial Growth Pattern Studies of Oral-Facial Structures; AADR Abstracts, Program and Abstracts of Papers, 57th General Session, IADR Annual Session, Mar. 29, 1979-Apr. 1, 1979, New Orleans Marriot; Journal of Dental Research; vol. 58, Special Issue A, p. 221; Jan. 1979.

Altschuler et al.; Laser Electro-Optic System for Rapid Three-Dimensional (3D) Topographic Mapping of Surfaces; Optical Engineering; 20(6); pp. 953-961; Dec. 1981.

Altschuler et al.; Measuring Surfaces Space-Coded by a Laser-Projected Dot Matrix; SPIE Imaging q Applications for Automated Industrial Inspection and Assembly; vol. 182; pp. 187-191; Oct. 10, 1979.

Altschuler; 3D Mapping of Maxillo-Facial Prosthesis; AADR Abstract #607; 2 pages total, (year of pub. sufficiently earlier than effective US filing date and any foreign priority date) 1980.

Alves et al.; New trends in food allergens detection: toward biosensing strategies; Critical Reviews in Food Science and Nutrition; 56(14); pp. 2304-2319; doi: 10.1080/10408398.2013.831026; Oct. 2016.

Andersson et al.; Clinical Results with Titanium Crowns Fabricated with Machine Duplication and Spark Erosion; Acta Odontologica Scandinavica; 47(5); pp. 279-286; Oct. 1989.

Andrews, The Six Keys to Optimal Occlusion Straight Wire, Chapter 3, L.A. Wells; pp. 13-24; (year of pub. sufficiently earlier than effective US filing date and any foreign priority date) 1989.

Arakawa et al.; Mouthguard biosensor with telemetry system for monitoring of saliva glucose: A novel cavitas sensor; Biosensors and Bioelectronics; 84; pp. 106-111; Oct. 2016.

Bandodkar et al.; All-printed magnetically self-healing electrochemical devices; Science Advances; 2(11); 11 pages; e1601465; Nov. 2016.

Bandodkar et al.; Self-healing inks for autonomous repair of printable electrochemical devices; Advanced Electronic Materials; 1(12); 5 pages; 1500289; Dec. 2015.

Bandodkar et al.; Wearable biofuel cells: a review; Electroanalysis; 28(6); pp. 1188-1200; Jun. 2016.

Bandodkar et al.; Wearable chemical sensors: present challenges and future prospects; Acs Sensors; 1(5); pp. 464-482; May 11, 2016.

Barone et al.; Creation of 3D multi-body orthodontic models by using independent imaging sensors; Sensors; 13(2); pp. 2033-2050; Feb. 5, 2013.

Bartels et al.; An Introduction to Splines for Use in Computer Graphics and Geometric Modeling; Morgan Kaufmann Publishers; pp. 422-425 Jan. 1, 1987.

Baumrind et al., "Mapping the Skull in 3-D," reprinted from J. Calif. Dent. Assoc, 48(2), 11 pages; (year of pub. sufficiently earlier than effective US filing date and any foreign priority date) Fall Issue 1972.

Baumrind et al.; A Stereophotogrammetric System for the Detection of Prosthesis Loosening in Total Hip Arthroplasty; NATO Symposium on Applications of Human Biostereometrics; SPIE; vol. 166; pp. 112-123; Jul. 9-13, 1978.

Baumrind; A System for Cranio facial Mapping Through the Integration of Data from Stereo X-Ray Films and Stereo Photographs; an invited paper submitted to the 1975 American Society of Photogram Symposium on Close-Range Photogram Systems; University of Illinois; pp. 142-166; Aug. 26-30, 1975.

Baumrind; Integrated Three-Dimensional Craniofacial Mapping: Background, Principles, and Perspectives; Seminars in Orthodontics; 7(4); pp. 223-232; Dec. 2001.

Begole et al.; A Computer System for the Analysis of Dental Casts; The Angle Orthodontist; 51(3); pp. 252-258; Jul. 1981.

Bernard et al.; Computerized Diagnosis in Orthodontics for Epidemiological Studies: A ProgressReport; (Abstract Only), J. Dental Res. Special Issue, vol. 67, p. 169, paper presented at International Association for Dental Research 66th General Session, Montreal Canada; Mar. 9-13, 1988.

Bhatia et al.; A Computer-Aided Design for Orthognathic Surgery; British Journal of Oral and Maxillofacial Surgery; 22(4); pp. 237-253; Aug. 1, 1984.

Biggerstaff et al.; Computerized Analysis of Occlusion in the Postcanine Dentition; American Journal of Orthodontics; 61(3); pp. 245-254; Mar. 1972.

Biggerstaff; Computerized Diagnostic Setups and Simulations; Angle Orthodontist; 40(I); pp. 28-36; Jan. 1970.

Biostar Operation & Training Manual. Great Lakes Orthodontics, Ltd. 199 Fire Tower Drive, Tonawanda, New York. 14150-5890, 20 pages; (year of pub. sufficiently earlier than effective US filing date and any foreign priority date) 1990.

Blu et al.; Linear interpolation revitalized; IEEE Transactions on Image Processing; 13(5); pp. 710-719; May 2004.

Bourke, Coordinate System Transformation; 1 page; retrived from the internet (http://astronomy.swin.edu.au/' pbourke/prolection/coords) on Nov. 5, 2004; Jun. 1996.

Boyd et al.; Three Dimensional Diagnosis and Orthodontic Treatment of Complex Malocclusions With the Invisalipn Appliance; Seminars in Orthodontics; 7(4); pp. 274-293; Dec. 2001.

Brandestini et al.; Computer Machined Ceramic Inlays: In Vitro Marginal Adaptation; J. Dent. Res. Special Issue; (Abstract 305); vol. 64; p. 208; (year of pub. sufficiently earlier than effective US filing date and any foreign priority date) 1985.

Brook et al.; An Image Analysis System for the Determination of Tooth Dimensions from Study Casts: Comparison with Manual Measurements of Mesio-distal Diameter; Journal of Dental Research; 65(3); pp. 428-431; Mar. 1986.

Burstone et al.; Precision Adjustment of the Transpalatal Lingual Arch: Computer Arch Form Predetermination; American Journal of Orthodontics; 79(2);pp. 115-133; Feb. 1981.

Burstone; Dr. Charles J. Burstone on The Uses of the Computer in Orthodontic Practice (Part 1); Journal of Clinical Orthodontics; 13(7); pp. 442-453; (interview); Jul. 1979.

Burstone; Dr. Charles J. Burstone on The Uses of the Computer in Orthodontic Practice (Part 2); journal of Clinical Orthodontics; 13(8); pp. 539-551 (interview); Aug. 1979.

Cardinal Industrial Finishes; Powder Coatings; 6 pages; retrieved from the internet (http://www.cardinalpaint.com) on Aug. 25, 2000.

Carnaghan, An Alternative to Holograms for the Portrayal of Human Teeth; 4th Int'l. Conf. on Holographic Systems, Components and Applications; pp. 228-231; Sep. 15, 1993.

Chaconas et al,; The DigiGraph Work Station, Part 1, Basic Concepts; Journal of Clinical Orthodontics; 24(6); pp. 360-367; (Author Manuscript); Jun. 1990.

Chafetz et al.; Subsidence of the Femoral Prosthesis, A Stereophotogrammetric Evaluation; Clinical Orthopaedics and Related Research; No. 201; pp. 60-67; Dec. 1985.

Chiappone; Constructing the Gnathologic Setup and Positioner; Journal of Clinical Orthodontics; 14(2); pp. 121-133; Feb. 1980.

Chishti et al.; Prov. U.S. Appl. No. 60/050,342 entitled "Procedure for moving teeth using a seires of retainers," filed Jun. 20, 1997.

CSI Computerized Scanning and Imaging Facility; What is a maximum/minimum intensity projection (MIP/MinIP); 1 page; retrived from the internet (http://csi.whoi.edu/content/what-maximumminimum-intensity-projection-mipminip); Jan. 4, 2010.

Cottingham; Gnathologic Clear Plastic Positioner; American Journal of Orthodontics; 55(1); pp. 23-31; Jan. 1969.

(56) References Cited

OTHER PUBLICATIONS

Crawford; CAD/CAM in the Dental Office: Does It Work ?; Canadian Dental Journal; 57(2); pp. 121-123 Feb. 1991.
Crawford; Computers in Dentistry: Part 1: CAD/CAM: The Computer Moves Chairside, Part 2: F. Duret A Man With a Vision, Part 3: The Computer Gives New Vision-Literally, Part 4: Bytes 'N Bites The Computer Moves From The Front Desk to the Operatory; Canadian Dental Journal; 54(9); pp. 661-666 Sep. 1988.
Crooks; CAD/CAM Comes to USC; USC Dentistry; pp. 14-17; (year of pub. sufficiently earlier than effective US filing date and any foreign priority date) Spring 1990.
Cureton; Correcting Malaligned Mandibular Incisors with Removable Retainers; Journal of Clinical Orthodontics; 30(7); pp. 390-395; Jul. 1996.
Curry et al.; Integrated Three-Dimensional Craniofacial Mapping at the Craniofacial Research InstrumentationLaboratory/University of the Pacific; Seminars in Orthodontics; 7(4); pp. 258-265; Dec. 2001.
Cutting et al.; Three-Dimensional Computer-Assisted Design of Craniofacial Surgical Procedures: Optimization and Interaction with Cephalometric and CT-Based Models; Plastic and Reconstructive Surgery; 77(6); pp. 877-885; Jun. 1986.
DCS Dental AG; The CAD/CAM 'DCS Titan System' for Production of Crowns/Bridges; DSC Production; pp. 1-7; Jan. 1992.
Defranco et al.; Three-Dimensional Large Displacement Analysis of Orthodontic Appliances; Journal of Biomechanics; 9(12); pp. 793-801; Jan. 1976.
Dental Institute University of Zurich Switzerland; Program for International Symposium on Computer Restorations: State of the Art of the CEREC-Method; 2 pages; May 1991.
Dentrac Corporation; Dentrac document; pp. 4-13; (year of pub. sufficiently earlier than effective US filing date and any foreign priority date) 1992.
Dent-X; Dentsim . . . Dent-x's virtual reality 3-D training simulator . . . A revolution in dental education; 6 pages; retrieved from the internet (http://www.dent-x.com/DentSim.htm); on Sep. 24, 1998.
Di Muzio et al.; Minimum intensity projection (MinIP); 6 pages; retrieved from the internet (https://radiopaedia.org/articles/minimum-intensity-projection-minip) on Sep. 6, 2018.
Doruk et al.; The role of the headgear timer in extraoral co-operation; European Journal of Orthodontics; 26; pp. 289-291; Jun. 1, 2004.
Doyle; Digital Dentistry; Computer Graphics World; pp. 50-52 andp. 54; Oct. 2000.
Dummer et al.; Computed Radiography Imaging Based on High-Density 670 nm VCSEL Arrays; International Society for Optics and Photonics; vol. 7557; p. 75570H; 7 pages; (Author Manuscript); Feb. 24, 2010.
Duret et al.; CAD/CAM Imaging in Dentistry; Current Opinion in Dentistry; 1 (2); pp. 150-154; Apr. 1991.
Duret et al.; CAD-CAM in Dentistry; Journal of the American Dental Association; 117(6); pp. 715-720; Nov. 1988.
Duret; The Dental CAD/CAM, General Description of the Project; Hennson International Product Brochure, 18 pages; Jan. 1986.
Duret; Vers Une Prosthese Informatisee; Tonus; 75(15); pp. 55-57; (English translation attached); 23 pages; Nov. 15, 1985.
Economides; The Microcomputer in the Orthodontic Office; Journal of Clinical Orthodontics; 13(11); pp. 767-772; Nov. 1979.
Ellias et al.; Proteomic analysis of saliva identifies potential biomarkers for orthodontic tooth movement; The Scientific World Journal; vol. 2012; Article ID 647240; dio: 10.1100/2012/647240; 7 pages; Jul. 2012.
Elsasser; Some Observations on the History and Uses of the Kesling Positioner; American Journal of Orthodontics; 36(5); pp. 368-374; May 1, 1950.
English translation of Japanese Laid-Open Publication No. 63-11148 to inventor T. Ozukuri (Laid-Open on Jan. 18, 1998) pp. 1-7.
Faber et al.; Computerized Interactive Orthodontic Treatment Planning; American Journal of Orthodontics; 73(1); pp. 36-46; Jan. 1978.

Farooq et al.; Relationship between tooth dimensions and malocclusion; JPMA: The Journal of the Pakistan Medical Association; 64(6); pp. 670-674; Jun. 2014.
Felton et al.; A Computerized Analysis of the Shape and Stability of Mandibular Arch Form; American Journal of Orthodontics and Dentofacial Orthopedics; 92(6); pp. 478-483; Dec. 1987.
Florez-Moreno; Time-related changes in salivary levels of the osteotropic factors sRANKL and OPG through orthodontic tooth movement; American Journal of Orthodontics and Dentofacial Orthopedics; 143 (1); pp. 92-100; Jan. 2013.
Friede et al.; Accuracy of Cephalometric Prediction in Orthognathic Surgery; Journal of Oral and Maxillofacial Surgery; 45(9); pp. 754-760; Sep. 1987.
Friedrich et al.; Measuring system for in vivo recording of force systems in orthodontic treatment-concept and analysis of accuracy; J. Biomech.; 32(1); pp. 81-85; (Abstract Only) Jan. 1999.
Futterling et al.; Automated Finite Element Modeling of a Human Mandible with Dental Implants; JS WSCG '98-Conference Program; 8 pages; retrieved from the Internet (https://dspace5.zcu.cz/bitstream/11025/15851/1/Strasser_98.pdf); on Aug. 21, 2018.
Gao et al.; 3-D element Generation for Multi-Connected Complex Dental and Mandibular Structure; IEEE Proceedings International Workshop in Medical Imaging and Augmented Reality; pp. 267-271; Jun. 12, 2001.
Gim-Alldent Deutschland, "Das DUX System: Die Technik," 3 pages; (English Translation Included); (year of pub. sufficiently earlier than effective US filing date and any foreign priority date); 2002.
Gottleib et al.; JCO Interviews Dr. James A. McNamura, Jr., on the Frankel Appliance: Part 2: Clinical 1-1 Management; Journal of Clinical Orthodontics; 16(6); pp. 390-407; retrieved from the internet (http://www.jco-online.com/archive/print_article.asp?Year=1982&Month=06&ArticleNum+); 21 pages; Jun. 1982.
Grayson; New Methods for Three Dimensional Analysis of Craniofacial Deformity, Symposium: Computerized Facial Imaging in Oral and Maxillofacial Surgery; American Association of Oral and Maxillofacial Surgeons; 48(8) suppl 1; pp. 5-6; Sep. 13, 1990.
Grest, Daniel; Marker-Free Human Motion Capture in Dynamic Cluttered Environments from a Single View-Point, PhD Thesis; 171 pages; Dec. 2007.
Guess et al.; Computer Treatment Estimates In Orthodontics and Orthognathic Surgery; Journal of Clinical Orthodontics; 23(4); pp. 262-268; 11 pages; (Author Manuscript); Apr. 1989.
Heaven et al.; Computer-Based Image Analysis of Artificial Root Surface Caries; Abstracts of Papers #2094; Journal of Dental Research; 70:528; (Abstract Only); Apr. 17-21, 1991.
Highbeam Research; Simulating stress put on jaw. (ANSYS Inc.'s finite element analysis software); 2 pages; retrieved from the Internet (http://static.highbeam.eom/t/toolingampproduction/november011996/simulatingstressputonfa . . . ); on Nov. 5, 2004.
Hikage; Integrated Orthodontic Management System for Virtual Three-Dimensional Computer Graphic Simulation and Optical Video Image Database for Diagnosis and Treatment Planning; Journal of Japan KA Orthodontic Society; 46(2); pp. 248-269; 56 pages; (English Translation Included); Feb. 1987.
Hoffmann et al.; Role of Cephalometry for Planning of Jaw Orthopedics and Jaw Surgery Procedures; Informatbnen, pp. 375-396; (English Abstract Included); Mar. 1991.
Hojjatie et al.; Three-Dimensional Finite Element Analysis of Glass-Ceramic Dental Crowns; Journal of Biomechanics; 23(11); pp. 1157-1166; Jan. 1990.
Huckins; CAD-CAM Generated Mandibular Model Prototype from MRI Data; AAOMS, p. 96; (Abstract Only); (year of pub. sufficiently earlier than effective US filing date and any foreign priority date) 1999.
Imani et al.; A wearable chemical-electrophysiological hybrid biosensing system for real-time health and fitness monitoring; Nature Communications; 7; 11650. doi 1038/ncomms11650; 7 pages; May 23, 2016.
Invisalign; You were made to move. There's never been a better time to straighten your teeth with the most advanced clear aligner in the world; Product webpage; 2 pages; retrieved from the internet (www.invisalign.com/) on Dec. 28, 2017.

(56) References Cited

OTHER PUBLICATIONS

Jia et al.; Epidermal biofuel cells: energy harvesting from human perspiration; Angewandle Chemie International Edition; 52(28); pp. 7233-7236; Jul. 8, 2013.

Jia et al.; Wearable textile biofuel cells for powering electronics; Journal of Materials Chemistry A; 2(43); p. 18184-18189; Oct. 14, 2014.

JCO Interviews; Craig Andreiko, DDS, MS on the Elan and Orthos Systems; Interview by Dr. Larry W. White; Journal of Clinical Orthodontics; 28(8); pp. 459-468; 14 pages; (Author Manuscript); Aug. 1994.

JCO Interviews; Dr. Homer W. Phillips on Computers in Orthodontic Practice, Part 2; Journal of Clinical Orthodontics; 17(12); pp. 819-831; 19 pages; (Author Manuscript); Dec. 1983.

Jeerapan et al.; Stretchable biofuel cells as wearable textile-based self-powered sensors; Journal of Materials Chemistry A; 4(47); p. 18342-18353; Dec. 21, 2016.

Jerrold; The Problem, Electronic Data Transmission and the Law; American Journal of Orthodontics and Dentofacial Orthopedics; 113(4); pp. 478-479; 5 pages; (Author Manuscript); Apr. 1998.

Jones et al.; An Assessment of the Fit of a Parabolic Curve to Pre- and Post-Treatment Dental Arches; British Journal of Orthodontics; 16(2); pp. 85-93; May 1989.

Kamada et.al.; Case Reports on Tooth Positioners Using LTV Vinyl Silicone Rubber; J. Nihon University School of Dentistry; 26(1); pp. 11-29; (year of pub. sufficiently earlier than effective US filing date and any foreign priority date) 1984.

Kamada et.al.; Construction of Tooth Positioners with LTV Vinyl Silicone Rubber and Some Case KJ Reports; J. Nihon University School of Dentistry; 24(1); pp. 1-27; (year of pub. sufficiently earlier than effective US filing date and any foreign priority date) 1982.

Kanazawa et al.; Three-Dimensional Measurements of the Occlusal Surfaces of Upper Molars in a Dutch Population; Journal of Dental Research; 63(11); pp. 1298-1301; Nov. 1984.

Kesling et al.; The Philosophy of the Tooth Positioning Appliance; American Journal of Orthodontics and Oral surgery; 31(6); pp. 297-304; Jun. 1945.

Kesling; Coordinating the Predetermined Pattern and Tooth Positioner with Conventional Treatment; American Journal of Orthodontics and Oral Surgery; 32(5); pp. 285-293; May 1946.

Kim et al.; Advanced materials for printed wearable electrochemical devices: A review; Advanced Electronic Materials; 3(1); 15 pages; 1600260; Jan. 2017.

Kim et al.; Noninvasive alcohol monitoring using a wearable tatto-based iontophoretic-biosensing system; Acs Sensors; 1(8); pp. 1011-1019; Jul. 22, 2016.

Kim et al.; Non-invasive mouthguard biosensor for continuous salivary monitoring of metabolites; Analyst; 139(7); pp. 1632-1636; Apr. 7, 2014.

Kim et al.; A wearable fingernail chemical sensing platform: pH sensing at your fingertips; Talanta; 150; pp. 622-628; Apr. 2016.

Kim et al.; Wearable salivary uric acid mouthguard biosensor with integrated wireless electronics; Biosensors and Bioelectronics; 74; pp. 1061-1068; 19 pages; (Author Manuscript); Dec. 2015.

Kleeman et al.; The Speed Positioner; J. Clin. Orthod.; 30(12); pp. 673-680; Dec. 1996.

Kochanek; Interpolating Splines with Local Tension, Continuity and Bias Control; Computer Graphics; 18(3); pp. 33-41; Jan. 1, 1984.

Kumar et al.; All-printed, stretchable Zn—Ag2o rechargeable battery via, hyperelastic binder for self-powering wearable electronics; Advanced Energy Materials; 7(8); 8 pages; 1602096; Apr. 2017.

Kumar et al.; Biomarkers in orthodontic tooth movement; Journal of Pharmacy Bioallied Sciences; 7(Suppl 2); pp. S325-S330; 12 pages; (Author Manuscript); Aug. 2015.

Kumar et al.; Rapid maxillary expansion: A unique treatment modality in dentistry; J. Clin. Diagn. Res.; 5(4); pp. 906-911; Aug. 2011.

Kunii et al.; Articulation Simulation for an Intelligent Dental Care System; Displays; 15(3); pp. 181-188; Jul. 1994.

Kuroda et al.; Three-Dimensional Dental Cast Analyzing System Using Laser Scanning; American Journal of Orthodontics and Dentofacial Orthopedics; 110(4); pp. 365-369; Oct. 1996.

Laurendeau et al.; A Computer-Vision Technique for the Acquisition and Processing of 3-D Profiles of 7 Dental Imprints: An Application in Orthodontics; IEEE Transactions on Medical Imaging; 10(3); pp. 453-461; Sep. 1991.

Leinfelder et al.; A New Method for Generating Ceramic Restorations: a CAD-CAM System; Journal of the American Dental Association; 118(6); pp. 703-707; Jun. 1989.

Manetti et al.; Computer-Aided Cefalometry and New Mechanics in Orthodontics; Fortschr Kieferorthop; 44; pp. 370-376; 8 pages; (English Article Summary Included); (year of pub. sufficiently earlier than effective US filing date and any foreign priority date) 1983.

McCann; Inside the ADA; J. Amer. Dent. Assoc, 118:286-294; Mar. 1989.

McNamara et al.; Invisible Retainers; J. Clin Orthod.; pp. 570-578; 11 pages; (Author Manuscript); Aug. 1985.

McNamara et al.; Orthodontic and Orthopedic Treatment in the Mixed Dentition; Needham Press; pp. 347-353; Jan. 1993.

Moermann et al, Computer Machined Adhesive Porcelain Inlays: Margin Adaptation after Fatigue Stress; IADR Abstract 339; J. Dent. Res.; 66(a):763; (Abstract Only); (year of pub. sufficiently earlier than effective US filing date and any foreign priority date) 1987.

Moles; Correcting Mild Malalignments—as Easy as One, Two, Three; AOA/Pro Corner; 11(2); 2 pages; (year of pub. sufficiently earlier than effective US filing date and any foreign priority date) 2002.

Mormann et al.; Marginale Adaptation von adhasuven Porzellaninlays in vitro; Separatdruck aus:Schweiz. Mschr. Zahnmed.; 95; pp. 1118-1129; 8 pages; (Machine Translated English Abstract); (year of pub. sufficiently earlier than effective US filing date and any foreign priority date); 1985.

Nahoum; The Vacuum Formed Dental Contour Appliance; N. Y. State Dent. J.; 30(9); pp. 385-390; Nov. 1964.

Nash; CEREC CAD/CAM Inlays: Aesthetics and Durability in a Single Appointment; Dentistry Today; 9(8); pp. 20, 22-23 and 54; Oct. 1990.

Nedelcu et al.; "Scanning Accuracy and Precision in 4 Intraoral Scanners: an in Vitro Comparison Based On 3-Dimensional Analysis"; J. Prosthet. Dent .; 112(6); pp. 1461-1471; Dec. 2014.

Newcombe; DTAM: Dense tracking and mapping in real-time; 8 pages; retrieved from the internet (http://www.doc.ic.ac.uk/?ajd/Publications/newcombe_etal_iccv2011.pdf; on Dec. 2011.

Nishiyama et al.; A New Construction of Tooth Repositioner by LTV Vinyl Silicone Rubber; The Journal of Nihon University School of Dentistry; 19(2); pp. 93-102 (year of pub. sufficiently earlier than effective US filing date and any foreign priority date) 1977.

Ogawa et al.; Mapping, profiling and clustering of pressure pain threshold (PPT) in edentulous oral muscosa; Journal of Dentistry; 32(3); pp. 219-228; Mar. 2004.

Ogimoto et al.; Pressure-pain threshold determination in the oral mucosa; Journal of Oral Rehabilitation; 29(7); pp. 620-626; Jul. 2002.

Parrilla et al.; A textile-based stretchable multi-ion potentiometric sensor; Advanced Healthcare Materials; 5(9); pp. 996-1001; May 2016.

Paul et al.; Digital Documentation of Individual Human Jaw and Tooth Forms for Applications in Orthodontics; Oral Surgery and Forensic Medicine Proc. of the 24th Annual Conf. of the IEEE Industrial Electronics Society (IECON '98); vol. 4; pp. 2415-2418; Sep. 4, 1998.

Pinkham; Foolish Concept Propels Technology; Dentist, 3 pages, Jan./Feb. 1989.

Pinkham; Inventor's CAD/CAM May Transform Dentistry; Dentist; pp. 1 and 35, Sep. 1990.

Ponitz; Invisible retainers; Am. J. Orthod.; 59(3); pp. 266-272; Mar. 1971.

Procera Research Projects; Procera Research Projects 1993 Abstract Collection; 23 pages; (year of pub. sufficiently earlier than effective US filing date and any foreign priority date) 1993.

(56) References Cited

OTHER PUBLICATIONS

Proffit et al.; The first stage of comprehensive treatment alignment and leveling; Contemporary Orthodontics, 3rd Ed.; Chapter 16; Mosby Inc.; pp. 534-537; (year of pub. sufficiently earlier than effective US filing date and any foreign priority date) 2000.

Proffit et al.; The first stage of comprehensive treatment: alignment and leveling; Contemporary Orthodontics; (Second Ed.); Chapter 15, MosbyYear Book; St. Louis, Missouri; pp. 470-533 Oct. 1993.

Raintree Essix & ARS Materials, Inc., Raintree Essix, Technical Magazine Table of contents and Essix Appliances, 7 pages; retrieved from the internet (http://www.essix.com/magazine/defaulthtml) on Aug. 13, 1997.

Redmond et al.; Clinical Implications of Digital Orthodontics; American Journal of Orthodontics and Dentofacial Orthopedics; 117(2); pp. 240-242; Feb. 2000.

Rekow et al.; CAD/CAM for Dental Restorations—Some of the Curious Challenges; IEEE Transactions on Biomedical Engineering; 38(4); pp. 314-318; Apr. 1991.

Rekow et al.; Comparison of Three Data Acquisition Techniques for 3-D Tooth Surface Mapping; Annual International Conference of the IEEE Engineering in Medicine and Biology Society; 13(1); pp. 344-345 (year of pub. sufficiently earlier than effective US filing date and any foreign priority date) 1991.

Rekow; A Review of the Developments in Dental CAD/CAM Systems; Current Opinion in Dentistry; 2; pp. 25-33; Jun. 1992.

Rekow; CAD/CAM in Dentistry: A Historical Perspective and View of the Future; Journal Canadian Dental Association; 58(4); pp. 283, 287-288; Apr. 1992.

Rekow; Computer-Aided Design and Manufacturing in Dentistry: A Review of the State of the Art; Journal of Prosthetic Dentistry; 58(4); pp. 512-516; Dec. 1987.

Rekow; Dental CAD-CAM Systems: What is the State of the Art?; The Journal of the American Dental Association; 122(12); pp. 43-48; Dec. 1991.

Rekow; Feasibility of an Automated System for Production of Dental Restorations, Ph.D. Thesis; Univ. of Minnesota, 250 pages, Nov. 1988.

Richmond et al.; The Development of the PAR Index (Peer Assessment Rating): Reliability and Validity.; The European Journal of Orthodontics; 14(2); pp. 125-139; Apr. 1992.

Richmond et al.; The Development of a 3D Cast Analysis System; British Journal of Orthodontics; 13(1); pp. 53-54; Jan. 1986.

Richmond; Recording The Dental Cast In Three Dimensions; American Journal of Orthodontics and Dentofacial Orthopedics; 92(3); pp. 199-206; Sep. 1987.

Rudge; Dental Arch Analysis: Arch Form, a Review of the Literature; The European Journal of Orthodontics; 3(4); pp. 279-284; Jan. 1981.

Sahm et al.; "Micro-Electronic Monitoring of Functional Appliance Wear"; Eur J Orthod.; 12(3); pp. 297-301; Aug. 1990.

Sahm; Presentation of a wear timer for the clarification of scientific questions in orthodontic orthopedics; Fortschritte der Kieferorthopadie; 51 (4); pp. 243-247; (Translation Included) Jul. 1990.

Sakuda et al.; Integrated Information-Processing System in Clinical Orthodontics: an Approach with Use of a Computer Network System; American Journal of Orthodontics and Dentofacial Orthopedics; 101(3); pp. 210-220; 20 pages; (Author Manuscript) Mar. 1992.

Schafer et al.; "Quantifying patient adherence during active orthodontic treatment with removable appliances using microelectronic wear-time documentation"; Eur J Orthod.; 37(1)pp. 1-8; doi: 10.1093/ejo/cju012; Jul. 3, 2014.

Schellhas et al.; Three-Dimensional Computed Tomography in Maxillofacial Surgical Planning; Archives of Otolaryngology—Head and Neck Surgery; 114(4); pp. 438-442; Apr. 1988.

Schroeder et al.; Eds. The Visual Toolkit, Prentice Hall PTR, New Jersey; Chapters 6, 8 & 9, (pp. 153-210,309-354, and 355-428; (year of pub. sufficiently earlier than effective US filing date and any foreign priority date) 1998.

Shilliday; Minimizing finishing problems with the mini-positioner; American Journal of Orthodontics; 59(6); pp. 596-599; Jun. 1971.

Shimada et al.; Application of optical coherence tomography (OCT) for diagnosis of caries, cracks, and defects of restorations; Current Oral Health Reports; 2(2); pp. 73-80; Jun. 2015.

Siemens; Cerec—Computer-Reconstruction, High Tech in der Zahnmedizin; 15 pagesl; (Includes Machine Translation); (year of pub. sufficiently earlier than effective US filing date and any foreign priority date); 2004.

Sinclair; The Readers' Corner; Journal of Clinical Orthodontics; 26(6); pp. 369-372; 5 pages; retrived from the internet (http://www.jco-online.com/archive/print_article.asp?Year=1992&Month=06&ArticleNum=); Jun. 1992.

Sirona Dental Systems GmbH, Cerec 3D, Manuel utilisateur, Version 2.0X (in French); 114 pages; (English translation of table of contents included); (year of pub. sufficiently earlier than effective US filing date and any foreign priority date); 2003.

Stoll et al.; Computer-aided Technologies in Dentistry; Dtsch Zahna'rztl Z 45, pp. 314-322; (English Abstract Included); (year of pub. sufficiently earlier than effective US filing date and any foreign priority date) 1990.

Sturman; Interactive Keyframe Animation of 3-D Articulated Models; Proceedings Graphics Interface '84; vol. 86; pp. 35-40; May-Jun. 1984.

The American Heritage, Stedman's Medical Dictionary; Gingiva; 3 pages; retrieved from the interent (http://reference.com/search/search?q=gingiva) on Nov. 5, 2004.

The Dental Company Sirona: Cerc omnicam and cerec bluecam brochure: The first choice in every case; 8 pages; (year of pub. sufficiently earlier than effective US filing date and any foreign priority date) 2014.

Thera Mon; "Microsensor"; 2 pages; retrieved from the internet (www.english.thera-mon.com/the-product/transponder/index.html); on Sep. 19, 2016.

Thorlabs; Pellin broca prisms; 1 page; retrieved from the internet (www.thorlabs.com); Nov. 30, 2012.

Tiziani et al.; Confocal principle for macro and microscopic surface and defect analysis; Optical Engineering; 39(1); pp. 32-39; Jan. 1, 2000.

Truax; Truax Clasp-Less(TM) Appliance System; The Functional Orthodontist; 9(5); pp. 22-24, 26-8; Sep.-Oct. 1992.

Tru-Tatn Orthodontic & Dental Supplies, Product Brochure, Rochester, Minnesota 55902, 16 pages; (year of pub. sufficiently earlier than effective US filing date and any foreign priority date) 1996.

U.S. Department of Commerce, National Technical Information Service, Holodontography: An Introduction to Dental Laser Holography; School of Aerospace Medicine Brooks AFB Tex; Mar. 1973, 40 pages; Mar. 1973.

U.S. Department of Commerce, National Technical Information Service; Automated Crown Replication Using Solid Photography SM; Solid Photography Inc., Melville NY,; 20 pages; Oct. 1977.

Vadapalli; Minimum intensity projection (MinIP) is a data visualization; 7 pages; retrieved from the internet (https://prezi.com/tdmttnmv2knw/minimum-intensity-projection-minip-is-a-data-visualization/) on Sep. 6, 2018.

Van Der Linden et al.; Three-Dimensional Analysis of Dental Casts by Means of the Optocom; Journal of Dental Research; 51(4); p. 1100; Jul.-Aug. 1972.

Van Der Linden; A New Method to Determine Tooth Positions and Dental Arch Dimensions; Journal of Dental Research; 51(4); p. 1104; Jul.-Aug. 1972.

Van Der Zel; Ceramic-Fused-to-Metal Restorations with a New CAD/CAM System; Quintessence International; 24(A); pp. 769-778; (year of pub. sufficiently earlier than effective US filing date and any foreign priority date); 1993.

Van Hilsen et al.; Comparing potential early caries assessment methods for teledentistry; BMC Oral Health; 13(16); doi: 10.1186/1472-6831-13-16; 9 pages; Mar. 2013.

Varady et al.; Reverse Engineering of Geometric Models An Introduction; Computer-Aided Design; 29(4); pp. 255-268; 20 pages; (Author Manuscript); Apr. 1997.

(56) References Cited

OTHER PUBLICATIONS

Verstreken et al.; An Image-Guided Planning System for Endosseous Oral Implants; IEEE Transactions on Medical Imaging; 17(5); pp. 842-852; Oct. 1998.
Warunek et al.; Physical and Mechanical Properties of Elastomers in Orthodonic Positioners; American Journal of Orthodontics and Dentofacial Orthopedics; 95(5); pp. 388-400; 21 pages; (Author Manuscript); May 1989.
Warunek et.al.; Clinical Use of Silicone Elastomer Applicances; JCO; 23(10); pp. 694-700; Oct. 1989.
Watson et al.; Pressures recorded at te denture base-mucosal surface interface in complete denture wearers; Journal of Oral Rehabilitation 14(6); pp. 575-589; Nov. 1987.
Wells; Application of the Positioner Appliance in Orthodontic Treatment; American Journal of Orthodontics; 58(4); pp. 351-366; Oct. 1970.
Wikipedia; Palatal expansion; 3 pages; retrieved from the internet (https://en.wikipedia.org/wiki/Palatal_expansion) on Mar. 5, 2018.
Williams; Dentistry and CAD/CAM: Another French Revolution; J. Dent. Practice Admin.; 4(1); pp. 2-5 Jan./Mar. 1987.
Williams; The Switzerland and Minnesota Developments in CAD/CAM; Journal of Dental Practice Administration; 4(2); pp. 50-55; Apr./Jun. 1987.
Windmiller et al.; Wearable electrochemical sensors and biosensors: a review; Electroanalysis; 25(1); pp. 29-46; Jan. 2013.
Wireless Sensor Networks Magazine; Embedded Teeth for Oral Activity Recognition; 2 pages; retrieved on Sep. 19, 2016 from the internet (www.wsnmagazine.com/embedded-teeth/); Jul. 29, 2013.
Wishan; New Advances in Personal Computer Applications for Cephalometric Analysis, Growth Prediction, Surgical Treatment Planning and Imaging Processing; Symposium: Computerized Facial Imaging in Oral and Maxilofacial Surgery; p. 5; Presented on Sep. 13, 1990.
Witt et al.; The wear-timing measuring device in orthodontics-cui bono? Reflections on the state-of-the-art in wear-timing measurement and compliance research in orthodontics; Fortschr Kieferorthop.; 52(3); pp. 117-125; (Translation Included) Jun. 1991.
Wolf; Three-dimensional structure determination of semi-transparent objects from holographic data; Optics Communications; 1(4); pp. 153-156; Sep. 1969.
WSCG'98—Conference Program, The Sixth International Conference in Central Europe on Computer Graphics and Visualization '98; pp. 1-7; retrieved from the Internet on Nov. 5, 2004, (http://wscg.zcu.cz/wscg98/wscg98.htm); Feb. 9-13, 1998.
Xia et al.; Three-Dimensional Virtual-Reality Surgical Planning and Soft-Tissue Prediction for Orthognathic Surgery; IEEE Transactions on Information Technology in Biomedicine; 5(2); pp. 97-107; Jun. 2001.
Yamada et al.; Simulation of fan-beam type optical computed-tomography imaging of strongly scattering and weakly absorbing media; Applied Optics; 32(25); pp. 4808-4814; Sep. 1, 1993.
Yamamoto et al.; Optical Measurement of Dental Cast Profile and Application to Analysis of Three-Dimensional Tooth Movement in Orthodontics; Front. Med. Biol. Eng., 1(2); pp. 119-130; (year of pub. sufficiently earlier than effective US filing date and any foreign priority date); 1988.
Yamamoto et al.; Three-Dimensional Measurement of Dental Cast Profiles and Its Applications to Orthodontics; Conf. Proc. IEEE Eng. Med. Biol. Soc.; 12(5); pp. 2052-2053; Nov. 1990.
Yamany et al.; A System for Human Jaw Modeling Using Intra-Oral Images; Proc. of the 20th Annual Conf. of the IEEE Engineering in Medicine and Biology Society; vol. 2; pp. 563-566; Oct. 1998.
Yoshii; Research on a New Orthodontic Appliance: The Dynamic Positioner (D.P.); 111. The General Concept of the D.P. Method and Its Therapeutic Effect, Part 1, Dental and Functional Reversed Occlusion Case Reports; Nippon Dental Review; 457; pp. 146-164; 43 pages; (Author Manuscript); Nov. 1980.
Yoshii; Research on a New Orthodontic Appliance: The Dynamic Positioner (D.P.); I. The D.P. Concept and Implementation of Transparent Silicone Resin (Orthocon); Nippon Dental Review; 452; pp. 61-74; 32 pages; (Author Manuscript); Jun. 1980.
Yoshii; Research on a New Orthodontic Appliance: The Dynamic Positioner (D.P.); II. The D.P. Manufacturing Procedure and Clinical Applications; Nippon Dental Review; 454; pp. 107-130; 48 pages; (Author Manuscript); Aug. 1980.
Yoshii; Research on a New Orthodontic Appliance: The Dynamic Positioner (D.P.); III—The General Concept of the D.P. Method and Its Therapeutic Effect, Part 2. Skeletal Reversed Occlusion Case Reports; Nippon Dental Review; 458; pp. 112-129; 40 pages; (Author Manuscript); Dec. 1980.
Zhou et al.; Bio-logic analysis of injury biomarker patterns in human serum samples; Talanta; 83(3); pp. 955-959; Jan. 15, 2011.
Zhou et al.; Biofuel cells for self-powered electrochemical biosensing and logic biosensing: A review; Electroanalysis; 24(2); pp. 197-209; Feb. 2012.
Grove et al.; U.S. Appl. No. 15/726,243 entitled "Interproximal reduction templates," filed Oct. 5, 2017.
Kopelman et al.; U.S. Appl. No. 16/152,281 entitled "Intraoral appliances for sampling soft-tissue," filed Oct. 4, 2018.
Morton et al.; U.S. Appl. No. 16/177,067 entitled "Dental appliance having selective occlusal loading and controlled intercuspation," filed Oct. 31, 2018.
Akopov et al.; U.S. Appl. No. 16/178,491 entitled "Automatic treatment planning," filed Nov. 1, 2018.
Elbaz et al.; U.S. Appl. No. 16/198,488 entitled "Intraoral scanner with dental diagnostics capabilities," filed Nov. 21, 2018.
O'Leary et al.; U.S. Appl. No. 16/195,701 entitled "Orthodontic retainers," filed Nov. 19, 2018.
Shanjani et al., U.S. Appl. No. 16/206,894 entitled "Sensors for monitoring oral appliances," filed Nov. 28, 2019.
Shanjani et al., U.S. Appl. No. 16/231,906 entitled "Augmented reality enhancements for dental practitioners." Dec. 24, 2018.
Kopleman et al., U.S. Appl. No. 16/220,381 entitled "Closed loop adaptive orthodontic treatment methods and apparatuses," Dec. 14, 2018.
Sabina et al., U.S. Appl. No. 16/258,516 entitled "Diagnostic intraoral scanning" filed Jan. 25, 2019.
Sabina et al., U.S. Appl. No. 16/258,523 entitled "Diagnostic intraoral tracking" filed Jan. 25, 2019.
Sabina et al., U.S. Appl. No. 16/258,527 entitled "Diagnostic intraoral methods and apparatuses" filed Jan. 25, 2019.
PCT/ISA/220 International Search Report & Written Opinion for related PCT Application PCT/US2018/046317, mailed Oct. 24, 2018 (17 pgs).
beautyworlds.com; Virtual plastic surgery—beautysurge.com announces launch of cosmetic surgery digital imaging services; 5 pages; retrieved from the internet (http://www.beautyworlds.com/cosmossurgdigitalimagning.htm); Mar. 2004.
Berland; The use of smile libraries for cosmetic dentistry; Dental Tribunne: Asia pacfic Edition; pp. 16-18; Mar. 29, 2006.
Bookstein; Principal warps: Thin-plate splines and decomposition of deformations; IEEE Transactions on pattern analysis and machine intelligence; 11(6); pp. 567-585; Jun. 1989.
Cadent Inc.; OrthoCAD ABO user guide; 38 pages; Dec. 21, 2005.
Cadent Inc.; Reviewing and modifying an orthoCAD case; 4 pages; Feb. 14, 2005.
Daniels et al.; The development of the index of complexity outcome and need (ICON); British Journal of Orthodontics; 27(2); pp. 149-162; Jun. 2000.
Dentrix; Dentrix G3, new features; 2 pages; retrieved from the internet (http://www.dentrix.com/g3/new_features/index.asp); on Jun. 6, 2008.
Di Giacomo et al.; Clinical application of sterolithographic surgical guides for implant placement: Preliminary results; Journal Periodontolgy; 76(4); pp. 503-507; Apr. 2005.
Gansky; Dental data mining: potential pitfalls and practical issues; Advances in Dental Research; 17(1); pp. 109-114; Dec. 2003.
Geomagic; Dental reconstruction; 1 page; retrieved from the internet (http://geomagic.com/en/solutions/industry/detal_desc.php) on Jun. 6, 2008.
Gottschalk et al.; OBBTree: A hierarchical structure for rapid interference detection; 12 pages; (http://www.cs.unc.edu/?geom/

(56) References Cited

OTHER PUBLICATIONS

OBB/OBBT.html); retrieved from te internet (https://www.cse.iitk.ac.in/users/amit/courses/RMP/presentations/dslamba/presentation/sig96.pdf) on Apr. 25, 2019.
gpsdentaire.com; Get a realistic smile simulation in 4 steps with GPS; a smile management software; 10 pages; retrieved from the internet (http://www.gpsdentaire.com/en/preview/) on Jun. 6, 2008.
Karaman et al.; A practical method of fabricating a lingual retainer; Am. Journal of Orthodontic and Dentofacial Orthopedics; 124(3); pp. 327-330; Sep. 2003.
Mantzikos et al.; Case report: Forced eruption and implant site development; The Angle Orthodontist; 68(2); pp. 179-186; Apr. 1998.
Methot; Get the picture with a gps for smile design in 3 steps; Spectrum; 5(4); pp. 100-105; (year of pub. sufficiently earlier than effective US filing date and any foreign priority date) 2006.
ormco.com; Increasing clinical performance with 3D interactive treatment planning and patient-specific appliances; 8 pages; retrieved from the internet (http://www.konsident.com/wp-content/files_mf/1295385693http _ormco.com_index_cmsfilesystemaction_fileOrmcoPDF_whitepapers.pdf) on Feb. 27, 2019.
OrthoCAD downloads; retrieved Jun. 27, 2012 from the internet (www.orthocad.com/download/downloads.asp); 2 pages; Feb. 14, 2005.
Page et al.; Validity and accuracy of a risk calculator in predicting periodontal disease; Journal of the American Dental Association; 133(5); pp. 569-576; May 2002.
Patterson Dental; Cosmetic imaging; 2 pages retrieved from the internet (http://patterson.eaglesoft.net/cnt_di_cosimg.html) on Jun. 6, 2008.
Rose et al.; The role of orthodontics in implant dentistry; British Dental Journal; 201(12); pp. 753-764; Dec. 23, 2006.
Rubin et al.; Stress analysis of the human tooth using a three-dimensional finite element model; Journal of Dental Research; 62(2); pp. 82-86; Feb. 1983.
Sarment et al.; Accuracy of implant placement with a sterolithographic surgical guide; journal of Oral and Maxillofacial Implants; 118(4); pp. 571-577; Jul. 2003.
Smalley; Implants for tooth movement: Determining implant location and orientation: Journal of Esthetic and Restorative Dentistry; 7(2); pp. 62-72; Mar. 1995.
Smart Technology; Smile library II; 1 page; retrieved from the internet (http://smart-technology.net/) on Jun. 6, 2008.
Smile-Vision_The smile-vision cosmetic imaging system; 2 pages; retrieved from the internet (http://www.smile-vision.net/cos_imaging.php) on Jun. 6, 2008.
Szeliski; Introduction to computer vision: Structure from motion; 64 pages; retrieved from the internet (http://robots.stanford.edu/cs223b05/notes/CS%20223-B%20L 10%structurefrommotion1b.ppt, on Feb. 3, 2005.
Vevin et al.; Pose estimation of teeth through crown-shape matching; In Medical Imaging: Image Processing of International Society of Optics and Photonics; vol. 4684; pp. 955-965; May 9, 2002.
Video of DICOM to Surgical Guides; Can be viewed at <URL:https://youtu.be/47KtOmCEFQk; Published Apr. 4, 2016.
Virtual Orthodontics; Our innovative software; 2 pages; (http://www.virtualorthodontics.com/innovativesoftware.html); retrieved from the internet (https://web.archive.org/web/20070518085145/http://www.virtualorthodontics.com/innovativesoftware.html); (year of pub. sufficiently earlier than effective US filing date and any foreign priority date) 2005.
Wiedmann; According to the laws of harmony to find the right tooth shape with assistance of the computer; Digital Dental News; 2nd vol.; pp. 0005-0008; (English Version Included); Apr. 2008.
Wong et al.; Computer-aided design/computer-aided manufacturing surgical guidance for placement of dental implants: Case report; Implant Dentistry; 16(2); pp. 123-130; Sep. 2007.
Wong et al.; The uses of orthodontic study models in diagnosis and treatment planning; Hong Knog Dental Journal; 3(2); pp. 107-115; Dec. 2006.
Yaltara Software; Visual planner; 1 page; retrieved from the internet (http://yaltara.com/vp/) on Jun. 6, 2008.
Zhang et al.; Visual speech features extraction for improved speech recognition; 2002 IEEE International conference on Acoustics, Speech and Signal Processing; vol. 2; 4 pages; May 13-17, 2002.
Li et al.; U.S. Appl. No. 16/171,159 entitled "Alternative bite adjustment structures," filed Oct. 25, 2018.
Culp; U.S. Appl. No. 16/236,220 entitled "Laser cutting," filed Dec. 28, 2018.
Culp; U.S. Appl. No. 16/265,287 entitled "Laser cutting," filed Feb. 1, 2019.
Arnone et al.; U.S. Appl. No. 16/235,449 entitled "Method and system for providing indexing and cataloguing of orthodontic related treatment profiles and options," filed Dec. 28, 2018.
Mason et al.; U.S. Appl. No. 16/374,648 entitled "Dental condition evaluation and treatment," filed Apr. 3, 2019.
Brandt et al.; U.S. Appl. No. 16/235,490 entitled "Dental wire attachment," filed Dec. 28, 2018.
Kou; U.S. Appl. No. 16/270,891 entitled "Personal data file," filed Feb. 8, 2019.
3 Shape Trios 3; Insane speed-scanning with 3shape trios 3 intracral canner; (Screenshot); 2 pages; retrieved from the internet at You Tube (https//www.youtube.com/watch?v=X5CviUZ5DpQ&feature=youtu.be; available as of Sep. 18, 2015.
Baumrind; Integrated three-dimensional craniofacial mapping: background, principles, and persectives; Seminars in Orthodontics; 7(4); pp. 223-232; Dec. 2001.
Benson; Highly porous polymers; American Laboratory; pp. 1-12; Apr. 2003.
Bernabe et al.; Are the lower incisors the best predictors for the unerupted canine and premolars sums? An analysis of peruvian sample; The Angle Orthodontist; 75(2); pp. 202-207; Mar. 2005.
Besl et al.; A method of registration of 3-D shapes; IEEE Transactions on Pattern Analysis; 14(2); pp. 239-256; Feb. 1992.
Brannon-Peppas; Biomaterials: polymers in controlled drug delivery; Medical Devicelink, Medical Plastics and Biomaterials Magazine; 18 pages; retrieved from the internet (http://www.devicelink.com/grabber.php3?URL=http://www.devicelink.com/mpb/archive/9 . . . ); Nov. 1997.
Cangialosi et al.; The ABO discrepancy index: A measure of case complexity; American Journal of Orthodontics and Dentofacial Orthopedics; 125(3); pp. 270-278; Mar. 2004.
Collins English Dictionary; Teeth (definition); 9 pages; retrieved from the internet (https:www.collinsdictionary.com/us/dictionary/english/teeth) on May 13, 2019.
Dental Monitoring; Basics: How to put the cheek retractor?; 1 page (Screenshot); retrieved from the interenet (https://www.youtube.com/watch?v=6K1HXw4Kq3c); May 27, 2016.
Dental Monitoring; Dental monitoring tutorial; 1 page (Screenshot); retrieved from the internet (https:www.youtube.com/watch?v=Dbe3udOf9_c); Mar. 18, 2015.
Dentalwings; I series dental impression scanner; 8 pages; retrieved from the internet (https://web.archive.org/web/20160502145908/http://www.dentalwings.com/products/scan-and-design-systems/iseries/); available as of May 2, 2016.
Dentalwings; Intraoral scanner; 7 pages; retrieved from the internet (https://web.archive.org/web/20160422114335/http://www.dentalwings.com/products/intraoral-scanner/); available as of Apr. 4, 2016.
dictionary.com; Plural (definition); 6 pages; retrieved from the internet ( https://www.dictionary.com/browse/plural#) on May 13, 2019.
dictionary.com; Quadrant (definition); 6 pages; retrieved from the internet ( https://www.dictionary.com/browse/quadrant?s=t) on May 13, 2019.
Ecligner Selfie; Change your smile; 1 page (screenshot); retrieved from the internet (https:play.google.com/store/apps/details?id=parklict.ecligner); on Feb. 13, 2018.
Hecker; Physics, Part 4: The third dimension; 10 pages; retrieved rfom the internet (http://slim.chrishecker.com/images/b/bb/Gdmphys4.pdf); Jun. 1997.
Horn; Closed-form solution of absolute orientation using unit quaternions; ; Journal of Optical Society of america; 4(4); pp. 629-642; Apr. 1987.

(56) References Cited

OTHER PUBLICATIONS

Landgraf et al.; Polymer microcarrier exhibiting zero-oder release; Drug Delivery Technology; 3(1); pp. 1-14; (year of pub. sufficiently earlier than effective US filing date and any foreign priority date) 2003.

Lawrence; Salivary markers of systemic disease: noninvasive diagnosis of disease and monitoring of general health; Journal of the Canadian Dental Association Clinical Practice; 68(3); pp. 170-174; Mar. 2002.

Martinelli et al.; Prediction of lower permanent canine and premolars width by correlation methods; The Angle Orthodontist; 75(5); pp. 805-808; Sep. 2005.

Middleton et al.; Materials synthetic biodegradable polymers as medical devices; Medical Plastics and Biomaterials Magazine; MPB Article Index; 14 pages; Mar. 1998.

Nishanian et al.; Oral fluids as an alternative to serum for measurement of markers of immune activation; Clinical and Diagnostic Laboratory Immunology; 5(4); pp. 507-512; Jul. 1998.

Nourallah et al.; New regression equations for prediciting the size of unerupted canines and premolars in a contemporary population; The Angle Orthodontist; 72(3); pp. 216-221; Jun. 2002.

Ortho-Tain; What is ortho-tain; 2 pages; retrieved from the internet (http://www.orthotain.com/what-is-ortho-tain®), on Jul. 2, 2014.

Paredes et al.; A new, accurate and fast digital method to predict unerupted tooth size; The Angle Orthodontist; 76(1); pp. 14-19; Jan. 2006.

Prime; An introduction to thermosets; 8 pages; retrieved from the internet (http://www.primethermosets.com); on Aug. 13, 2009.

Sigma-Aldrich Co .; Tutorial, biocompatible/biodegradable materials; 3 pages; retrieved from the internet (http://www.sigmaldrich.com/area_of_interest/organic_chemistry/materials_science/biocompatible_biodegradable/tutorial/bio compatible_polymers.html); (year of pub. sufficiently earlier than effective US filing date and any foreign priority date) 2004.

Sobral De Agular et al.; The gingival crevicular fluid as a source of biomarkers to enhance efficiency of orthodontic and functional treatment of growing patients; Bio. Med. Research International; vol. 2017; 7 pages; Article ID 3257235; (year of pub. sufficiently earlier than effective US filing date and any foreign priority date) 2017.

Svec et al.; Molded rigid monolithic porous polymers: an inexpensive, efficient, and versatile alternative to beads for design of materials for numerous applications; Industrial and Engineering Chemistry Research; 38(1); pp. 34-48; Jan. 4, 1999.

U.S. Food and Drug Administration; Color additives; 3 pages; retrieved from the internet (https://websrchive.org/web/20070502213911/http://www.cfsan.fda.gov/~dms/col-toc.html); last known as May 2, 2007.

University of Nevada; Geomeric camera parameters; 9 pages; retrieved from the internet (https://www.cse.unr.edu/~bebis/CS791E/Notes/CameraParameters.pdf); on Jul. 12, 2019.

Unknown, Excerpt from a reference on water-soluble polymers, 2 pages; date unknown, (Available as of Dec. 9, 2004).

Van Der Eijk et al.; Paired measurements of quantitative hepatitis B virus DNA in saliva and serum of chronic hepatitis B patients: implications for saliva as infectious agent; Journal of Clinical Virology; 29(2); pp. 92-94; Feb. 2004.

Weingarten et al.; Probabilistic plane fitting in 3D and an application; 6pages; retrieved from the internet (https://infoscience.epfl.ch/record/97542/files/weingarten_planefitting2004.pdf); IEEE Int'l Conference on Robotics and Automation Proceedings; vol. 1; pp. 927-932; Apr. 26, 2004.

Chen et al.; U.S. Appl. No. 16/223,019 entitled "Release agent receptacle," filed Dec. 17, 2018.

Elbaz et al.; U.S. Appl. No. 16/370,646 entitled "Methods and apparatuses for forming a three-dimensional volumetric model of a subject's teeth," filed Mar. 29, 2019.

Elbaz et al. U.S. Appl. No. 16/410,949 entitled "Methods and apparatuses for forming a three-dimensional volumetric model of a subject's teeth," filed May 13, 2019.

Levin; U.S. Appl. No. 16/389,323 entitled "Motion compensation in a three dimensional scan," filed Apr. 19, 2019.

\* cited by examiner

DENTAL ATTACHMENT TEMPLATE TRAY SYSTEMS

BACKGROUND

The present disclosure provides devices and systems for creation of attachments for use with dental appliances and changeable shaped attachments. These concepts can, for example, be beneficial in potentially reducing the cost and increasing the convenience of the orthodontic process.

Dental treatments involve restorative and/or orthodontic procedures to improve the quality of life of a patient. For example, restorative procedures may be designed to implant a dental prosthesis (e.g., a crown, bridge, inlay, onlay, veneer, etc.) intraorally in a patient. Orthodontic procedures may include repositioning misaligned teeth and changing bite configurations for improved cosmetic appearance and/or dental function. Orthodontic repositioning can be accomplished, for example, by applying controlled forces to one or more teeth or a jaw of a patient over a period of time.

As an example, orthodontic repositioning may be provided through a dental process that uses positioning appliances for realigning teeth. Such appliances may utilize a shell of material having resilient properties, referred to as an "aligner," that generally conforms to a patient's teeth but is slightly out of alignment with a current tooth configuration.

Placement of such an appliance over the teeth may provide controlled forces in specific locations to gradually move the teeth into a new configuration. Repetition of this process with successive appliances in progressive configurations can move the teeth through a series of intermediate arrangements to a final desired arrangement. Such systems typically utilize a set of appliances that can be used serially such that, as the teeth move, a new appliance from the set can be implemented to further move the teeth.

Attachments can be fastened to one or more teeth, for example, via adhesive, and can be used with the shape of the appliance to impart force to move one or more teeth of the patient. The same attachments may be utilized with multiple appliances or attachments may be added, removed, or replaced with other attachment shapes that may impart different force characteristics than a previous appliance and attachment combination (i.e., appliance and one or more attachments).

Dental treatments with a set of appliances may involve repeated patient visits to an orthodontist or other treatment professional in order to verify that the dental treatment is proceeding as anticipated. For instance, an orthodontist may determine during a patient visit that the orthodontic procedure, such as repositioning misaligned teeth, is not proceeding as planned and may alter the procedure or that the treatment is progressing according to the treatment plan, but that a change in the attachment positioning or type of attachment used may need to be changed to move to the next stage in treatment.

"At home orthodontics" is a concept wherein, patients will take their own impression or photos (or go to an imaging center that will take the impression or scan a patient's dentition) and send that impression or other information to a dental appliance fabricator. At the dental appliance fabricator, dental professionals assess the impression or other information to develop a treatment plan and send the dental appliances (e.g., aligners) to the patient to treat their malocclusion at home. Another option is that the complete treatment plan will be created by computer executable instructions using the impression or collected information, orthodontic rules, and machine learning algorithms to precision and recommend a treatment plan for a patient.

Some orthodontic teeth movements cannot be accomplished without the use of attachments. This disclosure will provide different ways of preparing an area on a tooth for placement of an attachment, precisely positioning, affixing, and removing dental attachments as well as concepts for changing the shape of the attachments for use at different time during treatment or to aid in removal of the attachments.

DETAILED DESCRIPTION

Figure 1:
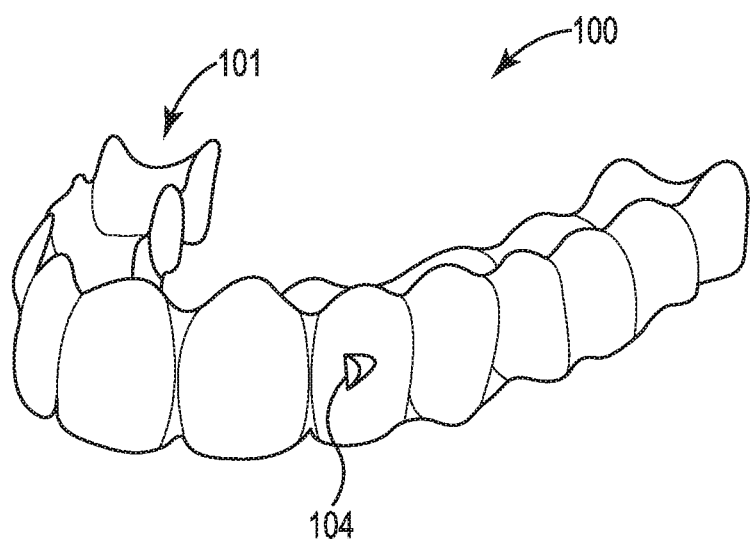
FIG. 1 illustrates an attachment template tray for the placement of an attachment on one of a patient's teeth according to a number of embodiments of the present disclosure.

The present disclosure provides devices, systems, and methods for creation of attachments for use with dental appliances and changeable shaped attachments. For example, the placement of attachments typically requires that the treatment professional create the attachment from a mixture of material, shape the attachment in a mold, cure the attachment using hand held light source, apply an adhesive to a surface of the attachment, position, orient, and hold the cured attachment on the tooth of a patient with one hand, and use the light source to cure the adhesive with the other hand.

Given the sometimes tight workspace provided by a patient's mouth, it can be difficult to properly place an attachment at the correct position and in the correct orientation with respect to the tooth surface.

For instance, having to hold the attachment in place, plus a hand held light source with the hands of the treatment professional in proximity to the mouth of the patient, it can be difficult to see into the mouth of the patient and can be difficult to maneuver the attachment to the correct position and orientation.

Additionally, due to the precise interaction between the attachment and the dental appliance that is specifically designed to work with the particular attachment that is to be attached to a patient's tooth at a precise position and orientation, errors in placement of the attachment on the tooth surface, either in position or orientation, can lead to improper force provided when the dental appliance interacts with the attachment, or the dental appliance may not fit over the attachment at all. Further, when multiple attachments are used, the placement of the attachments becomes even more critical, since small placement errors made with respect to each attachment can affect the fit of the dental appliance with respect to the other attachments.

Embodiments of the present disclosure provide methods, devices, and systems that can aid in positioning attachments. For example, in one embodiment, an attachment template tray for creating and placing attachments used in moving teeth of a patient can include an attachment template tray body having a first surface shaped to conform to the contours of exterior surfaces of obe or more teeth of a patient and including a portion of the first surface that provides a cavity to form the exterior surfaces of an attachment that is to be attached to the exterior surface of one of the teeth and an integrated light source, power source, and actuation mechanism on the body of the attachment template tray, wherein the power source provides power to the light source when the actuation mechanism is actuated.

The portion of the first surface shaped to accommodate an attachment that is to be attached to the exterior surface of the tooth can, for example, be a well for the placement of a light curable material therein that is used to form the attachment. In some embodiments, the attachment can already be cured and the attachment template tray, instead, includes a cured attachment positioned in the cavity. In such embodiments, a provided one or more light sources are used to cure the attachment, if it has not been cured, as will be described in more detail below.

In order for the attachment to be affixed to the tooth, in some implementations, a bonding material is used. For example, the attachment template tray can include a light curable adhesive material on a surface of the attachment for affixing the attachment to the tooth. This bonding material can be cured using a provided one or more light sources. However, in some embodiments, the bonding material is the attachment material that is used to form the attachment.

In some embodiments, the curing of the attachment shape and the affixing of the attachment to the surface of the tooth can be accomplished at the same time. Alternatively, the attachment shape may be cured and then additional attachment material may be added and cured to affix the attachment to the surface of the tooth.

In some such embodiments, the curing of the attachment and the affixing of the attachment to the tooth can be accomplished in one step (e.g., light applied to the attachment both cures the attachment material and secures it to the tooth surface).

As stated above, the attachment template tray can have a cavity that has interior surfaces that are used to shape the exterior surfaces of the attachment. However, since the attachment template tray is to be placed in the mouth of the patient and positioned to hold the attachment in the proper position and orientation, in some implementations, it is desirable to fabricate at least a portion of the body from of a light transmissive material to allow light from the light source to cure a light curable material that is in contact with the tooth.

Accordingly, in some embodiments, at least a portion of the body is made of a transparent material that is transparent to light. However, in some embodiments, the light used to cure and/or adhere the attachment to the tooth may not be visible light and, in such embodiments, the material may be transparent to the type of non-visible that is being used for the shape curing and/or affixing (e.g., ultraviolet (UV) light).

In the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2. Further, as used herein, the designators "M", "N", and "P", with respect to reference numerals in the drawings, indicate that any number of the particular feature so designated can be included.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure, and should not be taken in a limiting sense.

Embodiments of the present disclosure include attachment template trays with pre-fabricated (cured attachments) attachments that have an affixation surface that is pre-coated with light activated glue for affixation of the attachment to the surface of a tooth. The tray is inserted into the patient's mouth, and, in some embodiments, as soon as the tray is fully seated on the patient's teeth, a sensor (e.g., push button (force activated)) activates a light source on the tray. In such an embodiment, the built-in curing light source or associated curing light source tray (e.g., UV/LED) starts the curing process to cure the bonding material.

In some embodiments, the curing light dims or extinguishes after expiration of the predetermined curing period. The patient can then remove the attachment template tray and light source tray, if used. As described herein, the power source and the light source can be integrated with the attachment tray or it can be a modular system with separation between the light source and the attachment (e.g., separate trays for the attachment template and the light source.

As discussed above, in some embodiments, rather than having pre-formed and cured attachments, the attachment tray can be filled with attachment material that can be cured to form the desired attachment shape. And, although the discussion herein generally describes attachments being used on the buccal surfaces of the teeth, it should be noted that embodiments herein can be adapted to work on attachments placed on the lingual surfaces of the teeth as well.

FIG. 1 illustrates an attachment template tray for the placement of an attachment on one of a patient's teeth according to a number of embodiments of the present disclosure. In the embodiment shown in FIG. 1, the attachment template tray 100 includes a body 101 that is formed to receive one or more teeth therein. In the embodiment shown, the body is shaped to receive all of the teeth in the upper jaw of a patient.

The attachment template tray 100 also includes an attachment cavity 104 shaped to form an attachment. The attachment cavity 104 has interior surfaces that are used to form the exterior surfaces of the attachment.

The attachment cavity can be sized to hold a specific amount of attachment formation material that is sufficient to form the desired shaped attachment needed for the treatment plan to treat the orthodontic conditions of a patient. This not only includes an amount sufficient to form the exterior attachment surface shapes defined by the interior surfaces of the attachment cavity, but also sufficient material form an affixation surface that can be used to affix the attachment to the surface of a tooth.

The affixation surface can be a flat surface or can have a shape that matches that of the surface of the tooth to which the affixation surface is to be affixed. A matching surface to that of the tooth can be beneficial as it may allow for a stronger affixation of the attachment and thereby the attachment can be used with higher forces when used in combination with a dental appliance.

Additionally, as discussed herein, some embodiments may use a bonding material to affix the attachment to the surface of a tooth. When sizing the attachment cavity, the size can be calculated to include space for this bonding material.

Further, in some embodiments, the attachment cavity may have a release material (e.g., lubricant, thin film, coating, etc.) provided between the surfaces of the attachment cavity and the material used to form the attachment. Such release material may be beneficial in separating the attachment from the attachment cavity. Any suitable release material may be used to accomplish such functionality. In such embodiments, the size of the attachment cavity may be calculated to accommodate the release material based on an estimate of the amount of space needed to accommodate the release material.

In various embodiments, the attachment cavity may be provided to the user with no attachment, release, or bonding material therein (e.g., may be added by the treatment professional, patient, or other user), may be provided with attachment material therein, or may be provided with release and/or the bonding material provided in the attachment cavity with the material used to form the attachment.

The sizing of the attachment cavity can be determined based on whether a release material is to be used and/or whether a bonding material is going to be used to affix the attachment to the tooth rather than the attachment being affix directly to the tooth surface. As discussed above, the size of the attachment cavity attributable to the release material can be calculated, for example, based on amount of release material to be used and the volume of the type of release material to be used, among other variables.

Such calculations can also be made with respect to the attachment material and/or the adhesive material to be used. These calculations can be made by a treatment professional or by executable instructions of a computing device that can be used to design a specific treatment plan for a particular patient or design an attachment template tray, as discussed in more detail with respect to FIG. 11.

One or more of the attachment surfaces will be used to interact with one or more surfaces of the dental appliance and, therefore, the shape, position, and orientation of the one or more surfaces that interact with the dental appliance is important. Accordingly, the attachment template tray is used to more accurately shape, position, and orient the attachment with respect to the tooth surface to which it is to be attached.

In some implementations, a first surface may be utilized through interaction with one or more surfaces of a dental appliance while second surface is not utilized. Then, later in treatment, the second surface is either additionally or alternatively used to interact with one or more surfaces of a dental appliance. In this manner, an attachment can be designed to provided more than one function during the treatment of the patient based on use of different surfaces provided on the attachment.

As shown in FIG. 1, the shape of any of the trays discussed herein can be designed to approximate the shape of one or more teeth of the patient. The more accurately the shape of the attachment template tray approximates the shape of one or more the surfaces of a tooth of a patient, the more accurate the placement of the attachment can be. This is because each tooth surface has unique characteristics (e.g., contours, edges, peaks, valleys, etc.) and if a surface of the tray closely approximates these characteristics, then the surface of the tooth and the surface of the tray can be closely mated to each other (i.e., characteristics are aligned when the tray is placed over the tooth) and this results in more accurate placement of the attachment on the surface of the tooth.

The more characteristics on a tooth that are approximated on the tray, the more accurate the placement of the attachment can be. The more tooth surfaces that are approximated, the more accurate the placement can be. Further, if more teeth on the jaw of a patient are approximated, the accuracy can also be increased in this manner. Accordingly, an embodiment, as shown in FIG. 1, can be very accurate if the shapes of the teeth of the jaw of the patient have been closely approximated by the surfaces of the attachment template tray body 101.

As discussed herein, in some embodiments, the attachment template tray (e.g. clear plastic tray) can have one or more pre-fabricated attachments therein. The attachments can be pre-coated with a light curable adhesive (e.g., an ultra violet (UV) curable adhesive with the light, for example, provided by one or more light emitting diodes (LEDs)).

In some such embodiments, the tray can, for example, be stored in a light blocking bag (visible light or other light depending on what light is used to cure and/or adhere the attachment) for transportation and storage. In such embodiments, the user can open the bag, insert the tray into the patient's mouth, insert one or more light sources, if not provided on the tray (as shown in some embodiments herein), wait for a period of time (e.g., 3 minutes) for the adhesive to cure, and then remove both the attachment template tray and one or more light sources, if separately provided. The one or more attachments will then be fixed to the one or more tooth surfaces for the duration of the treatment period that they are needed.

Figure 2:
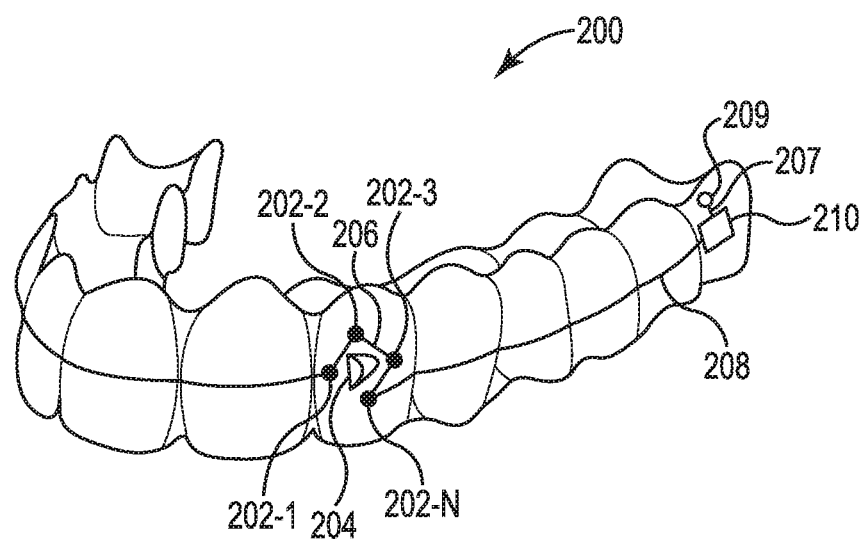
FIG. 2 illustrates an attachment template tray having a plurality of light sources thereon according to a number of embodiments of the present disclosure.

FIG. 2 illustrates an attachment template tray having a plurality of light sources thereon according to a number of embodiments of the present disclosure. In the embodiment of FIG. 2, the tray 200 includes a number of light sources 202-1, 202-2, 202-3, 202-N (also referred to generally as light sources 202) attached to the tray 200. In some embodiments, light sources can be attached to the surface of the tray. Light sources can also be embedded within the material forming the attachment template tray 200. As used herein, the term "embedded" means that a light source is fixed into the material forming the tray rather than being attached onto the material.

A light source and/or power source can be encapsulated within the attachment template tray body. As used herein, "encapsulated" means that the material used to form the tray completely surrounds the light source/power source in three dimensions. Such embodiments can be beneficial as the light source/power source is protected, for example, from saliva within the patient's mouth that could damage the light source. Additionally, when the light source/power source is encapsulated, it does not need to be biocompatible which may reduce cost for manufacture and the time for clearance of the tray by regulatory agencies, in some instances.

The embodiment of FIG. 2 also includes one or more power sources 210 to provide power to the light sources 202 via an electrical connection, such as wire 208. In some embodiments, the light sources 202 can be connected to each other via wires 206. This can allow for one power source to power multiple or all of the light sources and can allow for the light sources to be operated together based, for example, upon switching the supply of power to them on and off.

For instance, multiple light sources can be connected in series to a power source and, in this manner, when the power source is turned on, all of the light sources turn on. However, in other embodiments, the attachment template tray body includes multiple power sources and each of multiple light sources is connected to a different power source. In this manner, the light sources can be operated independently and the power supply can last longer, among other benefits of such an implementation.

Light sources can also be powered in groups. For example, a first group of one or more light sources can be powered by a first power source and a second group of one or more light sources can be powered by a second light source.

An embodiment such as that shown in FIG. 2 can be beneficial in many ways. For example, the light sources are provided on the attachment template tray and, as such, the treatment professional does not need to hold the light sources with a hand, thereby, allowing the treatment professional to do other things with that hand while a curing process is being accomplished.

Additionally, the light sources are likely located closer to the attachment than would be possible with a hand held light source. This is particularly the case where the light sources are embedded within the tray, since a hand held light source could not be within the tray material as an embedded light source could be.

Further, another benefit is that multiple light sources can be used in some embodiments which would be very difficult to accomplish with hand held light sources. In such embodiments, such as that shown in FIG. 2, the light sources 202 may be spaced around the attachment cavity 204 which may potentially provide exposure to more surfaces of the attachment than the use of a hand held light source could provide.

In some embodiments, the one or more light sources can be automatically activated when the tray is seated on the teeth. This can be accomplished, for example, by the placement of one or more sensors 209 in the body of or on the surface of the tray, for example, in connection with the power source 210 (e.g., via electrical connection, such as wire 207), that will sense the placement of the tray 200 in the mouth of the patient.

This can be sensed, for example, by contact (or pressure) of the teeth against the tray. Any suitable sensor can be used to activate the one or more light sources and it can be positioned in any suitable location on the tray. For example, suitable sensors include, but are not limited to, temperature, humidity, light, moisture, chemical, etc.

In some embodiments, the lights can be manually activated. This can be accomplished, for example, by having the sensor be actuated by interaction with a user (button that can be pressed or other suitable actuator). In some embodiments, the activation can be accomplished by connecting a power source to one or more light sources (e.g., connecting a battery to create an active circuit between a battery and a light source).

In some embodiments, the activation of the one or more light sources can be for a duration of time that is suitable for the forming and/or affixing process to be completed. For example, the one or more light sources could be activated for a period of 3 minutes and then automatically turned off after that duration has passed.

This can be beneficial, for example, where a patient places the tray in their mouth and can know to remove it after the light sources turn off. In such an embodiment, if UV or other non-visible light sources are used to form/affix the attachment, a visible light source may also be used to help indicate to a user (patient, treatment professional, etc.) when the tray should be removed.

In an example embodiment, an attachment template tray for creating and placing attachments used in moving teeth of a patient includes an attachment template tray body having a first surface shaped to conform to the contours of exterior surfaces of teeth of a patient and including a portion of the first surface that provides a cavity to form the exterior surfaces of an attachment that is to be attached to the exterior surface of one of the teeth. Such an embodiment also includes an integrated set of multiple light sources on the body of the attachment template tray, wherein the multiple light sources are located at positions proximate to the cavity for the formation of the attachment.

As discussed herein, light can be used to cure an attachment and/or affix the attachment to the surface of a tooth. As such, at least a portion of the body can be made of a light transmissive material. This allows for light from a light source to pass through the material of the body to cure a light curable material that is, for example, in contact with the tooth. In some embodiments, at least a portion of the body is made of a transparent material that is light transmissive to visible light. Additionally, in some embodiments, at least a portion of the attachment template tray body is made of nonvisible light transmissive material (e.g., a UV light transmissive material) to allow nonvisible light from the multiple light sources to cure a nonvisible light curable material that forms the attachment and/or that is in contact with one of the multiple teeth.

In some embodiments, the tray can include multiple attachments that each has one or more light sources near its respective attachment cavity. These light sources can be powered by their own power source or multiple sources or can receive power from a power source that provides power to one or more other light sources. Additionally, the multiple attachments and their corresponding attachment cavities can be located to affix the attachments on the same tooth or different teeth.

Another example embodiment based on FIG. 2 can include the following: an attachment template tray for creating and placing attachments used in moving teeth of a patient, having an attachment template tray body with a first surface shaped to form multiple tooth shapes that conform to the contours of exterior surfaces of multiple teeth of a patient and including a portion of the first surface that provides a cavity to form the exterior surfaces of an attachment that is to be attached to the exterior surface of one of the teeth. The embodiment also includes an integrated power source and a set of light sources attached to the body of the attachment template tray. In some embodiments, a set of light sources can include a single light source.

Figure 3:
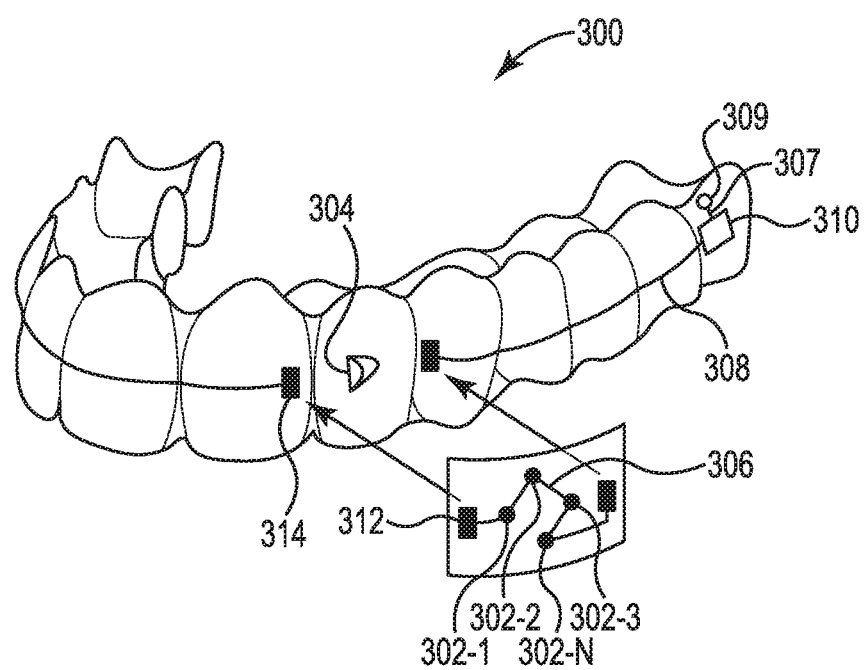
FIG. 3 illustrates an attachment template tray system having a tray with contacts and a lighting component that attaches to the tray according to a number of embodiments of the present disclosure.

FIG. 3 illustrates an attachment template tray system having a tray with contacts and a lighting component that attaches to the tray according to a number of embodiments of the present disclosure. In the embodiment illustrated in FIG. 3, the tray 300 includes an attachment cavity 304, a power source 310, sensor 309, electrical connection of the sensor to the power source 307, and one or more electrical connections 308 connecting the power source to a number of electrical contacts 314.

The embodiment of FIG. 3, includes multiple electrical contact surfaces 314. Each of the electrical contact surfaces is configured to contact with one of a corresponding number of multiple electrical contacts 312 on a light source element that is to be attached to the attachment template tray body.

The light source element can be attached to the body by any suitable mechanism. For example, the light source element may be attached via adhesive to an exterior surface of the attachment template tray body.

The location of the placement of the light source element can be any suitable location on the tray 300. In the embodiment shown in FIG. 3, the light source element is to be placed such that the light sources 302-1, 302-2, 302-3, 302-N are positioned around the cavity 314 of the attachment.

As shown in FIG. 3, the light sources can be connected in series between the electrical contacts (e.g., via wires 306). However, in some embodiments, some or all of the light sources could, additionally or alternatively, be connected in parallel between the electrical contacts.

In some embodiments, the light source element may have an aperture formed therein such that the cavity can be positioned in the aperture. This may be beneficial, for example, as it would allow the light source element to better conform to the outer surface of the tray.

Further, the light source element can be constructed of any suitable material. Examples of characteristics of suitable materials can, for example, include materials that are flexible, light transmissive, and/or biocompatible.

Figure 4:
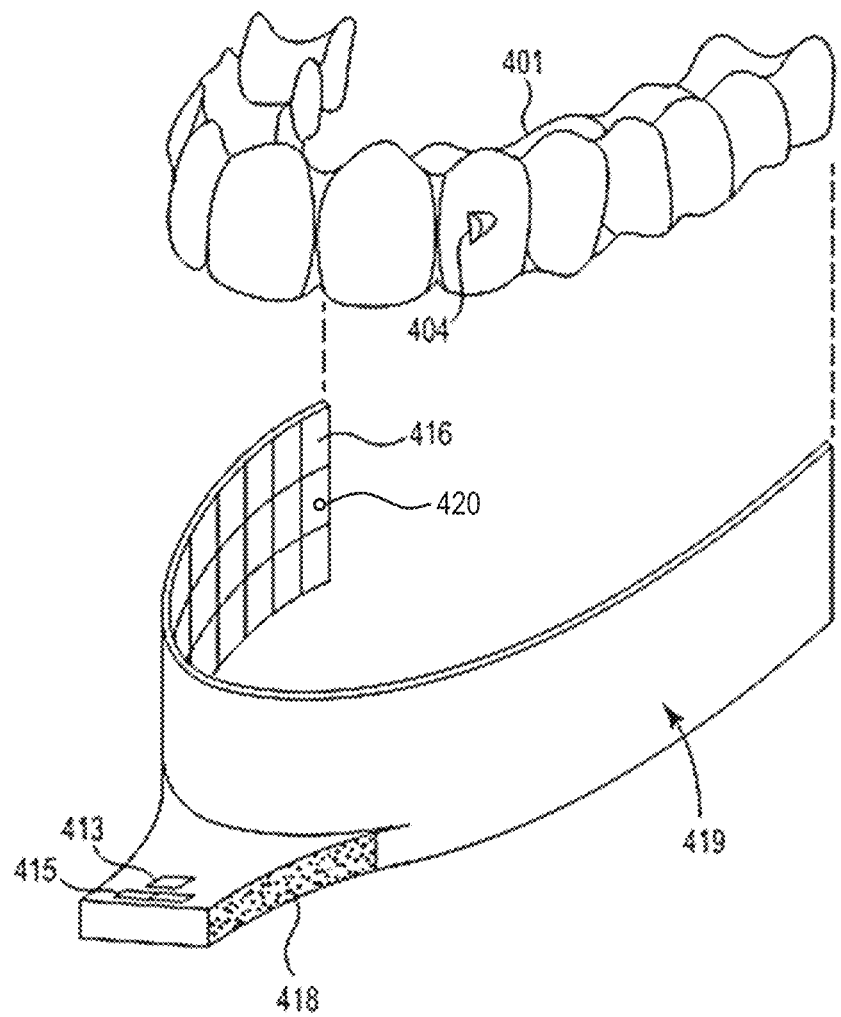
FIG. 4 illustrates an attachment template tray system having an attachment template tray and a lighting component that is placed around the attachment template tray according to a number of embodiments of the present disclosure.

FIG. 4 illustrates an attachment template tray system having a tray and a lighting component that is placed around the tray according to a number of embodiments of the present disclosure. In the embodiment of FIG. 4, the lighting component 419 is a separate tray that is sized to be placed around the attachment template tray body 401.

Similarly, to the embodiments of FIGS. 2 and 3, the lighting component 419 can have one or more power sources. The power sources are not shown in FIG. 4, but the understanding of how they work and their placement in the material of the lighting component or on the surface of the lighting component can be understood from the discussion of FIGS. 2 and 3.

The lighting component can have one or more power sources and the sources can be one use (once the power source is depleted, it cannot be replaced), rechargeable, or replaceable (the power source can be removed and replaced with a new one, such as the removal and replacement of a battery). In addition, the power source can be placed on the surface of the lighting component, embedded in the material forming the lighting component, or encapsulated within the material forming the lighting component.

The lighting component can have one or more light sources 416 thereon. The one or more light sources can be arranged in any suitable arrangement on the lighting component. For example, in the embodiment shown in FIG. 4, each of the rectangular shapes 416 can be a separate light source.

The light sources can be organized in an ordered pattern (such as that shown in FIG. 4). Any suitable organized pattern can be utilized. The light sources could also be positioned in a random arrangement, if desired.

Further, in some embodiments, the light sources could be specifically positioned based on the location of the attachment cavity. For example, the cavity position could be ascertained (via treatment planning of the orthodontic treatment of the patient's orthodontic conditions) and then the lighting component could be designed such that the light sources provided on the lighting component are positioned to be proximate to the attachment cavity when the lighting component is placed proximate to the attachment template tray. The ascertaining of the attachment cavity position can be accomplished, for example, by a treatment professional or via computer executable instructions that can be used to design a specific treatment plan for a patient.

In some embodiments, the lighting component can have on large light source that applies light to the entire attachment template tray. Such an embodiment may be beneficial to provide a uniform amount of illumination to multiple attachment cavities for the curing of the attachment and/or the adhering of multiple attachments to the teeth of the patient.

In some embodiments, the light sources can operate together and, in other embodiments, the light sources can be controlled independently. This can be accomplished in an suitable manner, for example, based on which power source is activated (the insertion of a battery to complete a circuit with one or more light sources to activate the light sources).

For example, one power source may be connected to one or more light sources that illuminate a first area of the attachment template tray and a second power source may be connected to one or more light sources that illuminate a second, different area of the attachment template tray. This may be beneficial in embodiments having multiple attachment cavities and wherein, the user may not be prepared to affix multiple attachments at the same time.

The lighting component 419 may also have a handle 418 to aid in the positioning of the lighting component in the mouth of the patient such that it is also in the correct position relative to the attachment template tray. In placement of the lighting component 419, the attachment template tray body 401 is placed on the teeth of the patient with the attachment cavity 404 positioned accurately on the surface of the tooth to which the attachment is to be placed. The lighting component 419 is positioned proximate to the outer buccal surface of the attachment template tray such that it is close enough for the light emanating from the one or more light sources can cure the attachment material and/or bonding material to affix the attachment to the surface of the desired tooth.

In some embodiments, the handle can include the power source 413 and/or or controls 415 for turning on and off the light sources. For example, the handle can have an integrated circuit or processor that can be used to control the light sources by a user (e.g., via a user interface, such as a push button or other suitable interface for controlling the light sources).

Provided below are some examples of embodiments that are related to the embodiment shown in FIG. 4. In one such example, an attachment template tray can have cavities with pre-formed attachment material therein or material can be added into the cavity. The attachment template tray can be placed on the patient's teeth and a light source tray is positioned on the attachment template tray to cure the attachment material or bond a bonding material on the attachment to the surface of a tooth.

Further, in a system embodiment example for creating and placing attachments used in moving teeth of a patient, the system includes an attachment template tray body having a first surface shaped to conform to the contours of exterior surfaces of teeth of a patient and including a portion of the first surface that provides a cavity to form the exterior surfaces of an attachment that is to be attached to the exterior surface of one of the teeth and a light source tray having an integrated light source, wherein the power source is electrically connected to the light source and provides power to the light source and wherein the tray has an inner surface that is larger than an exterior surface of the attachment template tray body such that the interior surface of the tray can be positioned adjacent the exterior surface of the attachment template tray.

The light source tray can have an inner surface that has a shape that is a corresponding shape to that of an exterior surface of the attachment template tray body such that the interior surface of the light source tray will mate with the exterior surface of the attachment template tray. In this manner, the shape of the outside surface of the attachment can be formed and/or affixed to the surface of the tooth. It should be noted that the shape of the attachments formed in the embodiments of the present disclosure can be a standard attachment shape or a specialized shape determined based on characteristics of the patient, type of attachment material, and/or the forces needed to move one or more teeth of the patient.

As with other embodiment discussed herein, in these embodiments, at least a portion of the body can be made of a light transmissive material to allow light from the light source to cure a light curable material in contact with the tooth. For example, at least a portion of the body can be made of a transparent material that is transparent to visible light and/or ultraviolet light, among other wavelengths of light.

As discussed above, the tray can include an activation mechanism that actuates the power source when actuated by a user. For example, the tray can include an activation mechanism (e.g., 420) that actuates the power source when the tray is within a threshold distance of the attachment template tray. The threshold distance can be any suitable distance and can be determined, for instance, via the use of a photo diode sensor among other sensor types that can trigger activation of the power source.

The attachment template tray can include an activation mechanism that signals to the power source to actuate when the tray is within a threshold distance of the attachment template tray. This, for example, can be accomplished by a wireless transmitter and a receiver sensor configured to receive a signal from the wireless transmitter.

In another embodiment, a light source tray for use in dental treatments includes a light source tray body shaped to be positioned within the mouth of a patient and having at least one integrated light source and at least one power source therein, wherein the power source is electrically connected to the light source and provides power to the light source. In this embodiment, the tray has an inner surface that is shaped to conform around a buccal surface of a patient's tooth. As shown in FIG. 4, the light source tray can have an inner surface that can conform around the buccal surfaces of more than one tooth and, in some embodiments, can conform around the buccal surfaces of all teeth along one or both jaws of a patient.

In this manner, the light source tray can be positioned close to where the attachment will be positioned for attachment to the buccal surface of a tooth of the patient. Where the light source tray has an inner surface that can conform around the buccal surfaces of more than one tooth or conforms around the buccal surfaces of all teeth along one or both jaws of a patient, multiple attachments can be attached at the same time and can be affixed to different jaws.

The light source tray has an inner surface that is larger than an exterior surface of an attachment template tray body for placement of an attachment that is to be secured to a tooth of a patient and wherein the interior surface of the light source tray can be positioned adjacent to the exterior surface of the attachment template tray. In this manner, the light source tray can be positioned in the mouth of the patient with the attachment template tray, in some implementations.

As discussed herein, the at least one light source and/or power source can be encapsulated within the tray body. This can be done to protect the light or power sources from damage due to exposure from elements within the mouth of the patient.

In such an embodiment, the tray body includes an actuation mechanism to actuate the power source. This can, for example, be accomplished by an activation mechanism that actuates the power source when a sensor, connected to the actuation mechanism, senses a predefined characteristic. As discussed herein, the predefined characteristic can, for example, be temperature, light (via a light sensor), humidity, moisture, the presence of a chemical, or other suitable characteristic that can be sensed. Further, the activation mechanism can be used to actuate a power source when a sensor, connected to the actuation mechanism, is in contact with a surface of the mouth of the patient and/or a fluid therein.

In another embodiment, a system for creating and placing attachments used in moving teeth of a patient includes an attachment template tray body having a first surface that provides a cavity to form the exterior surfaces of an attachment that is to be attached to the exterior surface of one of the teeth and a light source tray having integrated light source, power source, and actuation mechanism on the body of the attachment template tray, wherein the power source provides power to the light source when the actuation mechanism is actuated.

Figure 5:
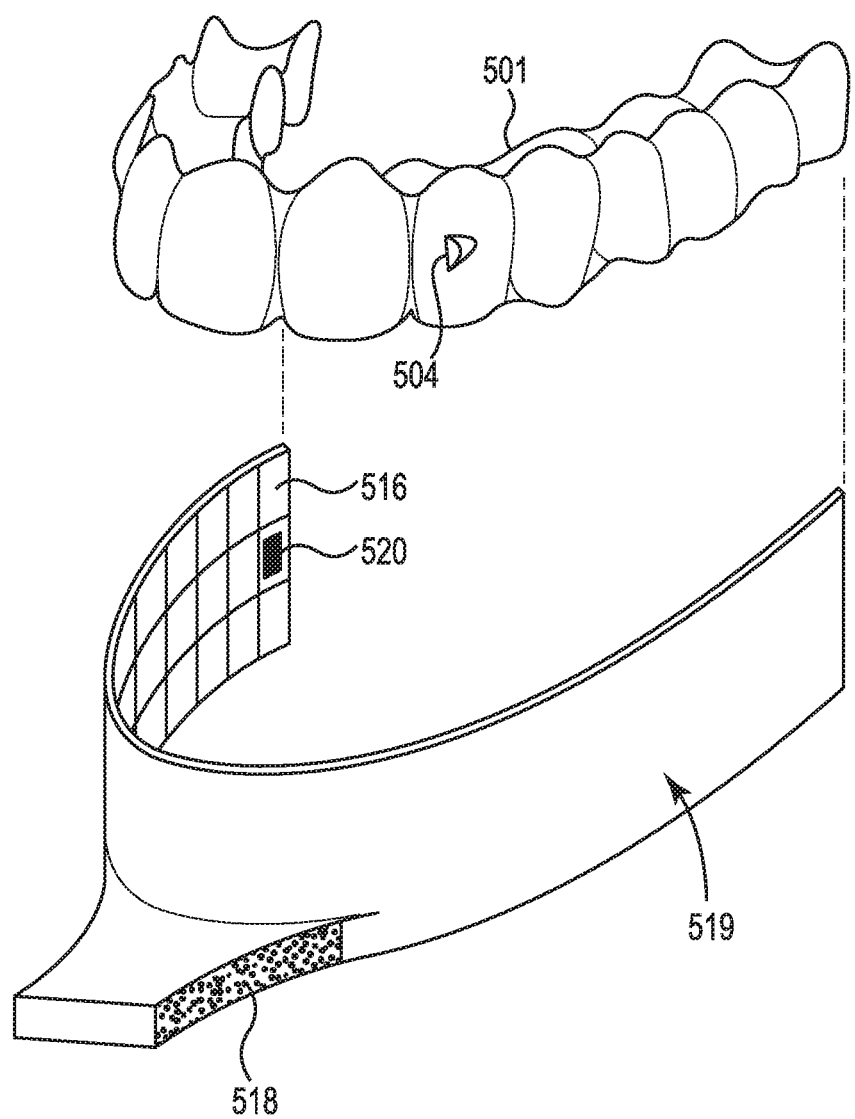
FIG. 5 illustrates another attachment template tray system having an attachment template tray and a lighting component that is placed around the attachment template tray according to a number of embodiments of the present disclosure.

FIG. 5 illustrates another attachment template tray system having an attachment template tray and a lighting component that is placed around the tray according to a number of embodiments of the present disclosure. In some embodiments, such as the embodiment of FIG. 5, the light sources can be automatically actuated when a sensor senses suitable conditions to turn on the light source. For example, in FIG. 5, an attachment template tray body 501 having an attachment cavity 504 therein is positioned in the mouth of a patient and a lighting component 519 having a handle 518 therein is positioned in the mouth of the patient, over the attachment template tray body 501.

The light sources 516 are activated when a sensor 520 is activated by a characteristic in the patient's mouth. For example, the sensor can be a photo diode and can detect the when a tooth is in proximity of the photodiode. As discussed above, any suitable threshold proximity can be used for such functionality.

In some treatment plans for the treatment of orthodontic conditions in patients, it may be necessary to use different attachments to accomplish the goals of the treatment plan. Traditionally, this meant that the attachment that was affixed to the surface of the tooth would have to be removed (by scraping the attachment free with a tool or grinding it off of the tooth surface with a grinding tool). Such removal can potentially harm the surface of the tooth, requires expertise by the treatment professional, and cannot be effectively accomplished by an at home user. Accordingly, as discussed below, changeable or degradable attachments of the present disclosure may be beneficial in such situations.

Figure 6A:
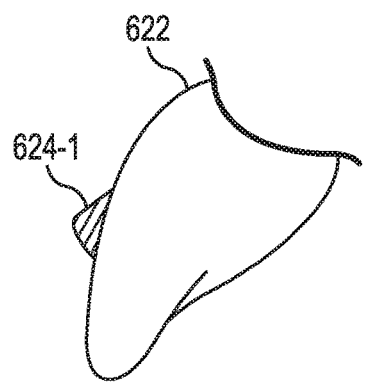
FIGS. 6A-6C illustrate an attachment that changes shape over a period of time according to a number of embodiments of the present disclosure.
Figure 6B:
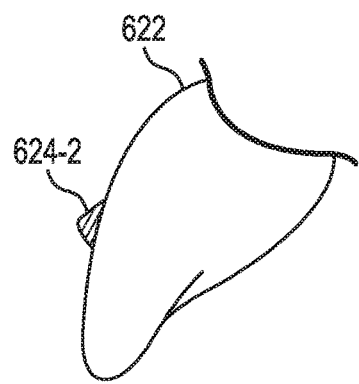
Figure 6C:
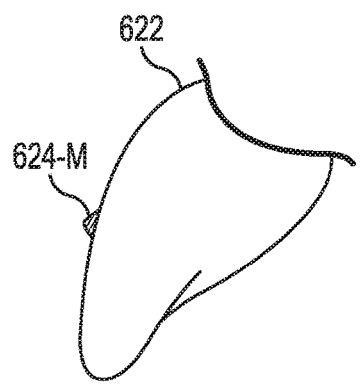

FIGS. 6A-6C illustrate an attachment that changes shape over a period of time according to a number of embodiments of the present disclosure. The embodiment of FIGS. 6A-6C illustrate a dental attachment that changes shape over time. In embodiments herein, a treatment plan can be devised based on the known degradation characteristics of a particular material used to form the attachment or the attachment can be designed with certain features that will emerge as the outer material of the attachment degrades and is detached from the attachment body. Further, in some embodiments, the attachment can be formed from multiple materials where one material degrades faster than one or more other materials or where one or more materials degrade and one or more materials do not. In such implementations, the attachment changes shape over time and a treatment plan can continue to use an attachment where previously a non-changeable attachment would need to be removed.

In the embodiment illustrated in FIGS. 6A-6C, an attachment is initially placed on the patient's tooth 622 at a first point in time and has an active surface 624-1 with a first size. As used herein, an "active surface" of an attachment is a surface used to interact with one or more surfaces of a dental appliance to assist the appliance in providing force to move one or more teeth of a patient. And, as used herein, a surface that is provided on an attachment that is intended to be used to interact with one or more surfaces of a dental appliance to assist the appliance in providing force to move one or more teeth of a patient, but is currently not being utilized is considered to be a "nonactive surface".

With respect to the embodiment shown in FIGS. 6A-6C, as the treatment progresses over time, the attachment begins to degrade and becomes smaller as shown in FIG. 6B at a second, later point in time. As can be seen in FIG. 6B, the active surface 624-2 is smaller than it originally was in at 624-1 in FIG. 6A. However, the active surface 624-2 may still be usable for interacting with one or more surfaces of a dental appliance. Accordingly, although it is getting smaller, it can still be usable.

In FIG. 6C, the attachment continues to degrade and becomes even smaller as shown in FIG. 6C at a third, later point in time. As can be seen in FIG. 6C, the active surface 624-M is smaller than it originally was in at 624-1 in FIG. 6A and at 624-2 of FIG. 6B. However, the active surface 624-M may still be usable for interacting with one or more surfaces of a dental appliance even in its smaller state.

In some embodiments, the attachment will continue to degrade until it is completely gone. In some such embodiments, it may be possible to also utilize a degradable bonding material that will also degrade until it is gone leaving the patient with no evidence that an attachment had been placed on the tooth.

This can be beneficial for a number of reasons. For example, there is no visit to a treatment professional needed, saving the patient time and money and making the treatment more convenient for the patient, especially for the at home treatment patient, among other benefits.

A degradable attachment can, for example, be made with a biodegradable material that can be designed to degrade over a predetermined time period (e.g., twelve month period) to an end condition at the end of that period which is no longer usable as an attachment. Such degradation qualities of a material can, for example, be ascertained through experimentation with the material in conditions similar to that existing in the mouth of a patient or through patient trials, among other methods.

In some embodiments, depending on the treatment length, a different biodegradable composite material can be used for different attachments within the same patient. For example, one attachment may be needed for a period of three weeks where another attachment may be needed for six months. The degradable materials used may be different materials to accommodate such differences in usage.

Further, it may be that the conditions within one person's mouth or one area within the mouth of a patient will be different than another, causing a particular material to degrade more quickly than in another patient's mouth or another area within a patient's mouth. In such situations, the characteristics of a patient's mouth can be determined (e.g., temperature, humidity, moisture, chemical composition) and the type of degradable material can be selected based on these characteristics and the amount of time the attachment is to be used.

Additionally, as discussed above, in some implementations, a first surface of the attachment may be utilized through interaction with one or more surfaces of a dental appliance while a second surface is not utilized. Then, later in treatment, the second surface is either additionally or alternatively used to interact with one or more surfaces of a dental appliance.

In this manner, an attachment can be designed to provide more than one function during the treatment of the patient based on use of different surfaces provided on the attachment. In some degradable embodiments of the present disclosure, the second or other surfaces, can be hidden under the surface of the attachment and can emerge to become usable once the attachment degrades to a certain extent. Such embodiments will be discussed in more detail with respect to FIG. 9.

Degradable materials can be of any suitable type. For example, some suitable materials include materials that degrade based on characteristics present within the mouth of the patient, such as temperature, humidity, moisture, and/or chemical composition. Some embodiments can be degraded based on catalysts introduced into the mouth of the patient. Some suitable examples of catalysts include chemicals, liquids having particular characteristics, light of a particular wavelength or frequency, among other suitable catalysts.

Examples of biodegradable attachment materials that may be used to form a degradable attachment include the following: Polyhydroxyalkanoates (PHAs) such as poly-3- hydroxybutyrate (PHB), polyhydroxyvalerate (PHV) and polyhydroxyhexanoate (PHH); polylactic acid (PLA); polybutylene succinate (PBS), polycaprolactone (PCL); polyanhydrides; polyvinyl alcohol; starch derivatives; and cellulose esters such as cellulose acetate and nitrocellulose and their derivatives (celluloid).

Figure 7A:
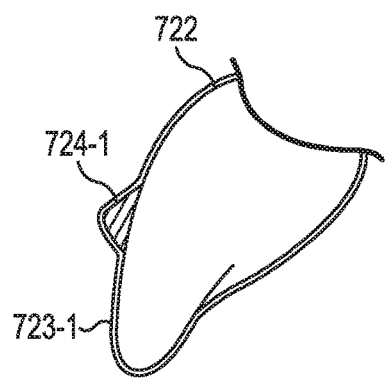
FIGS. 7A-7C illustrate a series of dental appliances designed to work in conjunction with an attachment that changes shape over a period of time according to a number of embodiments of the present disclosure.
Figure 7B:
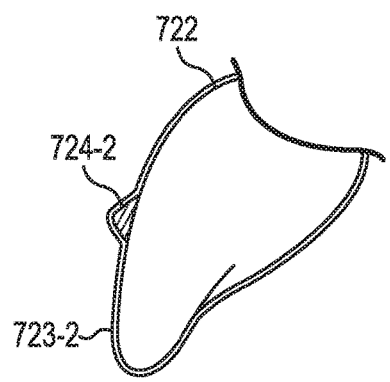
Figure 7C:
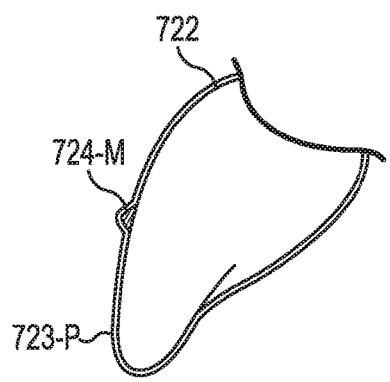

FIGS. 7A-7C illustrate a series of dental appliances designed to work in conjunction with an attachment that changes shape over a period of time according to a number of embodiments of the present disclosure. In this embodiment, a treatment plan can be determined that utilizes multiple dental appliances designed specifically for a particular patient based upon the physiology of the patient's teeth and mouth (each illustration 7A, 7B, and 7C, shows a different dental appliance that can, for example, be part of a treatment plan to move one or more of a patient's teeth), each having a portion shaped to have surfaces that either accommodate (don't interact to provide force) or interact with the attachment surfaces to provide force to move one or more teeth of the patient. In this embodiment, the dental appliance are placed over the outer surface of the tooth 722 and the outer surfaces of the attachments (721, generally) that are not affixed to the tooth.

As the attachment degrades from its original size at 724-1, to its smaller sizes at 724-2 and at 724-M, the portion of each dental appliance designed to be placed over the attachment (723-1, 723-2, 723-P, respectively) is sized based on the point in time to which that particular dental appliance is to be used and the corresponding estimated size of the attachment at that point in time. The estimation can be accomplished in any suitable manner.

For example, if the rate of degradation is known, then the shape and size of the attachment can be estimated at any particular point in time during a treatment. Further, if the characteristics of physiology of the patient's mouth are known, as discussed above, these characteristics can be used to further precision the estimate.

Alternatively, in some embodiments, the actual size of the attachment can be determined and the corresponding dental appliance to be used for that point in time can be designed based on the determined size of the attachment. Such a determination could be accomplished, for example, by taking a mold of the attachment or the patient's tooth or jaw with the attachment thereon, taking a scan using an oral scanning device, and/or taking photos of the attachment, tooth or jaw with the attachment thereon, among other calculation methods.

In some embodiments, the attachment may degrade to a size that is no longer usable to interact with the dental appliance to provide force. At such a time, in embodiments similar to that shown in FIGS. 7A, 7B, and 7C, the dental appliances can still be designed with a portion that will fit over the attachment and, in that manner, the proper fit of the dental appliance can be maintained.

Again, the estimation of the size and/or shape of the attachment can be estimated as described above. Further, in some embodiments, the sizing of this portion of the dental appliance can be oversized such that it does not contact one or more surfaces of the attachment.

This can be beneficial in a number of ways. For example, an oversized portion can reduce the likelihood of unintended interaction of the attachment with the dental appliance can reduce the need for accuracy with respect to the estimate of the size and/or shape of the attachment, among other benefits.

Figure 8:
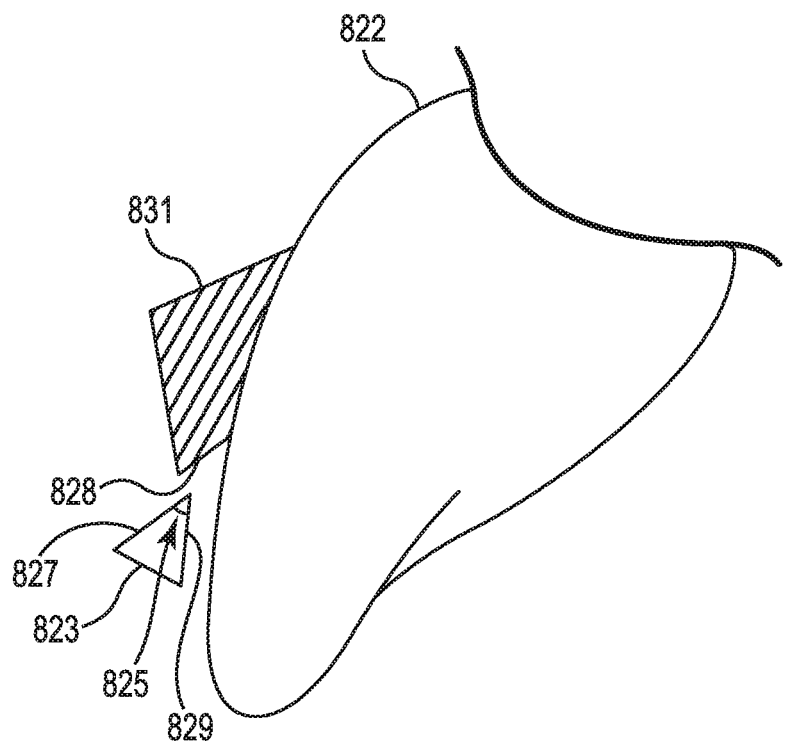
FIG. 8 illustrates another concept wherein a shear force can be provided by a removal appliance to remove the attachment from a tooth of a patient according to a number of embodiments of the present disclosure.

FIG. 8 illustrates a concept wherein a shear force can be provided by a removal appliance to remove the attachment from a tooth of a patient according to a number of embodiments of the present disclosure. In such an embodiment, the attachment has an active surface 831 that interacts with an engagement surface of a dental appliance, but the attachment also includes a removal surface 828 to allow for easier removal of the attachment by application of a shear force by a removal tool, such as removal tool 823 of FIG. 8.

The shear force exerted is greater than the retention force of the bond that holds the attachment to the surface of the tooth. In such a manner, when the shear force is provided, it overcomes the retention force and the attachment releases from the surface of the tooth.

The shear force and retention force can be estimated or determined by testing and, therefore, appropriate removal tool shapes can be determined based on the amount of shear force needed to overcome the retention force.

For example, the removal tool 823 can be used to pry the attachment from for the tooth by being placed between the surface of the tooth 822 and the shear surface 828. In some embodiments, the removal tool can be a wedge shaped tool with the angle 825 of the surfaces (827, 829) of the wedge being larger than the angle between the shear surface 828 and the surface of the tooth 822.

In this manner, when positioned between the shear surface and surface of the tooth, the angled surfaces 827 and 829 of the wedge will exert force on shear surface 828 and surface of the tooth 822. This exertion of force will pry the attachment from the tooth's surface.

Embodiments having the removal features as discussed herein can be utilized on non-degradable or degradable attachments. For example, a feature, such as that shown in FIG. 8 can be utilized on a degradable attachment, such as that shown in FIGS. 6A-7C.

As discussed above, in such an embodiment, the shear force needed to remove the attachment is greater than the retention force used to bond the attachment to the surface of the tooth. These forces can be calculated and/or estimated (e.g., via a computing system like that of FIG. 11) based on the characteristics of the bonding or attachment material (material type, retention force for attachment to a tooth surface) used to bond the attachment to the surface of the tooth, the characteristics of the shear surface (material type, shape of the surface, angle of the surface, etc.), and/or the characteristics of the shear tool (material type, mechanism for generating shear force, angle of wedge surfaces if wedge is used, etc.).

Once the retention force is known, the shear force needed can be determined. The shape of the attachment can then be designed to create the suitable shear force through use of a known shear tool or through use of a tool designed to provide a certain shear force when used in conjunction with a specifically designed attachment shape. Alternatively, attachment shapes can be predesigned and a shape can be selected based on the retention force needed, the implementation desired, the shear tool available, or other suitable selection criteria.

Figure 9:
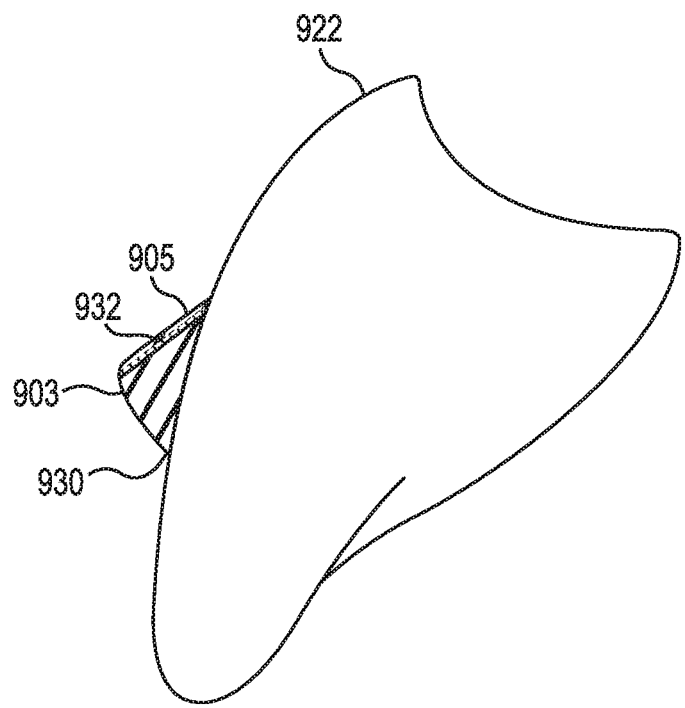
FIG. 9 illustrates an embodiment with a nonactive engagement surface hidden under the outer surface of the attachment according to a number of embodiments of the present disclosure.

FIG. 9 illustrates an embodiment with a nonactive engagement surface hidden under the outer surface of the attachment according to a number of embodiments of the present disclosure. In the embodiment of FIG. 9, the attachment 903 is bonded to the surface of the tooth 922 at 930 and has an active engagement surface 905 on the outer surface of the attachment 903. The embodiment also has a hidden nonactive engagement surface 932 hidden under the outer surface of the attachment 903.

As discussed herein, degradation can occur due to exposure to elements within the mouth of the patient or via application of a catalyst. Temperature, humidity, moisture, or chemical composition are example of elements within the mouth of a patient that can be utilized to affect degradation. Further, examples of catalysts can be chemicals, liquids having particular characteristics, light of a particular wavelength or frequency, among other suitable catalysts.

Provided below are examples of embodiments of the present disclosure related to FIG. 9. In such embodiments, the attachment and/or bonding material can be made of degradable material that is designed to degrade over a particular period.

In one example embodiment, a dental attachment for affixing to a surface of a tooth of a patient and for engagement with a surface of a dental appliance includes a dental attachment body having a first engagement surface thereon, wherein the first engagement surface is shaped to work in combination with an engagement surface on the dental appliance to provide a force vector that is applied to one or more teeth of a patient, and wherein the body includes a second engagement surface hidden beneath an exterior surface of the body. In this embodiment, the first engagement surface is considered an active surface and the second engagement surface is considered a nonactive surface.

In such an embodiment, at least a portion of the exterior surface of the body is removable to uncover the hidden second engagement surface. This can allow the attachment to be used for more than one purpose.

In the embodiment shown in FIG. 9, the hidden surface 932 is generally parallel to the active engagement surface 905. However, the hidden surface can be at any angle as referenced in three dimensions with respect to an active engagement surface.

A nonactive (e.g., second) engagement surface is shaped to work in combination with an engagement surface on a dental appliance to provide a force vector that is applied to one or more teeth of a patient that is different in magnitude of the force provided than that of the force vector of the active (e.g., first) engagement surface. Further, the nonactive engagement surface can be shaped to work in combination with an engagement surface on a dental appliance to provide a force vector that is applied to one or more teeth of a patient that is different in direction of the force provided than that of the force vector of the active engagement surface. In this manner, the treatment plan can use the modified attachment shape to provide different magnitude and/or direction of force to move one or more teeth without the removal and replacement of the original attachment.

In the embodiment shown in FIG. 9, the nonactive engagement surface 932 is made of a different material 930 than the rest of the body of the attachment. For example, the nonactive engagement surface can be made from a nondegradable material or of a material that degrades less than the rest of the body, in some embodiments. This can allow the nonactive engagement surface to emerge and be usable for the duration of the period of treatment wherein the attachment is to be utilized.

Such an embodiment may also be accomplished wherein the body includes two layers of material with the first layer of material including the active engagement surface and the second layer of material including the nonactive engagement surface is made of a different material than the rest of the body of the attachment. In such an embodiment, the active engagement surface may be made from the same material as the body of the attachment or may be made from a third material. In some embodiments, the active and nonactive engagement surfaces may be made from the same material, but the rest of the body is made from a different material. In such an implementation, the body may degrade such that the active engagement surface comes loose from rest of the body of the attachment.

Additionally, in some embodiments, the active engagement surface is on a first layer and the nonactive engagement surface is part of a second layer. In such an embodiment, the first layer is removable from the second layer of material to uncover the nonactive engagement surface.

In some embodiments, the attachment also includes a release layer on the nonactive engagement surface that can be released to remove the portion of the body between the second engagement surface and the exterior surface to uncover the second engagement surface. For example, a releasable material can be provided on surface 932 of FIG. 9 to release surface 905. The release layer can be a degradable material where the rest of the body is not degradable or degrades more than the rest of the body or can be responsive to one or more elements on the mouth of the patient and/or a catalyst where the interaction with the element/catalyst releases the release layer such that the first surface or layer detaches from the first surface or layer.

In another example embodiment, a dental attachment for affixing to a surface of a tooth of a patient and for engagement with a surface of a dental appliance includes a dental attachment body having a first exterior surface with a active engagement surface thereon, wherein the active engagement surface is shaped to work in combination with an engagement surface on the dental appliance to provide a force vector that is applied to one or more teeth of a patient, and wherein the body includes a nonactive engagement surface hidden beneath the first exterior surface of the body.

In some embodiments, the body includes multiple layers of material with a first layer of material including the active engagement surface and a second layer of material including the nonactive engagement surface. In such implementations, embodiments can be created with more than two layers and potentially more than two engagement surfaces. In this manner, the attachment can be used for more than two treatment periods.

Additionally, in some embodiments, the layers are on top of each other, but in others, one layer may be on one side of the attachment and another layer may be on another side. Further, the layers may be degraded or released using different elements and/or catalysts. These elements/catalysts can be considered a release agent for releasing a release layer.

In some embodiments, the first layer is removable from the second layer of material to uncover a second exterior surface and the nonactive engagement surface. This may be the case where a first material degrades at a first rate and a second material degrades at a second rate. The attachment can also include a release layer between the first layer and second layer that can be released to remove the first layer from the attachment body and thereby uncovering the second exterior surface and the nonactive engagement surface. The exterior surface of the second material can be considered the second exterior surface.

In another embodiment, a dental appliance system having a dental attachment for affixing to a surface of a tooth of a patient and for engagement with a surface of a dental appliance includes a dental appliance body having a first surface shaped to conform to the contours of exterior surfaces of teeth of a patient and including a portion of the first surface that provides a first engagement surface on a dental attachment that is to be attached to the exterior surface of one of the teeth and the dental attachment having a body with a first engagement surface thereon, wherein the first engagement surface is shaped to work in combination with the engagement surface on the dental appliance to provide a force vector that is applied to one or more teeth of a patient, and wherein the body includes a second engagement surface hidden beneath an exterior surface of the body.

As discussed above, in such an embodiment, in order to expose the second engagement surface, the dental attachment can also include a release layer on the second engagement surface that can be released to remove the portion of the body between the second engagement surface and the exterior surface to uncover the second engagement surface. This can be accomplished, for example, by having the release layer release from the second engagement surface through interaction with a particular wavelength or range of wavelengths of radiation or interaction with a solvent, among other release agents.

The attachment embodiments disclosed herein (e.g., degradable attachments, attachments having special removal surfaces, etc.) can be affixed to a tooth of a patient through use of the light source techniques disclosed herein. For example an embodiment such as that shown in FIG. 6A-9, 10D, or 10E can be affixed to a tooth of the patient using a light providing embodiment such as those shown in FIGS. 2-5. Further, the affixation concepts provided herein can also be used to affix standard attachment to a surface of a patient's tooth.

FIGS. 10A-10E illustrate an embodiment of a dental attachment affixing system according to a number of embodiments of the present disclosure. In some embodiments, the surface of the tooth will need to be etched before the attachment can be affixed to the surface of the tooth. The etching techniques disclosed herein can be used to assist in affixing standard attachments, attachments with special removal surfaces, or degradable attachments as discussed herein and can be utilized prior to using the light source embodiments discussed herein.

Etching the tooth can be beneficial in strengthening the bond between the surface of the attachment and the surface of the tooth. This is because the action of etching makes the surface of the tooth a little rougher which provides more surface area onto which to affix the attachment.

Figure 10A:
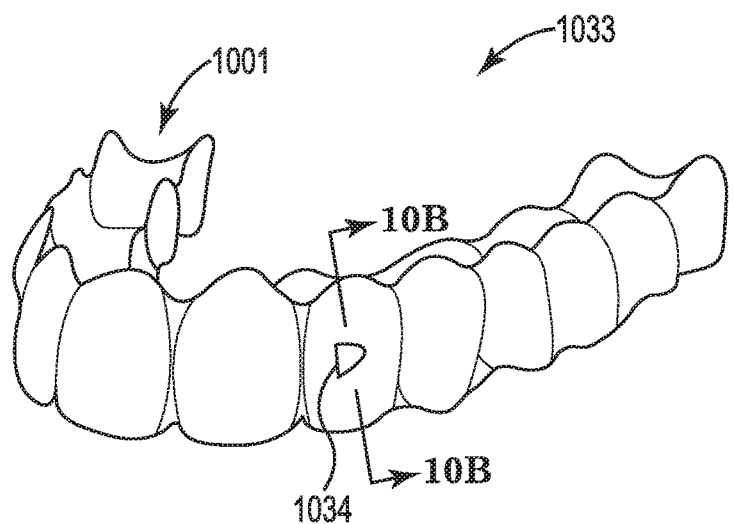
FIGS. 10A-10E illustrate an embodiment of a dental attachment affixing system according to a number of embodiments of the present disclosure.
Figure 10B:
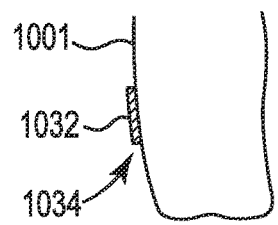
Figure 10C:
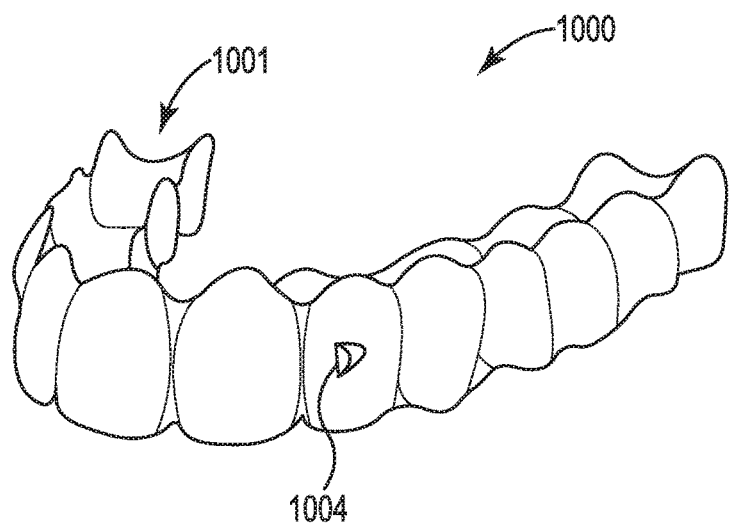

In FIGS. 10A and 10B, an etch template tray is illustrated. In FIG. 10A, the etch template tray 1033 includes a body 1001 that is formed to receive one or more teeth therein. In the embodiment shown, the body is shaped to receive all of the teeth in the upper jaw of a patient, although the embodiments are not limited to the upper jaw or to receive all teeth.

As can be seen in FIG. 10B, the etch template tray body 1001 also includes an etch cavity 1034 shaped to hold an etch material 1032 therein. The etch material can be any suitable material that can be used for etching the surface of the tooth. Additionally, the shape of the etch area can be sized smaller, the same size, or larger than the affixation surface of the attachment to be affixed to the surface of the tooth.

Once the surface of the tooth is etched, an attachment template tray like that shown in FIG. 1 can be placed over one or more teeth of the patient. This is shown in FIG. 100 where the attachment template tray 1000 includes a body 1001 that is formed to receive one or more teeth therein.

The attachment template tray 1000 also includes an attachment cavity 1004 shaped to form an attachment. As shown in FIG. 1, the attachment cavity 1004 has interior surfaces that are used to form the exterior surfaces of the attachment.

Figure 10D:
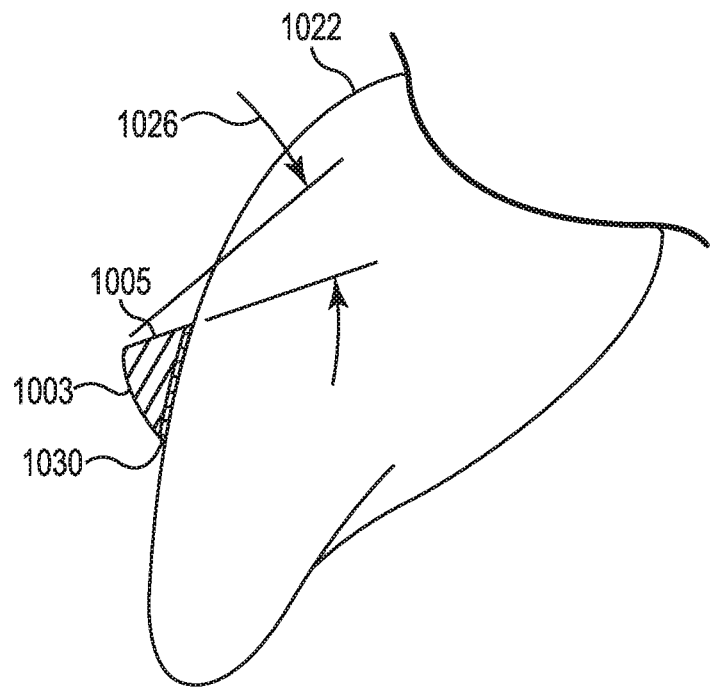

Once affixed, the attachment 1003 is shown in FIG. 10D affixed to the surface of tooth 1022. The attachment is affixed to the surface of the tooth with a bonding material 1030, as discussed elsewhere herein.

In some embodiments, the bonding material can be an adhesive material that can be weakened or dissipated to release the attachment from the surface of the tooth. For example, a UV curable adhesive can be chemically designed to degrade at the treatment length so the bonding strength between attachment and the tooth surface will diminish over the treatment period. When the bonding strength is low enough, the attachment will release from the surface of the tooth. In some embodiments, a removal tool can be used. In such embodiments, the removal tool can have a low shear force since the retention force is lower due to the degradation of the bonding material.

In some embodiments, the adhesive on tooth surface will degrade so no residue is left on the tooth surface. Examples of suitable degradable adhesives include chemicals, such as an adhesive formulation containing soybean based adhesive, starch based adhesive, polycaprolactone (PCL) polyesters, and polylactic acid (PLC).

FIG. 10D also has an engagement surface 1005 for engagement of the attachment with an engagement surface of a dental appliance. The angle 1026 of the engagement surface can be used to remove the attachment from the tooth. This can be accomplished with a removal tray, as discussed below.

In some embodiments, rather than using the engagement surface, the attachment can have a separate removal surface that can interact with the removal tray. An example of a removal tray is shown in FIG. 10E, the removal tray 1023 is placed over the attachment 1003 and shear force is exerted against the attachment, during the process of removing the removal tray 1023 from the surface of the tooth 1022.

Figure 10E:
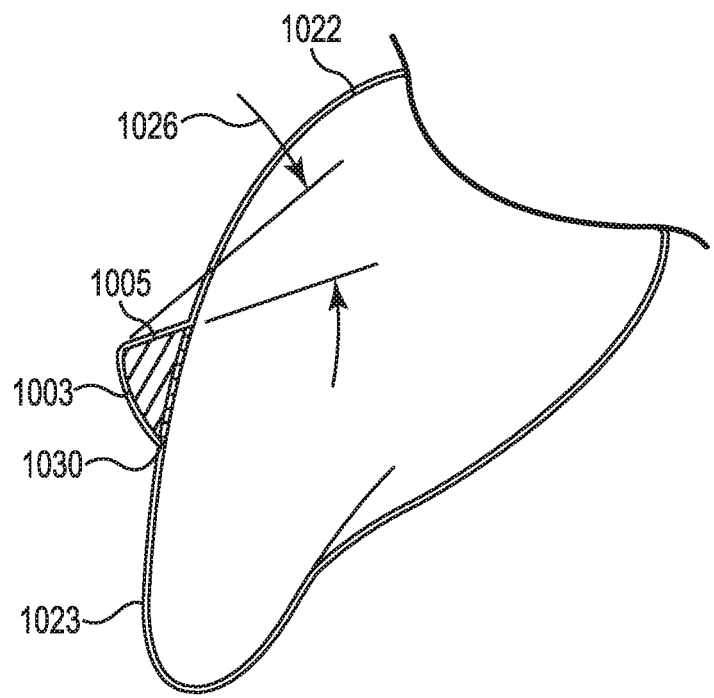

In the example shown in FIG. 10E, the angle 1026 of the upper surface of the attachment 1003 is such that the removal tray 1023 will not slide over the upper surface, but will rather exert a shear force on the upper surface of the attachment. If the tray is made from a material that is not very flexible, pulling, the portion of the tray containing the attachment, downward (toward the end of the tooth) can provide the shear force on the attachment needed to overcome the retention force of the bonding material 1030 to remove the attachment from the tooth.

Provided below are a number of examples regarding the embodiment shown in FIGS. 10A-10E. The examples provide an attachment having degradable or separating characteristics such that, over time, the shape of the attachment can be changed to reveal different active surfaces that can be used over different treatment periods.

In one embodiment, a dental attachment for affixing to a surface of a tooth of a patient and for engagement with a surface of a dental appliance includes a dental attachment body being at least partially constructed from a degradable material and having a first engagement surface thereon, wherein the first engagement surface is shaped to work in combination with an engagement surface on the dental appliance to provide a force vector that is applied to one or more teeth of a patient, and wherein the body includes a second engagement surface hidden beneath an exterior surface of the body that becomes unhidden as the degradable portion of the attachment body degrades over time.

In such an embodiment, the second engagement surface can be made of a different degradable material than the rest of the biodegradable material in the body of the attachment. For example, the second engagement surface can be made from a nondegradable material. This can enable the second engagement surface to be hidden during a first treatment period and then emerge for use in a second treatment period.

As discussed herein, the body can include multiple layers of material with the first layer of material including the first engagement surface and the second layer of material including the second engagement surface that is made of a different material than the first layer. In such an embodiment, the first layer can be biodegradable and it degrades to uncover the second engagement surface or second layer.

In another embodiment, a dental attachment for affixing to a surface of a tooth of a patient and for engagement with a surface of a dental appliance includes a dental attachment body being at least partially constructed from a degradable material and having a first exterior surface with a first engagement surface thereon, wherein the first engagement surface is shaped to work in combination with an engagement surface on the dental appliance to provide a force vector that is applied to one or more teeth of a patient, and wherein the body includes a second engagement surface hidden beneath the first exterior surface of the body that becomes unhidden as the degradable portion of the attachment body degrades over time.

In such an embodiment, the body can include multiple layers of material with a first layer of material including the first engagement surface and a second layer of material including the second engagement surface. The first layer can, for example, be made from a degradable material that degrades to uncover a second exterior surface and the second engagement surface.

The second layer of material including the second engagement surface can be made of a different material than the material of the first layer. In this manner, the first layer can be removed with a catalyst or other element that works on conjunction with the first layer, but may not affect the second engagement surface or, in some implementations, the second layer.

In some embodiments, the attachment can also include a release layer between the first and second layers and wherein the release layer is a degradable material that degrades through interaction with a release agent. The attachment can also include a degradable release layer between the first layer and second layer that can be released to remove the first layer from the attachment body and thereby uncovering the second exterior surface and the second engagement surface.

As stated herein, in some embodiments, the degradable material is a biodegradable material. This can allow for its use in the mouth of patient, in some implementations, among other benefits.

Another embodiment of a dental appliance system having a dental attachment for affixing to a surface of a tooth of a patient and for engagement with a surface of a dental appliance includes a dental appliance body having a first surface shaped to conform to the contours of exterior surfaces of teeth of a patient and including a portion of the first surface that provides an engagement surface on a dental attachment that is to be attached to the exterior surface of one of the teeth. In such an embodiment, the dental attachment can be at least partially constructed from a degradable material and having a body with a first engagement surface thereon, wherein the first engagement surface is shaped to work in combination with the engagement surface on the dental appliance to provide a force vector that is applied to one or more teeth of a patient, and wherein the body includes a second engagement surface hidden beneath an exterior surface of the body that becomes unhidden as the degradable portion of the attachment body degrades over time.

In some such embodiments, the degradable material degrades through interaction with fluid within the mouth of the patient. Degradation can also occur where the degradable material degrades through interaction with light introduced into the mouth of the patient via a light source. In a further example, the degradable material can degrade through interaction with a solvent that dissolves the degradable material. Other elements and/or catalysts can also be utilized in some of these embodiments.

Figure 11:
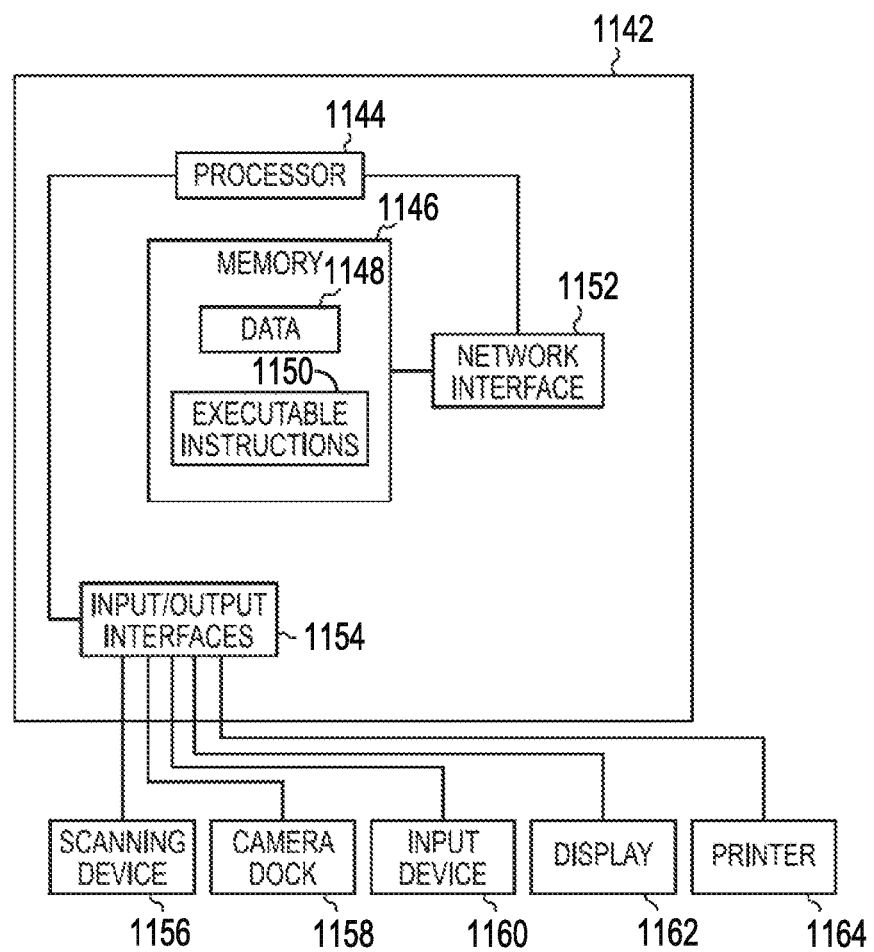
FIG. 11 illustrates a computing system for use in a number of embodiments of the present disclosure.

FIG. 11 illustrates a computing system for use in a number of embodiments of the present disclosure. For instance, a computing device 1142 can have a number of components coupled thereto.

The computing device 1142 can include a processor 1144 and a memory 1146. The memory 1146 can have various types of information including data 1148 and executable instructions 1150, as discussed herein.

The processor 1144 can execute instructions 1150 that are stored on an internal or external non-transitory computer device readable medium (CRM). A non-transitory CRM, as used herein, can include volatile and/or non-volatile memory.

Volatile memory can include memory that depends upon power to store information, such as various types of dynamic random access memory (DRAM), among others. Non-volatile memory can include memory that does not depend upon power to store information.

Memory 1146 and/or the processor 1144 may be located on the computing device 1142 or off of the computing device 1142, in some embodiments. As such, as illustrated in the embodiment of FIG. 11, the computing device 1142 can include a network interface 1152. Such an interface 1152 can allow for processing on another networked computing device, can be used to obtain information about the patient (e.g., characteristics of the patient's mouth, treatment planning information or data used for creating a treatment plan information about the materials to be used as an attachment, one or more of the trays described herein, and/or bonding material) and/or can be used to obtain data and/or executable instructions for use with various embodiments provided herein.

As illustrated in the embodiment of FIG. 11, the computing device 1142 can include one or more input and/or output interfaces 1154. Such interfaces 1154 can be used to connect the computing device 1142 with one or more input and/or output devices 1156, 1158, 1140, 1142, 1164.

For example, in the embodiment illustrated in FIG. 11, the input and/or output devices can include a scanning device 1156, a camera dock 1158, an input device 1140 (e.g., a mouse, a keyboard, etc.), a display device 1142 (e.g., a monitor), a printer 1164, and/or one or more other input devices. The input/output interfaces 1154 can receive executable instructions and/or data, storable in the data storage device (e.g., memory), representing a virtual dental model of a patient's dentition.

In some embodiments, the scanning device 1156 can be configured to scan one or more physical dental molds of a patient's dentition. In one or more embodiments, the scanning device 1156 can be configured to scan the patient's dentition, a dental appliance, and/or an attachment directly. The scanning device 1156 can be configured to input data into the computing device 1142 which can then be used for treatment planning and/or generating 3D models of the patient's dentition. This information can also be used to estimate the forces discussed herein In some embodiments, the camera dock 1158 can receive an input from an imaging device (e.g., a 2D or 3D imaging device) such as a digital camera, a printed photograph scanner, and/or other suitable imaging device. The input from the imaging device can, for example, be stored in memory 1146.

The processor 1144 can execute instructions to provide a visual indication of a treatment plan, a dental appliance, and/or a one or more attachments on the display 1142. The computing device 1142 can be configured to allow a treatment professional or other user to input treatment goals. Input received can be sent to the processor 1144 as data 1148 and/or can be stored in memory 1146.

Such connectivity can allow for the input and/or output of data and/or instructions among other types of information. Some embodiments may be distributed among various computing devices within one or more networks, and such systems as illustrated in FIG. 11 can be beneficial in allowing for the capture, calculation, and/or analysis of information discussed herein.

The processor 1144, can be in communication with the data storage device (e.g., memory 1146), which has the data 1148 stored therein. The processor 1144, in association with the memory 1146, can store and/or utilize data 1148 and/or execute instructions 1150 for creating and/or modeling interactions between an attachment and a tooth; interactions between an attachment and one or more appliances; and/or combinations of interactions between one or more attachments, one or more teeth, and/or other structure in the mouth of the patient, and/or one or more appliances for moving teeth; and/or degradation of an attachment; and/or separation of a portion of an attachment to reveal a hidden portion.

The processor 1144, in association with the memory 1146 can, in addition to or alternatively, store and/or utilize data 1148 and/or execute instructions 1150 for creating and/or modeling attachment template trays, etch trays, removal trays, attachments, and/or bonding and/or releasable materials, as well as a virtual modeling of such items with or without an appliance for moving teeth, and/or one or more teeth. The virtual model of the trays and/or attachments to attach a dental appliance to the teeth of a patient can be used to create a physical dental appliance, the trays themselves, removal tools, and/or attachments, for instance, as discussed further herein. The processor 1144 coupled to the memory 1146 can, for example, include instructions to cause the computing device 1142 to perform a method including, for example, creating a treatment plan based on a virtual model of a jaw of a patient, wherein the treatment plan includes use of one or more attachments and/or trays or other components on the upper and/or lower jaw of a patient.

In some embodiments, the processor 1144 coupled to the memory 1146 can cause the computing device 1142 to perform the method comprising modeling a virtual dental attachment based on the treatment plan, wherein the virtual dental attachment is constructed to provide one or more forces desired by the treatment plan.

In various embodiments, the processor 1144 coupled to the memory 1146 can cause the computing device 1142 to perform the method comprising creating a virtual dental attachment placement apparatus that includes a body having an attachment mounting structure and including a surface having a contour that is shaped to correspond with a contour of an alignment surface of a tooth such that when the contour of the body and the corresponding contour of the tooth are aligned, the dental attachment is placed in the attachment mounting structure, the dental attachment is located at a particular position with respect to an exterior surface of the tooth and having a light source thereon to cure one or more of the attachment material and the bonding material for bonding the attachment to the surface of a patient's tooth.

Such analysis can be accomplished one or more times for a treatment plan. For example, if a treatment plan has 30 stages, it would be possible to have different attachment configurations for each stage or possibly more, if desired. However, in many instances the attachment type, shape, position, and/or orientation may be changed a few times during the treatment plan.

Through use of virtual modeling, attachments can be virtually tested and the best attachment type, shape, position, and/or orientation can be selected without inconveniencing the patient with trial and error of attachments during treatment. Additionally, use of virtual modeling can also allow for custom design of attachment shapes that will be suitable for a specific patient's needs and/or a specific function within an area of a patient's mouth. From such analysis, different physical dental attachment trays and other apparatuses can be created from the virtual dental attachment placement apparatus data that would be utilized to create the attachments needed for the different stages.

Further, the specialized nature of the design of such attachments can also allow the attachments to be made from different materials. In this manner, attachments during a treatment plan or even during one stage can be of one or more different materials that may provide more specialized force distribution than was possible with standard attachments.

In some embodiments, the printer 1144 can be a three dimensional or direct fabrication device that can create a dental appliance directly from instructions from the computing device 1142. Embodiments of the present disclosure utilizing such technology can be particularly beneficial for a variety of reasons. For example, such direct manufacture allows for less waste of materials due to less processing steps and increased specialization of the attachment placement structure, attachment materials, and/or other components of the appliances described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An attachment template tray system comprising:
a template body having an interior surface with one or more tooth-receiving cavities configured to receive one or more teeth of a dentition of a patient, wherein at least one tooth-receiving cavity of the one or more tooth-receiving cavities includes an attachment cavity with an orthodontic attachment therein, wherein the template body is configured to align the orthodontic attachment with respect to an attachment position of a corresponding tooth of the patient when the template body is worn on the dentition of the patient, wherein the orthodontic attachment includes:
an affixing surface configured to interface with a light curable adhesive coating for bonding the orthodontic attachment to the corresponding tooth of the patient, and
a release layer covering an engagement surface, the engagement surface configured to engage with a dental appliance for applying a force on the corresponding tooth according to a treatment plan;
a light source tray configured for placement around the template body in the patient's mouth, the light source tray comprising:
a plurality of radiation sources configured to emit a first range of wavelengths of light for curing the light curable adhesive coating on the affixing surface of the orthodontic attachment, the plurality of radiation sources arranged to bond the orthodontic attachment within the attachment cavity on the corresponding tooth when the light source tray is placed around the template body, wherein the plurality of radiation sources is further configured to emit a second range of wavelengths of light for degrading the release layer such that the release layer can be removed from the orthodontic attachment to expose the engagement surface; and
electronic circuitry electronically configured to activate one or more of the plurality of radiation sources; and
a sensor assembly comprising at least one sensor on the light source tray,
wherein the electronic circuitry of the light source tray is configured to:
activate, based on a signal from the sensor assembly, at least one of the plurality of radiation sources of the light source tray when the light source tray is within a threshold distance of the template body, wherein the threshold distance is a distance that is determined to be close enough for light from the plurality of radiation sources to cure the light curable adhesive coating to bond the orthodontic attachment within the attachment cavity to the corresponding tooth or to degrade the release layer such that the release layer can be removed from the orthodontic attachment.

2. The attachment template tray system of claim 1, wherein the attachment cavity comprises a release material, wherein the release material includes one or more of a lubricant, a thin film or a coating.

3. The attachment template tray system of claim 1, wherein the orthodontic attachment is pre-coated with the light curable adhesive coating.

4. The attachment template tray system of claim 1, wherein the light source tray further comprises a visible light source that is configured to indicate to a user when the plurality of radiation sources are turned off.

5. The attachment template tray system of claim 1, wherein the template body is formed from a light transmissive material, the light transmissive material sufficiently transmissive to allow curing radiation from the plurality of radiation sources to pass therethrough to cure the orthodontic attachment.

6. The attachment template tray system of claim 5, wherein the curing radiation comprises nonvisible light and the light transmissive material is configured to allow transmission of the nonvisible light.

7. The attachment template tray system of claim 1, wherein the plurality of radiation sources are encapsulated within a buccal wall of the one or more tooth-receiving cavities.

8. The attachment template tray system of claim 1, wherein the electronic circuitry is configured to independently control activation of the plurality of radiation sources.

9. The attachment template tray system of claim 1, wherein an interior surface of the light source tray has a shape that corresponds to a shape of an exterior surface of the template body and is configured to mate with the exterior surface of the template body.

10. The attachment template tray system of claim 1, wherein the electronic circuitry is further configured to activate a user indicator visible light source when the plurality of radiation sources are turned off and a predetermined amount of time has passed.

11. The attachment template tray system of claim 1, wherein a first group of the plurality of radiation sources and a second group of the plurality of radiation sources are configured to be separately activated.

12. The attachment template tray system of claim 1, wherein the light curable adhesive coating is made of a different material than the release layer.

13. The attachment template tray system of claim 1, wherein the release layer is made of different material than the engagement surface.

14. The attachment template tray system of claim 1, wherein the release layer includes an active engagement surface when covering the underlying engagement surface.

15. The attachment template tray system of claim 1, wherein the electronic circuitry of the light source tray is further configured automatically turn off the at least one of the plurality of radiation sources after a predetermined amount of time has passed following the activation of the at least one of the plurality of radiation sources, wherein the predetermined amount of time corresponds to a duration for completion of curing of the light curable adhesive coating or degradation of the release layer of the orthodontic attachment.

16. An attachment template tray system comprising:
a template body having an interior surface with one or more tooth-receiving cavities configured to receive one or more teeth of a dentition of a patient, wherein at least one tooth-receiving cavity of the one or more tooth-receiving cavities includes an attachment cavity with an orthodontic attachment therein, wherein the template body is configured to align the orthodontic attachment with respect to an attachment position of a corresponding tooth when the template body is worn on the dentition of the patient, wherein the orthodontic attachment includes:
an affixing surface configured to interface with a light curable adhesive coating for bonding the orthodontic attachment to the corresponding tooth of the patient, and a release layer covering an engagement surface, the engagement surface configured to engage with a dental appliance for applying a force on the corresponding tooth according to a treatment plan;

a light source tray configured for placement around the template body in the patient's mouth, the light source tray comprising:

a plurality of light sources configured to emit a first range of wavelengths of light for curing the light curable adhesive coating on the affixing surface of the orthodontic attachment, the plurality of light sources arranged to bond the orthodontic attachment within the attachment cavity to the corresponding tooth when the light source tray is placed around the template body, wherein the plurality of light sources is further configured to emit a second range of wavelengths of light for degrading the release layer such that the release layer can be removed from the orthodontic attachment to expose the engagement surface;

a battery electrically coupled to the plurality of light sources and configured to activate the plurality of light sources; and electronic circuitry electronically configured to activate one or more of the plurality of light sources; and a sensor assembly comprising at least one sensor on the light source tray, wherein the electronic circuitry of the light source tray is configured to:

activate, based on a signal from the sensor assembly, at least one of the plurality of light sources of the light source tray when the light source tray is within a threshold distance of the template body, wherein the threshold distance is a distance that is determined to be close enough for light from the plurality of light sources to cure the light curable adhesive coating to bond the orthodontic attachment within the attachment cavity to the corresponding tooth or to degrade the release layer such that the release layer can be removed from the orthodontic attachment.

17. The attachment template tray system of claim 16, wherein the orthodontic attachment is configured to become smaller over a course of orthodontic treatment.

18. The attachment template tray system of claim 16, further comprising shell dental appliances each having a portion configured to apply repositioning forces against the orthodontic attachment, wherein the portion of each of the shell dental appliances has a size according to an estimated size of the orthodontic attachment at a particular point during a course of orthodontic treatment.

19. The attachment template tray system of claim 16, wherein the release layer and the engagement surface are made of different materials.

20. The attachment template tray system of claim 19, wherein the release layer is made of a biodegradable material.

21. An attachment template tray system comprising:

a template body having an interior surface with one or more tooth-receiving cavities configured to receive one or more teeth of a dentition of a patient, wherein at least one tooth-receiving cavity of the one or more tooth-receiving cavities includes an attachment cavity with an orthodontic attachment therein, wherein the template body is configured to align the orthodontic attachment with respect to an attachment position of a corresponding tooth when the template body is worn on the dentition of the patient, wherein the orthodontic attachment includes:

an affixing surface configured to interface with a light curable adhesive coating for bonding the orthodontic attachment to the corresponding tooth of the patient, and a release layer covering an engagement surface, the engagement surface configured to engage with a dental appliance for applying a force on the corresponding tooth according to a treatment plan;

a light source tray configured for placement around the template body in the patient's mouth, the light source tray comprising:

a plurality of light sources configured to emit a first range of wavelengths of light for curing the light curable adhesive coating on the affixing surface of the orthodontic attachment, the plurality of light sources arranged to bond the orthodontic attachment within the attachment cavity to the at corresponding tooth when the light source tray is placed around the template body, wherein the plurality of light sources is further configured to emit a second range of wavelengths of light for degrading the release layer such that the release layer can be removed from the orthodontic attachment to expose the engagement surface;

a battery electrically coupled to the plurality of light sources, the battery configured to supply power to activate the plurality of light sources, wherein the battery is encapsulated within a material forming the light source tray to protect the battery from exposure to elements within the patient's mouth; and electronic circuitry electronically configured to activate one or more of the plurality of light sources; and a sensor assembly comprising at least one sensor on the light source tray, wherein the electronic circuitry of the light source tray is configured to:

activate, based on a signal from the sensor assembly, at least one of the plurality of light sources of the light source tray when the light source tray is within a threshold distance of the template body, wherein the threshold distance is a distance that is determined to be close enough for light from the plurality of light sources to cure the light curable adhesive coating to bond the orthodontic attachment within the attachment cavity to the corresponding tooth or to degrade the release layer such that the release layer can be removed from the orthodontic attachment.

22. The attachment template tray system of claim 21, wherein the template body is formed from a light transmissive material that is sufficiently transmissive to allow curing radiation from the plurality of light sources to pass therethrough to cure the orthodontic attachment.

* * * * *